(12) United States Patent
Tanaka

(10) Patent No.: US 8,332,142 B2
(45) Date of Patent: Dec. 11, 2012

(54) POSITION DISPLAY APPARATUS

(75) Inventor: Masahide Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 836 days.

(21) Appl. No.: 11/963,216

(22) Filed: Dec. 21, 2007

(65) Prior Publication Data
US 2008/0154499 A1 Jun. 26, 2008

(30) Foreign Application Priority Data

| Dec. 26, 2006 | (JP) | 2006-349059 |
| Dec. 28, 2006 | (JP) | 2006-354494 |
| Feb. 7, 2007 | (JP) | 2007-028393 |
| Feb. 14, 2007 | (JP) | 2007-033962 |
| Feb. 20, 2007 | (JP) | 2007-038870 |
| Mar. 13, 2007 | (JP) | 2007-063837 |
| Mar. 14, 2007 | (JP) | 2007-064651 |
| Mar. 14, 2007 | (JP) | 2007-065270 |

(51) Int. Cl.
G01C 21/26 (2006.01)

(52) U.S. Cl. ...... 701/431; 701/482

(58) Field of Classification Search ...... 701/212, 701/200, 207, 213, 1, 400, 431, 410, 482; 455/456.1, 556.1, 435.1; 340/903, 995.1, 340/995.18; 342/357.08
See application file for complete search history.

(56) References Cited

U.S. PATENT DOCUMENTS

| 5,604,800 | A | * | 2/1997 | Johnson et al. | 713/189 |
| 5,637,018 | A | * | 6/1997 | Gargiulo | 439/640 |
| 6,292,747 | B1 | * | 9/2001 | Amro et al. | 701/213 |
| 6,768,450 | B1 | * | 7/2004 | Walters et al. | 342/357.59 |
| 7,013,151 | B2 | * | 3/2006 | Hirokawa | 455/456.1 |
| 7,133,768 | B2 | * | 11/2006 | Mukaiyama | 701/400 |
| 7,466,992 | B1 | * | 12/2008 | Fujisaki | 455/556.1 |
| 7,613,563 | B2 | * | 11/2009 | Haegebarth et al. | 701/117 |
| 2002/0055808 | A1 | * | 5/2002 | Matsumoto | 701/1 |
| 2002/0165645 | A1 | * | 11/2002 | Kageyama | 701/1 |
| 2004/0148090 | A1 | | 7/2004 | Melen | |
| 2004/0158401 | A1 | | 8/2004 | Yoon | |
| 2004/0160342 | A1 | * | 8/2004 | Curley et al. | 340/995.1 |
| 2004/0252050 | A1 | * | 12/2004 | Tengler et al. | 342/357.08 |
| 2005/0195078 | A1 | * | 9/2005 | Basinger et al. | 340/521 |
| 2005/0195106 | A1 | * | 9/2005 | Davis et al. | 342/357.08 |

(Continued)

FOREIGN PATENT DOCUMENTS

CN 152484 2/2004

(Continued)

Primary Examiner — Thomas Black
Assistant Examiner — Marthe Marc-Coleman
(74) Attorney, Agent, or Firm — Fish & Richardson P.C.

(57) ABSTRACT

A position display apparatus for own position and a position of an outside apparatus has: a position acquiring part adapted to acquire a first information indicative of the own position; a wireless communication part adapted to receive a second information indicative of the position of the outside apparatus; a map display adapted to display the own position and the position of the outside apparatus on a common map in response to the first information and the second information; and a controller adapted to control the map display in response to the first information and the second information so that the common map covers both the own position and the position of the outside apparatus on the map display.

20 Claims, 28 Drawing Sheets

U.S. PATENT DOCUMENTS

| | | | |
|---|---|---|---|
| 2006/0129691 A1* | 6/2006 | Coffee et al. | 709/230 |
| 2006/0148488 A1* | 7/2006 | Syrbe | 455/456.1 |
| 2006/0155461 A1* | 7/2006 | Cho | 701/207 |
| 2007/0250768 A1* | 10/2007 | Funakami et al. | 715/521 |
| 2007/0281689 A1* | 12/2007 | Altman et al. | 455/435.1 |
| 2008/0300779 A1* | 12/2008 | Uhlmann et al. | 701/200 |
| 2010/0052945 A1* | 3/2010 | Breed | 340/903 |
| 2010/0324775 A1* | 12/2010 | Kermani et al. | 701/33 |
| 2011/0077050 A1* | 3/2011 | Postma et al. | 455/556.1 |

FOREIGN PATENT DOCUMENTS

| | | |
|---|---|---|
| CN | 1739125 | 2/2006 |
| JP | 9-035188 | 2/1997 |
| JP | 9-189561 | 7/1997 |
| JP | 2000-331284 | 11/2000 |
| JP | 2002-197596 | 7/2002 |
| JP | 2004-078786 | 3/2004 |
| JP | 2005-017200 | 1/2005 |
| JP | 2006-322806 | 11/2006 |

\* cited by examiner

POSITION DISPLAY APPARATUS

CROSS-REFERENCE TO RELATED APPLICATIONS

This application is based on the following Japanese Patent Applications, the contents of which are hereby incorporated by reference:

(1) Japanese Patent Application No. 2006-349059 (filed on Dec. 26, 2006)
(2) Japanese Patent Application No. 2006-354494 (filed on Dec. 28, 2006)
(3) Japanese Patent Application No. 2007-028393 (filed on Feb. 7, 2007)
(4) Japanese Patent Application No. 2007-033962 (filed on Feb. 14, 2007)
(5) Japanese Patent Application No. 2007-038870 (filed on Feb. 20, 2007)
(6) Japanese Patent Application No. 2007-063837 (filed on Mar. 13, 2007)
(7) Japanese Patent Application No. 2007-064651 (filed on Mar. 14, 2007)
(8) Japanese Patent Application No. 2007-065270 (filed on Mar. 14, 2007)

BACKGROUND OF THE INVENTION

1. Field of the Invention

The present invention relates to a position display apparatus that displays the position of a mobile body on a map.

2. Description of Related Art

One common type of position display apparatus that displays the position of a mobile body on a map is car navigation systems employing GPS (global positioning system) information. Today services are also available that allow a person to display his position on a map on his cellular phone.

Various proposals have also been made for providing guides according to information on not only the position of a given person himself but also that of another person.

Examples of the related conventional art are disclosed in JP-A-2000-331284 and JP-A-2005-017200.

Providing guides on a map, however, still confronts many problems to be specifically addressed, and its potential is far from being fully exploited at present.

SUMMARY OF THE INVENTION

In view of the foregoing, an object of the present invention is to improve car navigation and cellular phone navigation to make them easier to use.

To achieve the above object, according to one aspect of the present invention, a position display apparatus for own position and a position of an outside apparatus is provided with: a position acquiring part adapted to acquire a first information indicative of the own position; a wireless communication part adapted to receive a second information indicative of the position of the outside apparatus; a map display adapted to display the own position and the position of the outside apparatus on a common map in response to the first information and the second information; and a controller adapted to control the map display in response to the first information and the second information so that the common map covers both the own position and the position of the outside apparatus on the map display.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Figure 1:
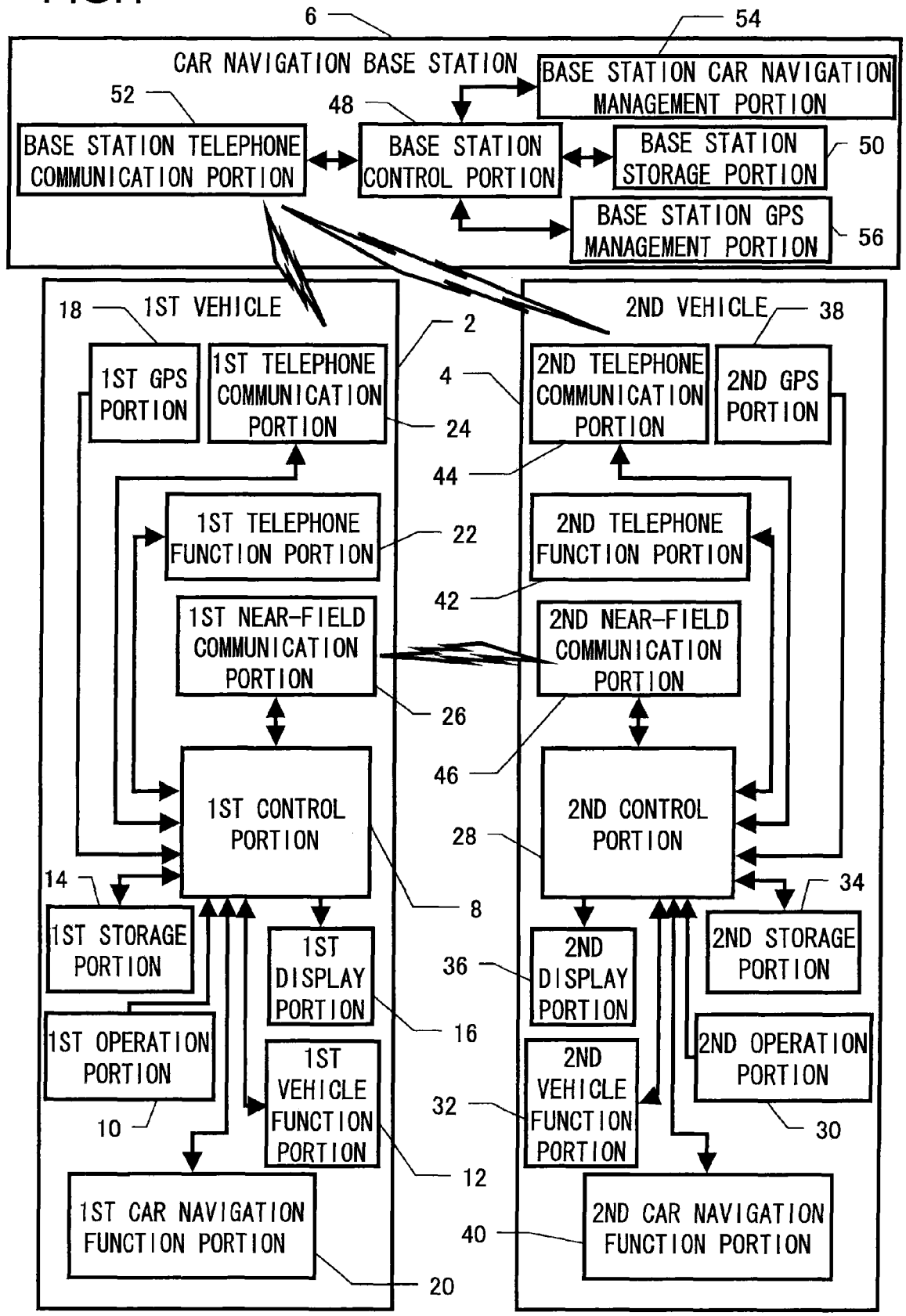
FIG. 1 is a block diagram showing a position display apparatus as a first embodiment of the present invention.

FIG. 1 is a block diagram showing a position display apparatus as a first embodiment of the present invention. The first embodiment deals with a navigation system for vehicles, and involves a first vehicle 2, a second vehicle 4, and a car navigation base station 6. Although FIG. 1 only shows two vehicles for the sake of simplicity, it should be understood that the present invention is applicable in cases involving a third, a fourth vehicle and so forth as well.

The first vehicle 2 has a first control portion 8, which is built around a computer that controls the entire vehicle. As the driver of the vehicle operates a first operation portion 10, a first vehicle function portion 12 is controlled accordingly. The first control portion 8 executes its functions according to software stored in the first storage portion 14. The first storage portion 14 also temporarily stores various kinds of data necessary for the control of the entire vehicle. The first control portion 8 also controls a first display portion 16 to display a GUI (graphical user interface) necessary for the operation of the first operation portion 10 and to display control results.

A first GPS portion 18 acquires, as absolute position information on the first vehicle 2, latitude-longitude-altitude information from satellites and nearby broadcast stations by a GPS system, and sends it to the first control portion 8. A first car navigation function portion 20 receives via the first control portion 8 the absolute position information from the first GPS portion 18, and processes it to display the position of the first vehicle 2 on a map on the first display portion 16.

The first vehicle 2 further has a first telephone function portion 22 and a first telephone communication portion 24. These are for conducting wireless communication, including ordinary voice communication, over a telephone network. Separately from these, the first vehicle 2 also has a first near-field communication portion 26 based on a wireless LAN or the like so as to be capable of wireless communication with another vehicle traveling in the near-field communication range.

On the other hand, the second vehicle 4 includes a second control portion 28, a second operation portion 30, a second vehicle function portion 32, a second storage portion 34, a second display portion 36, a second GPS portion 38, a second car navigation function portion 40, a second telephone function portion 42, a second telephone communication portion 44, and a second near-field communication portion 46. The second near-field communication portion 46 communicates with the first near-field communication portion 26 of the first vehicle 2 to exchange the absolute position information acquired by their respective GPS portions. How this proceeds will be described in detail later. The other component blocks of the second vehicle 4 function in the same way as their counterparts in the first vehicle 2, and therefore no overlapping description will be repeated.

The car navigation base station 6 has a base station control portion 48, which is built around a computer that controls the entire base station. The desired functions are executed according to software stored in a base station storage portion 50. The base station storage portion 50 also temporarily stores various kinds of data necessary for the base station control portion 48 to execute its functions.

A base station telephone communication portion 52 can communicate over a telephone network with the first telephone communication portion 24 and with the second telephone communication portion 44 to support, under the control of the base station control portion 48, the functions of the first vehicle 2 and the second vehicle 4. Involved in their support are a base station car navigation management portion 54 and a base station GPS management portion 56, which will be described in detail later.

Next, the coordination between the first vehicle 2 and the second vehicle 4, as seen from the part of the former, will be described. As already mentioned, the first car navigation function portion 20 receives via the first control portion 8 the absolute position information from the first GPS portion 18 and processes it to display the position of the first vehicle 2 on a map on the first display portion 16.

In addition, the first near-field communication portion 26 communicates with the second near-field communication portion 46 to receive via the second control portion 28 the absolute position information of the second vehicle 4 from the second GPS portion 38. The received absolute position information of the second vehicle 4 is fed via the first control portion 8 to the first car navigation function portion 20, where it is processed in the same manner as the absolute position information of the first vehicle 2 from the first GPS portion 18 so that the position of the second vehicle 4 is displayed on the map on the first display portion 16. Thus, on the first display portion 16 is now displayed not only the position of the first vehicle 2 itself but also the position of the second vehicle 4, which is traveling in the near-field communication range. This allows the positions of the two vehicles relative to each other to be viewed at one glance on the same map. Thus, for example on the occasion of car travel involving two or more participants' vehicles, even when a leading and a following vehicle lose sight of each other, the latter is prevented from getting lost. In the following description, this coordination is referred to as "twin-navigation".

The functions described above are executed in the same way in the second vehicle 4: the absolute position information of the first vehicle 2 received by the second near-field communication portion 46 is processed by the second car navigation function portion 40 so that, along with the position of the second vehicle 4 itself, the position of the first vehicle 2, which is traveling in the near-field communication range, is displayed in an at-a-glance view on the same map. In this way, "twin-navigation" allows the first vehicle 2 and the second vehicle 4 to share the absolute position information of each other.

In addition to what has already been mentioned, the coordination between the first vehicle 2 and the second vehicle 4 also involves exchange of their respective speed information, which is acquired from the first vehicle function portion 12 and the second vehicle function portion 32, between the first near-field communication portion 26 and the second near-field communication portion 46. How this speed information is exploited will be described later.

The car navigation base station 6 engages in system maintenance in connection with what is described above, and provides support when the vehicles have entered a dead zone of the near-field communication range of each other. In terms of the latter, i.e. support, when the first vehicle 2 and the second vehicle 4 become unable to exchange their respective absolute position information between the near-field communication portions, the car navigation base station 6 relays between them. Specifically, in circumstances as just mentioned, for example, the absolute position information of the second vehicle 4 is sent from the second telephone communication portion 44 to the base station telephone communication portion 52, and is then forwarded from the base station telephone communication portion 52 to the first telephone communication portion 24 under the control of the base station control portion 48 and, as necessary, through the processing by the base station car navigation management portion 54.

Communication over a telephone network may be conducted without the relaying by the car navigation base station 6 as described above but directly between the first telephone communication portion 24 and the second telephone communication portion 44. The relaying by the car navigation base station 6, however, allows each vehicle to communicate with the car navigation base station 6 in any case. This helps unify the settings and conditions for communication, unlike in a case where each vehicle needs to select a particular communication partner each time it needs to communicate with one.

On the other hand, in terms of system maintenance, the car navigation base station 6 operates such that, whenever updated data or maintenance data is available in connection with the functions of the car navigation system or the GPS system, such updated data or maintenance data is transmitted from the base station car navigation management portion 54 or the base station GPS management portion 56 via the base station telephone communication portion 52 to vehicles, like the first vehicle 2 and the second vehicle 4, that subscribe to the system. The first vehicle 2 and the second vehicle 4 receive the data at the first telephone communication portion 24 and the second telephone communication portion 44, and perform the maintenance of their respective car navigation function portions 20 and 40 and GPS portions 18 and 38.

Figure 2:
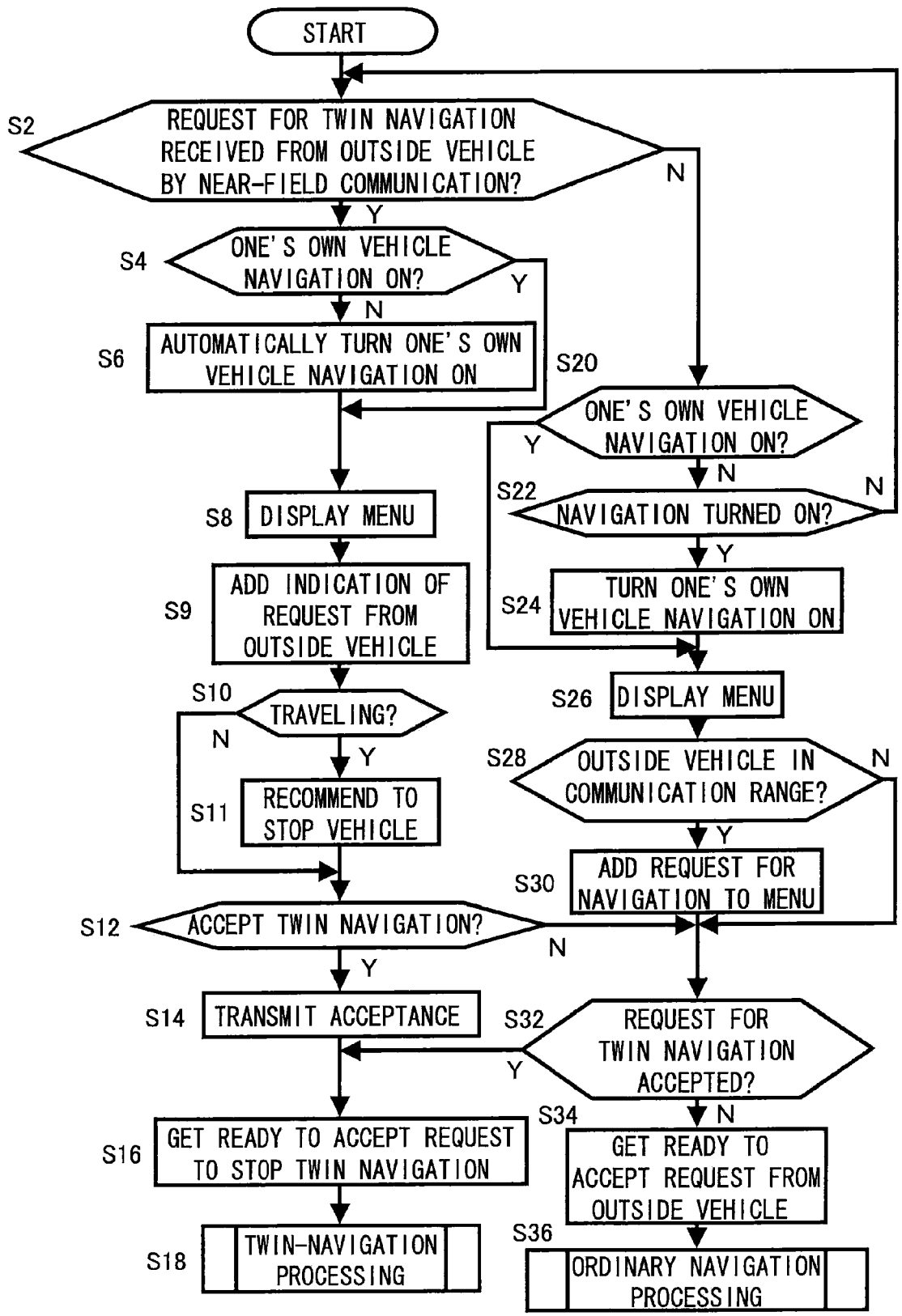
FIG. 2 is a flow chart showing the basic functions of each of the first and second control portions 8 and 28 shown in FIG. 1.

FIG. 2 is a flow chart showing the basic functions of each of the first control portion 8 and the second control portion 28. The flow starts when the engine of the vehicle is started, or when the car navigation function portion is turned on. The following description centers around the first vehicle 2 (also referred to as the "one's own" vehicle); accordingly, unless otherwise stated, the flow charts referred to in the following description deal with the functions of the first control portion 8.

When the engine of the first vehicle 2 is started, or the first car navigation function portion 20 is turned on, the flow starts. In step S2, whether or not a request for "twin-navigation" is received from someone else's vehicle (also referred to as an outside vehicle) by near-field communication is checked. If such a request is received, then, in step S4, whether or not the first car navigation function portion 20 of one's own vehicle is on is checked. If the first car navigation function portion 20 is not on, then, in step S6, it is automatically turned on, and the flow then proceeds to step S8. By contrast, if, in step S4, the first car navigation function portion 20 is on after the start of the engine, the flow proceeds directly to step S8. In this way, in steps S4 and S6, the car navigation system of one's own vehicle is automatically turned on by being controlled from an outside vehicle.

In step S8, a menu for car navigation functions starts to be displayed, and then, in step S9, an indication related to the request for "twin-navigation" from an outside vehicle is added to the menu. This addition to the menu is not displayed unless there is a request for "twin-navigation" from an outside vehicle. Next, in step S10, whether or not the first vehicle 2 is traveling is checked. If it is traveling, a recommendation like "please stop the car to continue operation" is displayed, and the flow then proceeds to step S12; if it is not traveling, the flow proceeds directly to step S12. This is to alert the driver of the risk of absent-minded driving likely to result from operating the car navigation system while the vehicle is moving.

In step S12, whether or not the driver of the first vehicle 2 has made an operation to accept "twin-navigation" is checked. If he has, then, in step S14, a reply of acceptance is transmitted back to the outside vehicle from which the request for "twin-navigation" was received. Thereafter, in step S16, readiness to accept an operation to stop "twin-navigation" whenever made is established, and then, in step S18, processing for "twin-navigation" is started. Its details will be described later.

By contrast, if, in step S2, no request for "twin-navigation" is received from an outside vehicle by near-field communication, then, in step S20, whether or not the first car navigation function portion 20 of one's own vehicle is on is checked. If not, then, in step S22, whether or not the driver has made an operation to turn it on is checked. If not, the flow returns to step S2, and thereafter, unless a request for "twin-navigation" is received from an outside vehicle or the driver himself makes an operation to turn the first car navigation function portion 20 on, the loop through steps S2, S20, and S22 is repeated.

If, in step S22, the driver is found to have made an operation to turn the first car navigation function portion 20 on, then, in step S24, the first car navigation function portion 20 is turned on, and the flow then proceeds to step S26. If, in step S20, the first car navigation function portion 20 is already on, the flow proceeds directly to step S24.

In step S26, a menu for car navigation functions starts to be displayed, and then, in step S28, whether or not an outside vehicle is located in the near-field communication range is checked. If an outside vehicle is located in the near-field communication range, then, in step S30, an indication related to a request for "twin-navigation" to the outside vehicle is added to the menu, and the flow then proceeds to step S32. By contrast, if, in step S28, no outside vehicle is located in the near-field communication range, no indication related to "twin-navigation" is displayed on the menu, and the flow then proceeds directly to step S32.

Incidentally, in a case where, in step S2, a request for "twin-navigation" is received from an outside vehicle and as a result the flow proceeds to step S12 but there no operation is made to accept the request for "twin-navigation" from the outside vehicle, the flow proceeds to step S32.

In step S32, a request for "twin-navigation" is sent to an outside vehicle, and whether or not acceptance is received from the outside vehicle is checked. If there is an outside vehicle that accepts the request is found, then the flow proceeds to step S16, and then to step S18, where processing for "twin-navigation" is started. By contrast, if, in step S32, no request for "twin-navigation" is sent, or if one is sent but no acceptance of it is received from any outside vehicle, then the flow then proceeds to step S34. In the above-described part of the flow, if the flow proceeds directly from step S28 to step S32, or if it proceeds directly from step S12 to step S32, the flow then normally proceeds to step S34. In step S34, readiness to accept a request for "twin-navigation" whenever received from an outside vehicle is established, and then, in step S36, processing for ordinary navigation is started. The details of the processing performed to make the check in step S32 mentioned above will be described in detail later.

Figure 3:
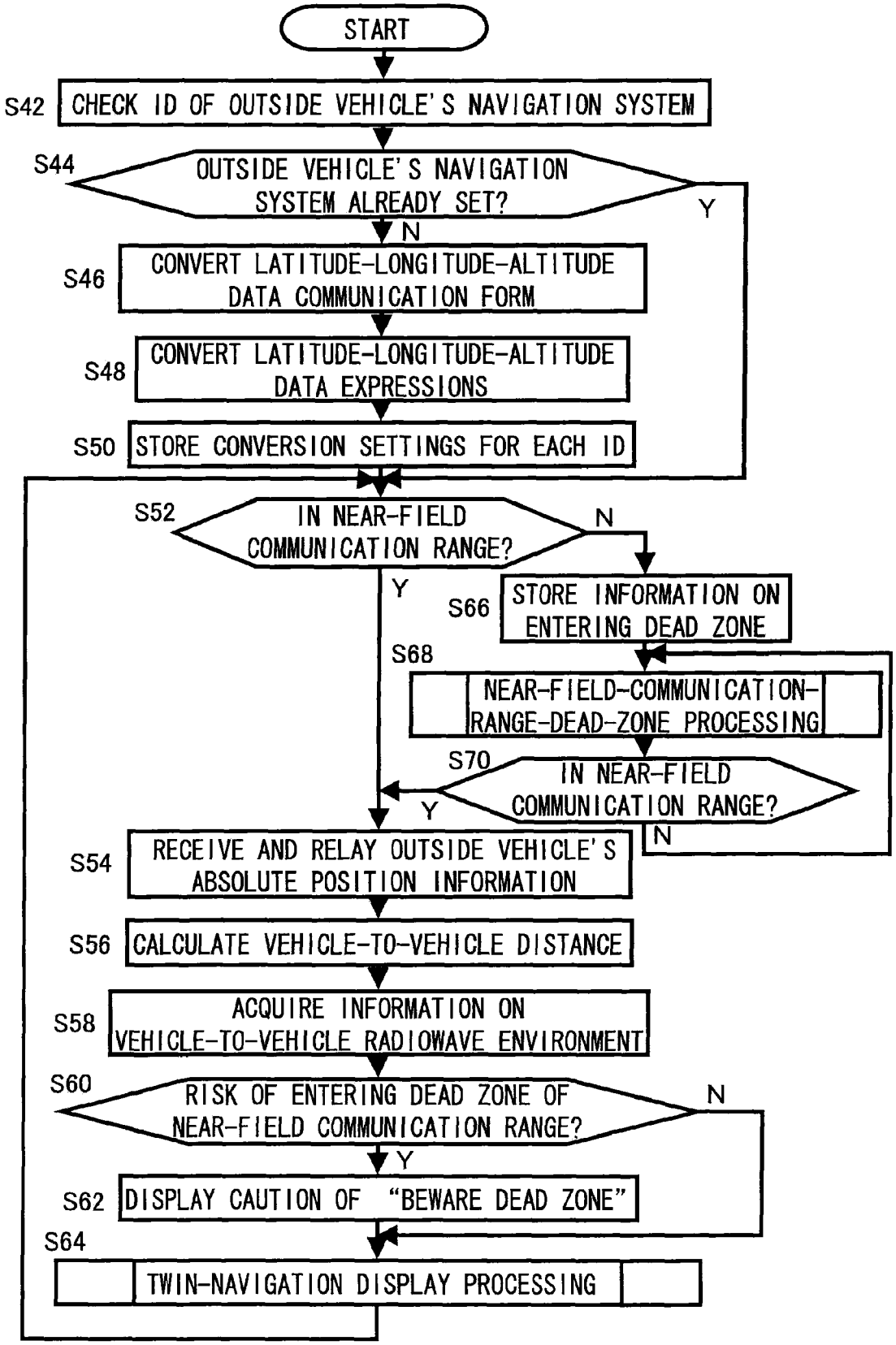
FIG. 3 is a flow chart showing the details of step S18 in FIG. 2.

FIG. 3 is a flow chart showing the details of the processing for "twin-navigation" in step S18 in FIG. 2. When the flow starts, in step S42, the identification information (ID) of the car navigation system of an outside vehicle that accepted "twin-navigation" in step S42 is checked. Then, in step S44, based on the identification information, whether or not the first car navigation function portion 20 is already set to coordinate with the car navigation system of the outside vehicle is checked.

If, in step S44, the car navigation system of the outside vehicle checked does not agree with the existing settings, then, in step S46, the communication form in which to handle the outside vehicle's latitude-longitude-altitude data received from it is so converted that the first car navigation function portion 20 can deal with it. Moreover, in step S48, the outside vehicle's latitude-longitude-altitude data itself is converted into expressions that the first car navigation function portion 20 can deal with. Then, in step S50, for every outside vehicle's identification information, these conversion settings are stored in the first storage portion 14, and the flow then proceeds to step S52.

By contrast, if, in step S44, the car navigation system of the outside vehicle checked agrees with the existing settings, the flow proceeds directly to step S52. Accordingly, for an outside vehicle whose identification information has once gone through steps S46 to S50, the flow proceeds directly from step S44 to step S52.

In step S52, whether or not an outside vehicle is still located in the near-field communication range of the first near-field communication portion 26 is checked. If it is, the flow proceeds to step S54, where the absolute position information of the outside vehicle, for example that of the second vehicle 4 as acquired by its second GPS portion 38, is received by the first near-field communication portion 26. In step S54, the speed information of the second vehicle 4 from the second vehicle function portion 32 is received as well. In addition, in step S54, the absolute position information and speed information thus received is recorded to and stored in the first storage portion 14 as a history at least until a session of "twin-navigation" ends. How this history information is exploited will be described later.

In the above description, for example, if the second vehicle 4 is leading, followed by the first vehicle 2 and, further, a third vehicle within the near-field communication range, then, in step S54, the absolute position information and speed information of the second vehicle 4 is relayed also to the third vehicle. Thus, even if the second vehicle 4 and the third vehicle are themselves located in a dead zone of the near-field communication range of each other, they can exchange their respective absolute position information and speed information by near-field communication through the relaying by the first vehicle 2, which is located between the former two and in the near-field communication ranges of each of them.

Next, in step S56, the vehicle-to-vehicle distance from the outside vehicle whose absolute position information was received is calculated. Here, if there are three or more vehicles including one's own vehicle, the vehicle-to-vehicle distance between every combination of them is calculated.

Then, in step S58, as information on the radiowave environment for near-field communication between the "twin-navigation" vehicles, the map information present in the first car navigation function portion 20 is acquired. This is done, even when the vehicle-to-vehicle distance calculated in step S56 predicts that near-field communication is possible, to grasp the possibility of a poorer-than-expected radiowave environment for geographical and other reasons. Through these steps, the flow reaches step S60, where whether or not the limit of the near-field communication range is almost reached and there is a risk of entering a dead zone is checked. If there is such a risk, then, in step S62, a caution of "beware dead zone" is displayed, and the flow then proceeds to step S64. By contrast, if, in step S60, there is no risk of entering a dead zone of the near-field communication range, the flow proceeds directly to step S64. In response to this caution of "beware dead zone", measures can be taken to maintain near-field communication, as by the leading vehicle reducing its speed or the following vehicle increasing its speed while making sure it can do so safely.

In step S64, processing for "twin-navigation" display is performed, which will be described in detail later. After the processing in step S64, the flow returns to step S52, and thereafter, unless a dead zone of the near-field communication range is detected, S52 to S64 are repeated to continue "twin-navigation".

If, in step S52, the outside vehicle is found to have entered a dead zone of the near-field communication range, then, in step S66, the absolute position information and speed information of the outside vehicle as acquired by communication immediately before it entered the dead zone of the near-field communication range is stored, and the flow then proceeds to step S68. In step S68, "twin-navigation" is maintained complimentarily by near-field-communication-range-dead-zone processing, which will be described in detail later.

Next, in step S70, whether or not the outside vehicle has come back into the near-field communication range is checked, and, if it has, then the flow proceeds to step S54 to return to the loop through steps S52 to S64. By contrast, if, in step S70, the outside vehicle is not found to have come back into the near-field communication range, the flow returns to step S68, and thereafter, unless it is found to have come back into the near-field communication range in step S70, complementary "twin-navigation" is continued through the loop through steps S68 and S70.

Figure 4:
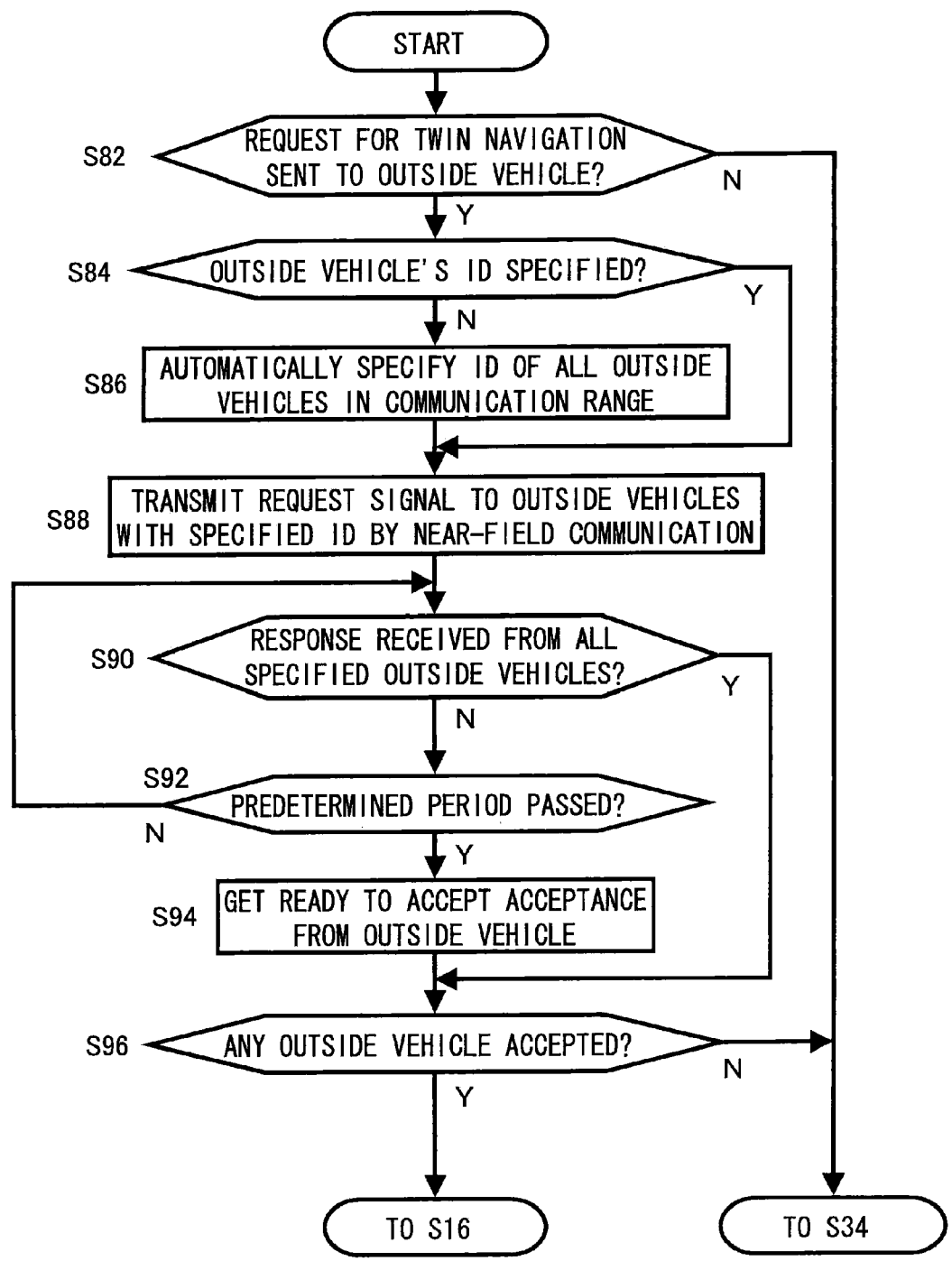
FIG. 4 is a flow chart showing the details of step S32 in FIG. 2.

FIG. 4 is a flow chart showing the details of the processing for requesting and accepting "twin-navigation" in step S32 in FIG. 2. When the flow starts, in step S82, whether or not an operation to send a request for "twin-navigation" from one's own vehicle to the outside vehicle has been made is checked. If an operation to send a request for "twin-navigation" to the outside vehicle has been made, the flow then proceeds to step S84, where whether or not an operation to specify the identification information of the outside vehicle to which to send a request for "twin-navigation" has been made is checked.

In step S84, an operation by the driver is awaited for a predetermined period and, if no operation to specify the identification information of the outside vehicle is made within the predetermined period, the flow proceeds to step S86. In step S86, of all the identification information stored by the function of step S50 in the past, the identification information of all the outside vehicles currently located in the near-field communication range is automatically specified, and the flow then proceeds to step S88. By contrast, if, in step S84, any identification information is specified within the predetermined period, only the vehicles that have the thus specified identification information are specified, and the flow then proceeds directly to step S88.

In step S88, to all the outside vehicles that have the specified identification information, a "twin-navigation" request signal is transmitted from the first near-field communication portion 26. Then, in step S90, whether or not a response has been received from all the specified outside vehicles is checked. If there is any outside vehicle from which no response has been received, then, in step S92, whether or not a predetermined period has passed after the transmission is checked. If not, the flow returns to step S90, and thereafter, until either a response is received from all the outside vehicles or the predetermined period passes, steps S90 and S92 are repeated.

If, in step S92, it is found that the predetermined period has passed, then, in step S94, readiness to accept a reply of acceptance of "twin-navigation" from an outside vehicle from which no response has been received is established, and the flow then proceeds to step S96. By contrast, if, in step S90, it is found that a response has been received from all the outside vehicles of which the identification information was specified and to which a "twin-navigation" request signal was transmitted, the flow proceeds directly to step S96.

In step S96, based on the received responses, whether or not there is any outside vehicle that has accepted "twin-navigation" is checked, and, if there is any, the flow proceeds to step S16 in FIG. 2. By contrast, if, in step S96, there is no outside vehicle that has accepted the request for "twin-navigation", the flow proceeds to step S34 in FIG. 2. If, in step S82, no request for "twin-navigation" is sent to any outside vehicle, the flow proceeds directly to step S34.

Figure 5:
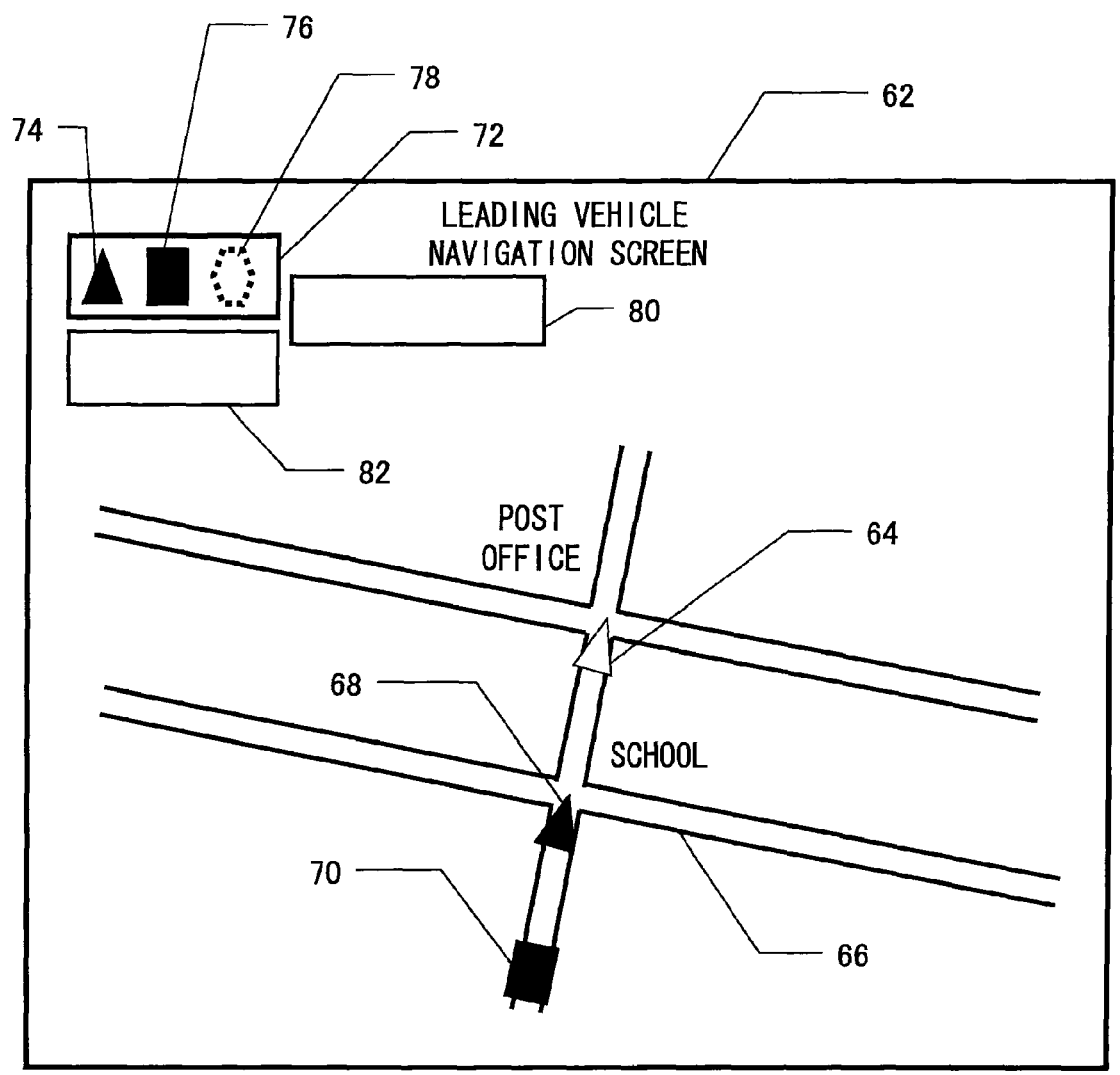
FIG. 5 is a diagram showing an example of a screen displayed when one's own vehicle is the leading vehicle.

FIG. 5 is a diagram showing an example of the "twin-navigation" screen displayed on the first display portion 16 shown in FIG. 1. The displaying of this screen is achieved by the processing for twin-navigation display in step S64 in FIG. 3. In the case shown in FIG. 5, the first vehicle 2 is the leading vehicle, and it is displayed on a map 66 on a display screen 62 by being indicated by a one's-own-vehicle symbol 64. In the case shown in FIG. 5, "twin-navigation" is accepted by a total of two following vehicles including the second vehicle 4, and these vehicles too are displayed simultaneously on the same map 66, with the second vehicle 4 indicated by a first-outside-vehicle symbol 68 and the third vehicle indicated by a second-outside-vehicle symbol 70.

A "twin-navigation" participant vehicle display area 72 is for displaying the vehicles that are currently participating in "twin-navigation"; there, the same symbols as those for the outside vehicles on the map are shown as a first-outside-vehicle-presence symbol 74 and a second-outside-vehicle-presence symbol 76. In a third outside vehicle presence display area 78 indicated by a broken line, no-outside-vehicle-presence symbol is displayed because no corresponding vehicle is currently present.

In a near-field communication-range-dead-zone display area 80, a "dead zone" caution or a "impossible to display" indication, for example the "beware dead zone" caution in step S62 in FIG. 3, is displayed whenever the corresponding situation arises. The significance of displaying a "dead zone" caution or an "impossible to display" indication will be described later. In the case shown in FIG. 5, no such situation is present, and therefore nothing is displayed in the near-field communication-range-dead-zone display area 80.

In a following vehicle condition display area 82, an indication is displayed when a situation arises that requires checking of whether or not a following vehicle is following properly. In the case shown in FIG. 5, no such situation is present, and therefore nothing is displayed there. What is displayed in the following vehicle condition display area 82 will be described later.

Figure 6:
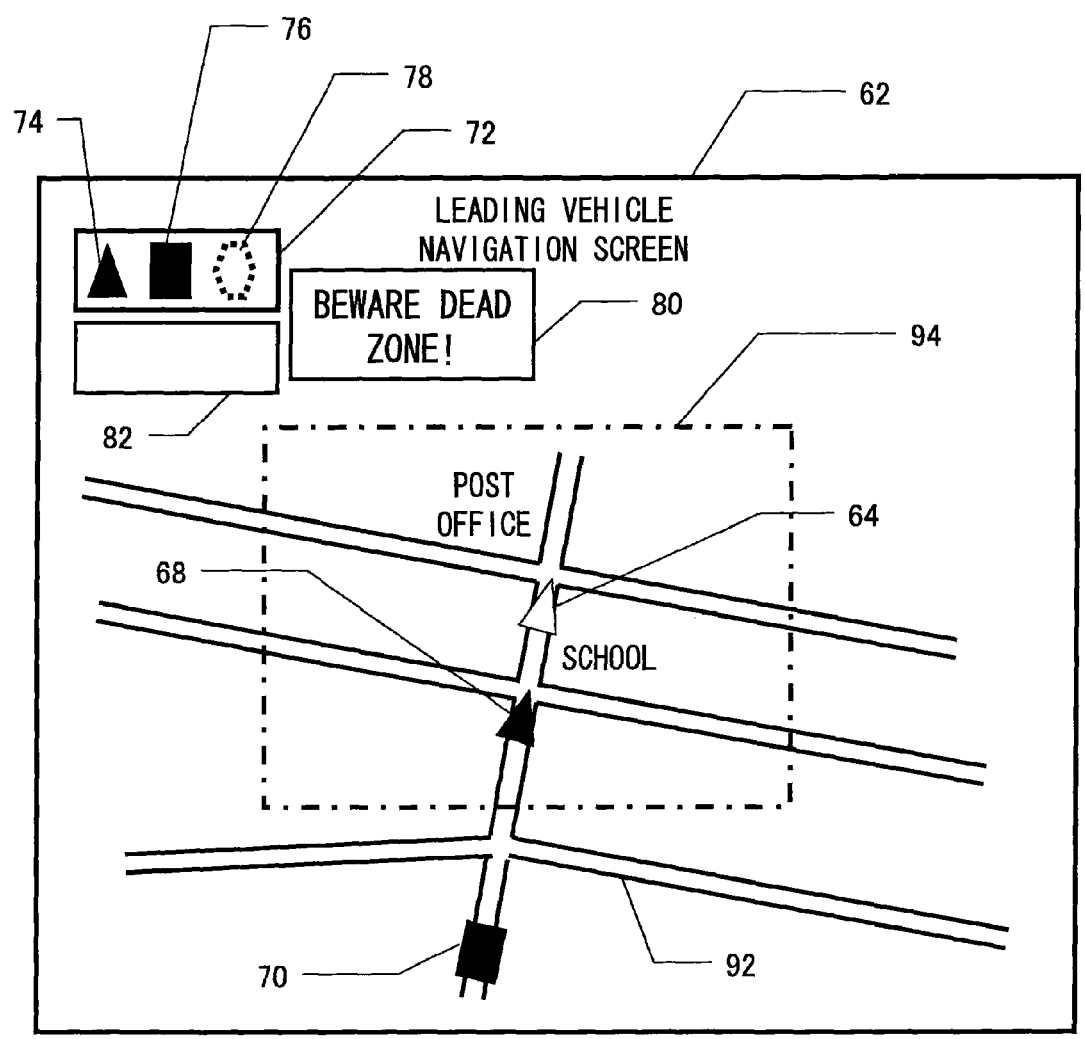
FIG. 6 is a diagram showing a screen displayed when a following vehicle has delayed and the map scale has been changed to a wider-area one.

FIG. 6 is a diagram showing what is displayed on the display screen 62 if the second outside vehicle is traveling farther behind than it is in FIG. 5. Here, it is assumed that one's own vehicle and the first outside vehicle are located at the same positions as in FIG. 5. In this case, if the map scale remains the same as in FIG. 5, the second outside vehicle falls out of the displayed range. To avoid this, in FIG. 6, the scale of the map 92 is automatically changed to a wider-area one than that of the map 66 in FIG. 5.

More specifically, the region 94 in FIG. 6 is the part where the map 66 is displayed in FIG. 5, and the second-outside-vehicle symbol 70 falls outside the region 94. Accordingly, in FIG. 6, the scale of the map is automatically changed so that the displayed range is widened to include the second-outside-vehicle symbol 70.

In the case shown in FIG. 6, it has been found, in step S60 in FIG. 3, that there is a risk of the second outside vehicle entering a dead zone of the near-field communication range and thus, in step S62, a caution of "beware dead zone" has been displayed in the near-field communication-range-dead-zone display area 80. In this state, however, the second outside vehicle is still in the near-field communication range. By contrast, if the second outside vehicle has entered a dead zone of the near-field communication range, what is displayed in the near-field communication-range-dead-zone display area 80 changes to "dead zone". Even in this case, the second-outside-vehicle symbol 70 is kept displayed by the near-field-communication-range-dead-zone processing in step S68 in FIG. 3.

In FIG. 6, as the map scale has been changed from that of FIG. 5, scrolling has been done so as to automatically change the center of the displayed map. In FIG. 6, scrolling has been done with respect to the one's-own-vehicle symbol 64 in such a way that, while consideration is given to keeping the second outside vehicle in the displayed range, the one's-own-vehicle symbol 64 is displayed as close to the center of the map as possible.

Figure 7:
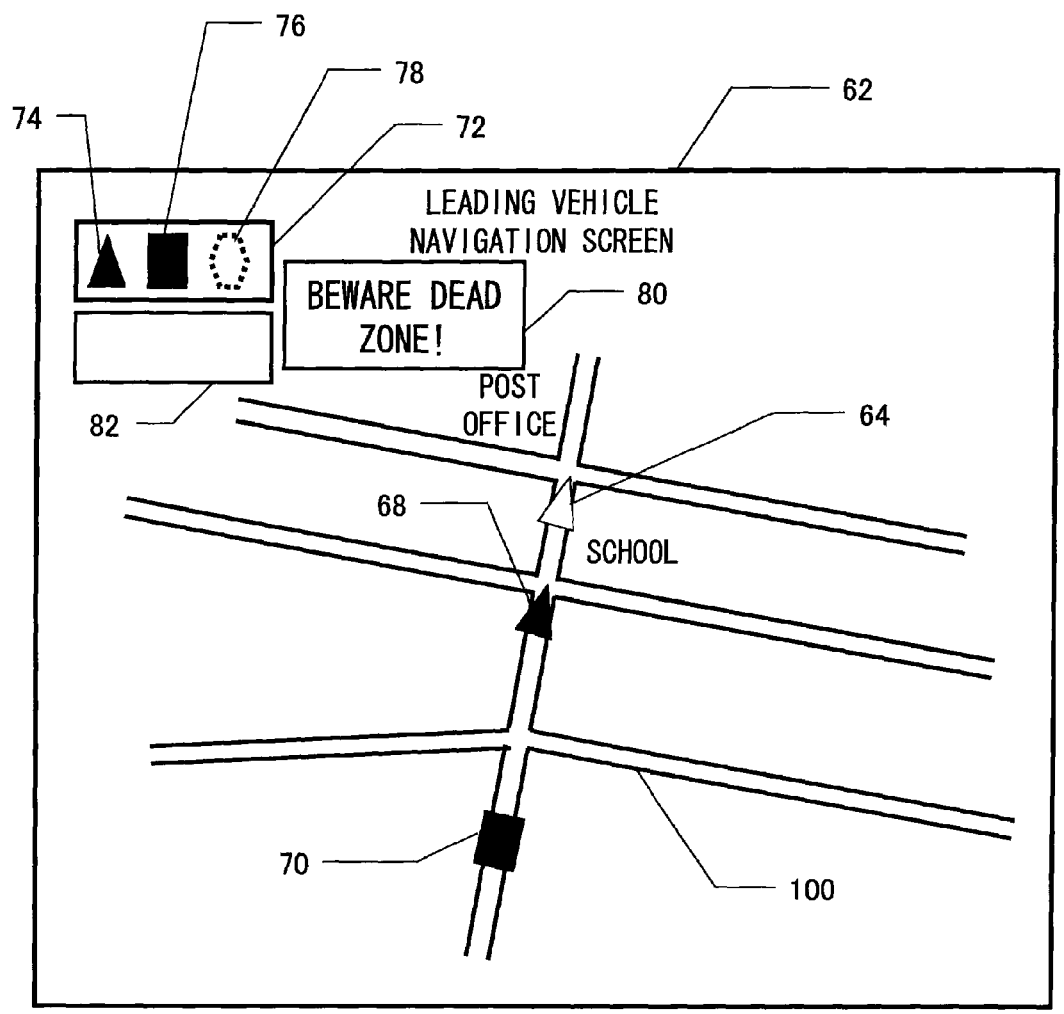
FIG. 7 is a diagram showing a screen displayed when automatic scrolling has been done so that the mid point among all the vehicles comes at the center of the map.

FIG. 7 shows the same state as FIG. 6 but there, as the map scale has been changed from that of FIG. 5, scrolling has been automatically done in such a way that the center of all the vehicles participating in "twin-navigation" comes at the center of the displayed map. Compared with FIG. 6, FIG. 7 has the entire map 100 shifted upward.

Whether to do automatic scrolling with respect to one's own vehicle as in FIG. 6 or with respect to the center of all the vehicles as in FIG. 7 can be freely set beforehand. Unless the driver expressly change the setting, automatic scrolling is done with respect to one's own vehicle as in FIG. 6.

Incidentally, the automatic scrolling with respect to one's own vehicle or with respect to the center of all the vehicles according to the above setting is done not only when the map scale is changed but all the time as one's own vehicle travels, even when the map scale remains unchanged.

Figure 8:
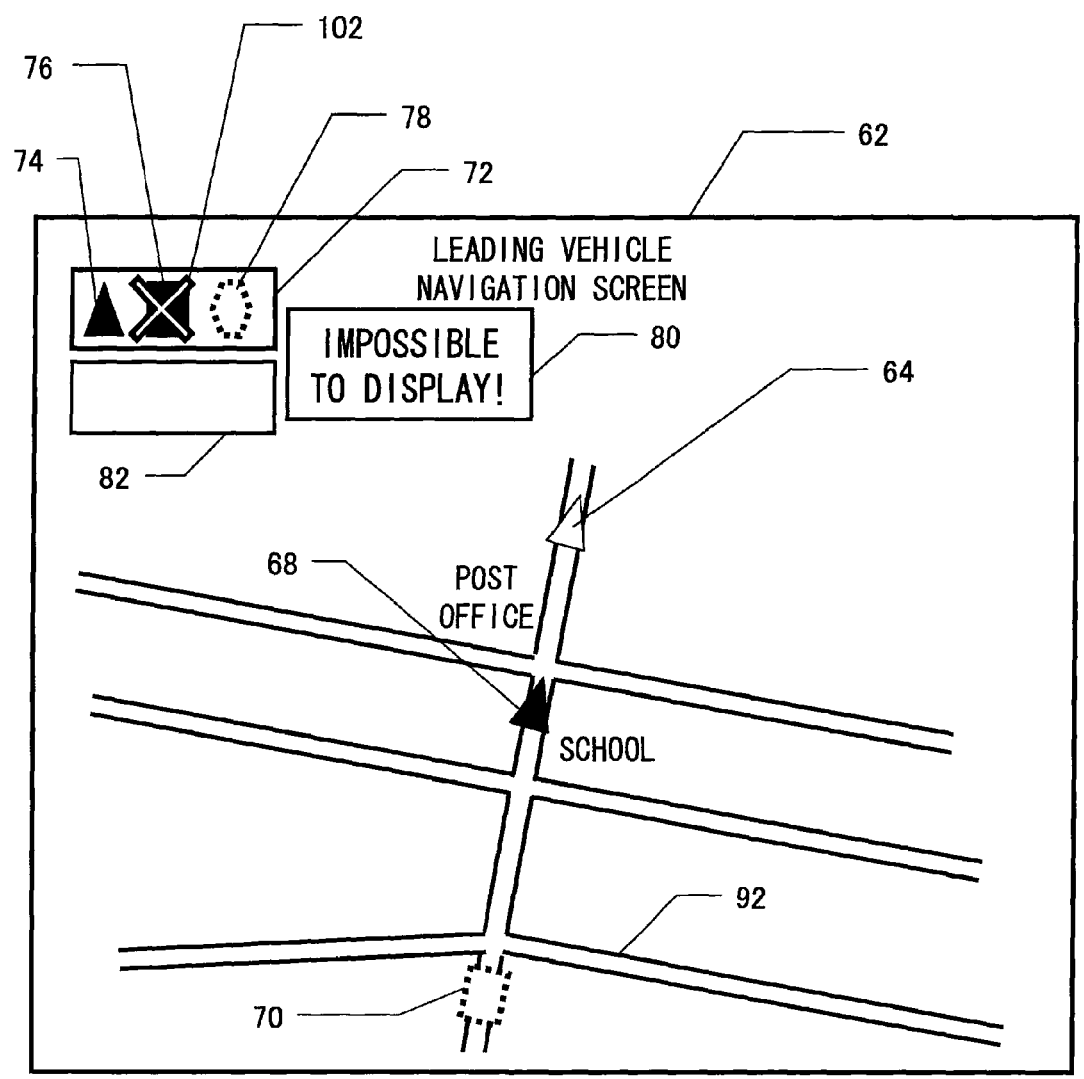
FIG. 8 is a diagram showing a screen displayed when a second outside vehicle can no longer be shown.

FIG. 8 shows what is displayed on the display screen 62 when, after the second outside vehicle lagged so far behind one's own vehicle as to be outside the near-field communication range, thus having entered a "dead zone", and as a result it no longer makes sense to keep the second outside vehicle displayed even by the near-field-communication-range-dead-zone processing in step S68 in FIG. 3. Now, what is displayed in the near-field communication-range-dead-zone display area 80 changes to "impossible to display". Moreover, to indicate the vehicle that became undisplayable, the second-outside-vehicle-presence symbol 76 in the "twin-navigation" participant vehicle display area 72 is marked with an impossible-to-display symbol 102. Moreover, the second-outside-vehicle symbol 70 ceases to be displayed on the map, and is thus excluded from what is displayed. This is because displaying an unreliable position of an outside vehicle would invite confusion.

Figure 9:
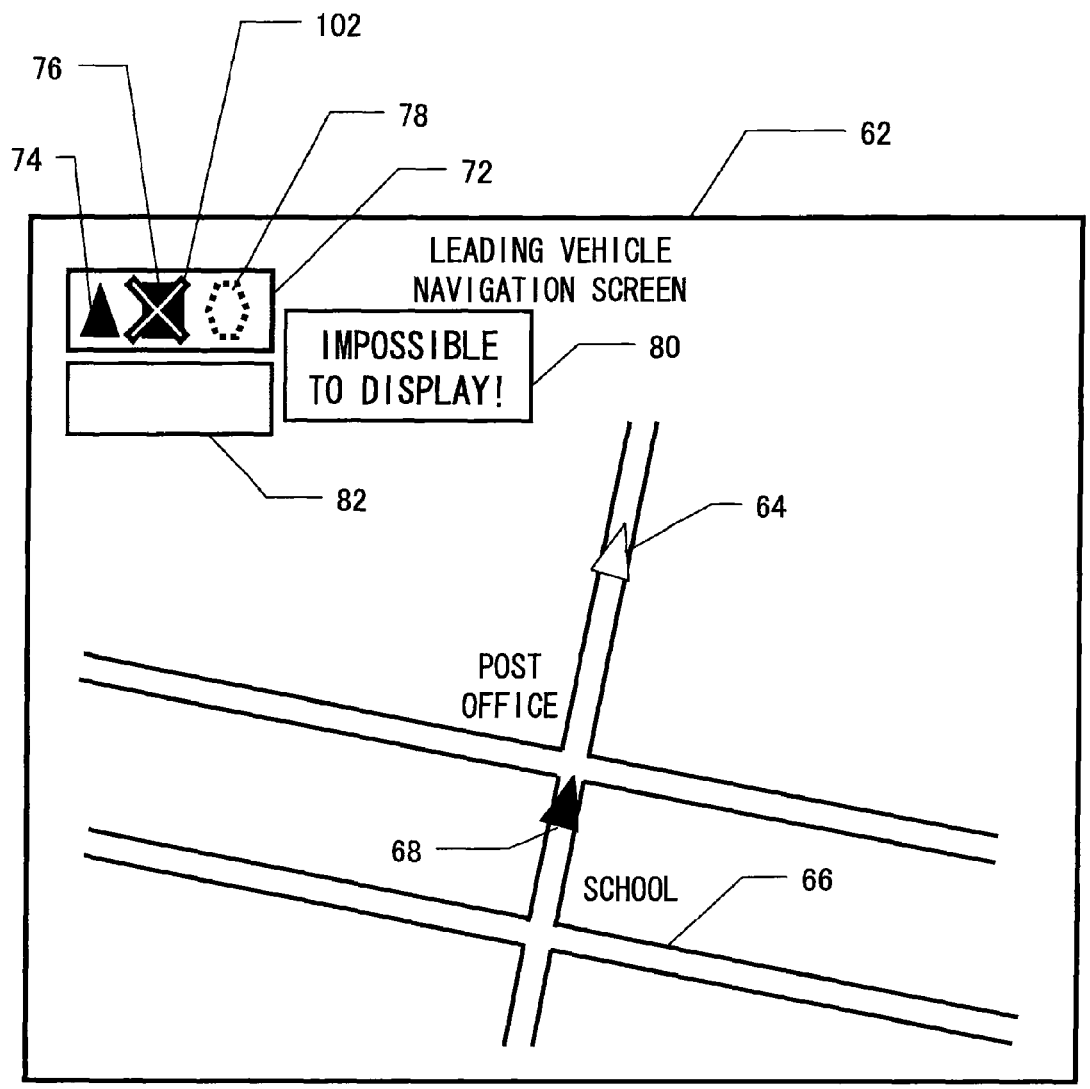
FIG. 9 is a diagram showing a screen displayed when the map scale has been automatically changed to a more-enlarged one.

Now that the second-outside-vehicle symbol 70 has ceased to be displayed as in FIG. 8, it is no longer necessary to display on a wide-area scale with consideration given to the second vehicle; thus, what is displayed changes as shown in FIG. 9. Specifically, in FIG. 9, the map scale has been automatically changed from that in FIG. 8 so that the map 66 is displayed on a more-enlarged scale. If the automatic changing of the map scale is disabled beforehand, even when the second-outside-vehicle symbol 70 ceases to be displayed, the map continues to be displayed on the same scale as in FIG. 8.

Figure 10:
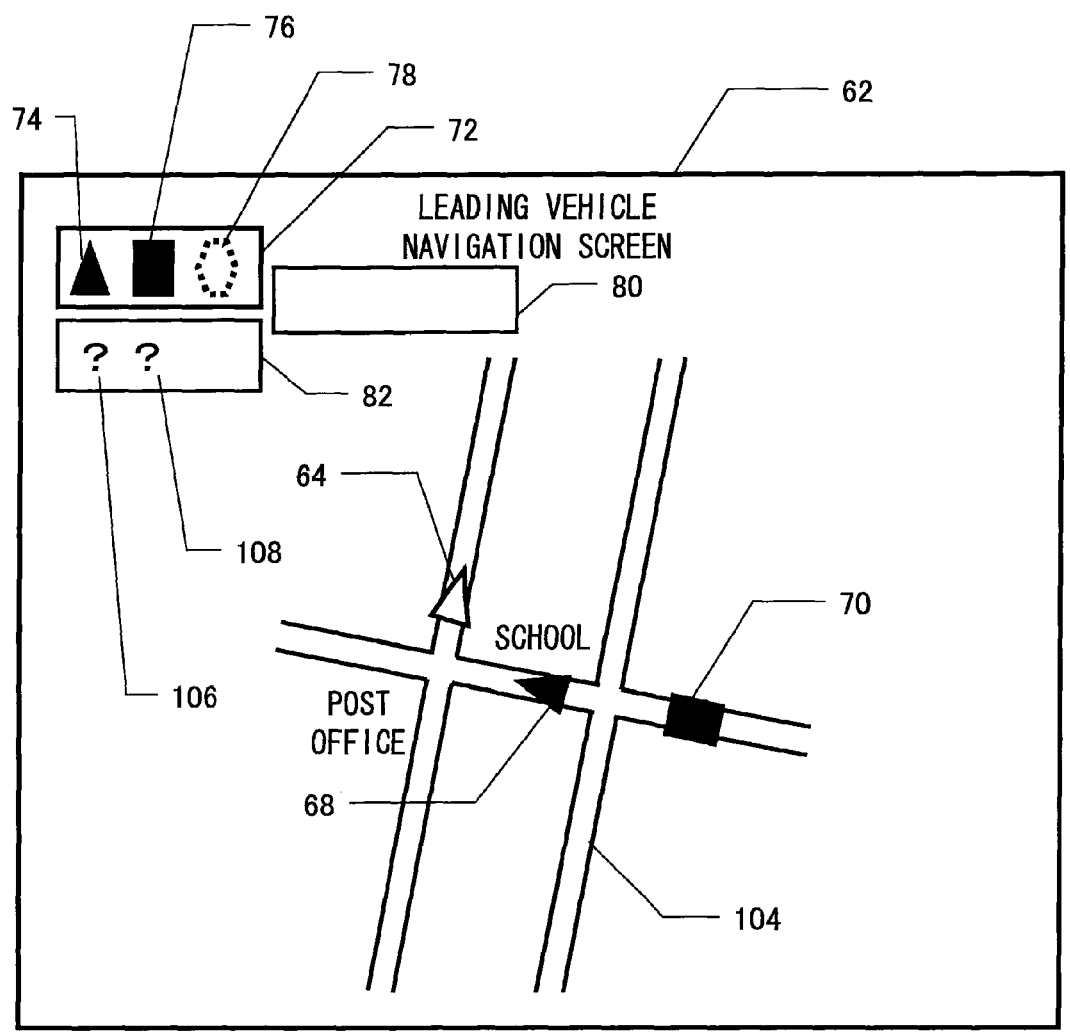
FIG. 10 is a diagram showing a screen displayed when one's own vehicle, which is the leading vehicle, has turned right.

FIG. 10 shows what is displayed on the display screen 62 when, from the state shown in FIG. 5, one's own vehicle, which is the leading vehicle, has turned right at the corner where a post office is located. In this case, the map 104 is rotated by 90 degrees with respect to the one's-own-vehicle symbol 64 so that its traveling direction points upward in what is displayed. Here, naturally, the traveling directions of the first-outside-vehicle symbol 68 and the second-outside-vehicle symbol 70, which have not yet turned right, do not point upward in the map. In this way, in a case involving a plurality of vehicles, the direction of the top of the map is determined based on the traveling direction of one's own vehicle all the time.

Incidentally, in a case where a setting is made such that north is displayed at the top of the map irrespective of the traveling directions of vehicles, the map is never rotated no matter in which directions one's own and outside vehicles are traveling.

Moreover, in FIG. 10, to allow the checking of whether or not the following vehicles, namely the second and third vehicles, follow by turning right, in the following vehicle condition display area 82, question marks "?" are displayed as a check-the-first-outside-vehicle symbol 106 and a check-the-first-outside-vehicle symbol 108 adjacent to the first-outside-vehicle-presence symbol 74 and the second-outside-vehicle-presense symbol 76 respectively.

Figure 11:
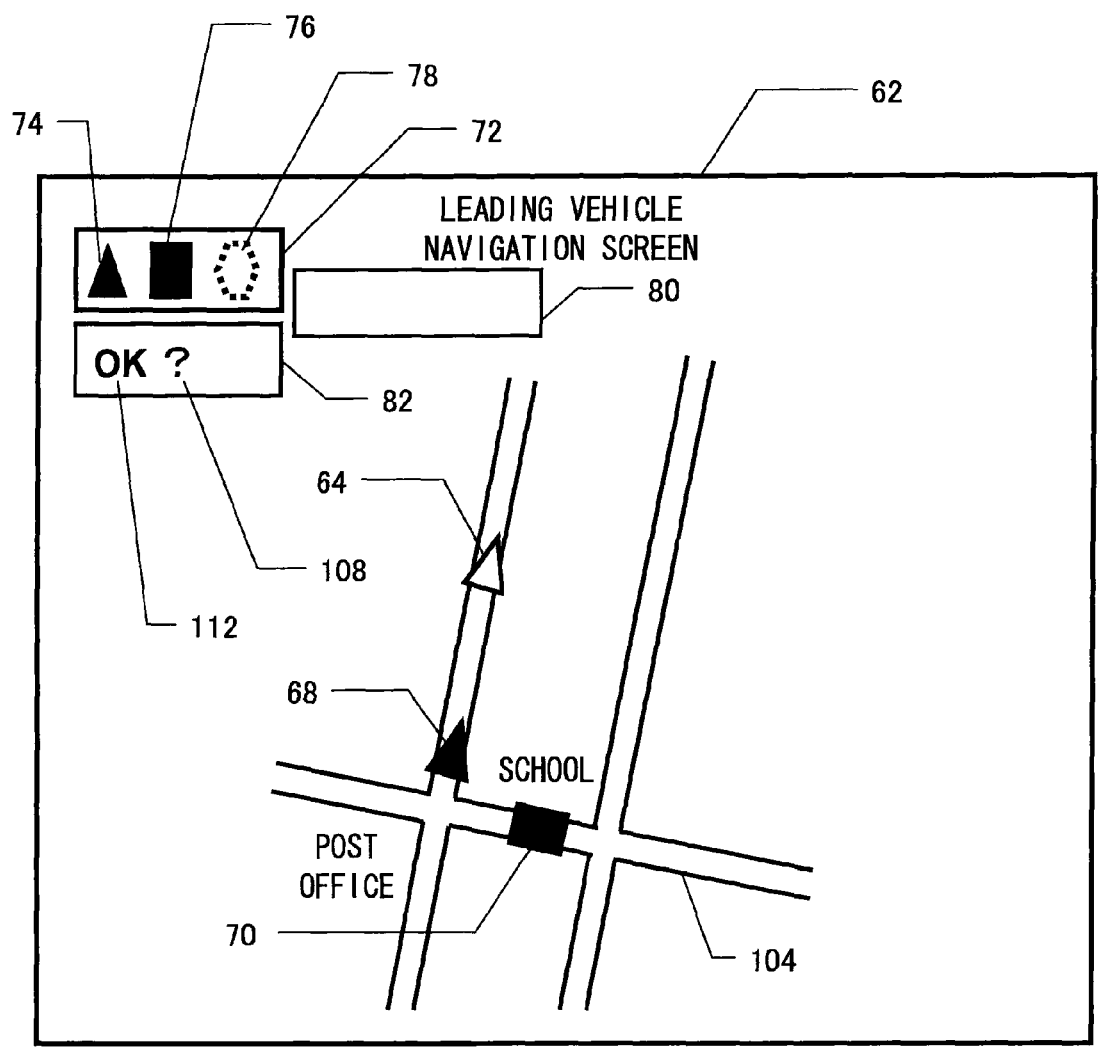
FIG. 11 is a diagram showing a screen displayed when the second vehicle, following the leading vehicle, has turned right.

FIG. 11 shows what is displayed on the display screen 62 when, from the state shown in FIG. 10, further time has passed, and meanwhile the second vehicle has followed properly by turning right. Now, the "check" symbol "?" displayed in following vehicle condition display area 82 in connection with the first-outside-vehicle-presence symbol 74 disappears and instead an "OK" mark is displayed as a first-outside-vehicle-confirmed symbol 112. This "OK" mark indicates simplified display, which will be described later.

Figure 12:
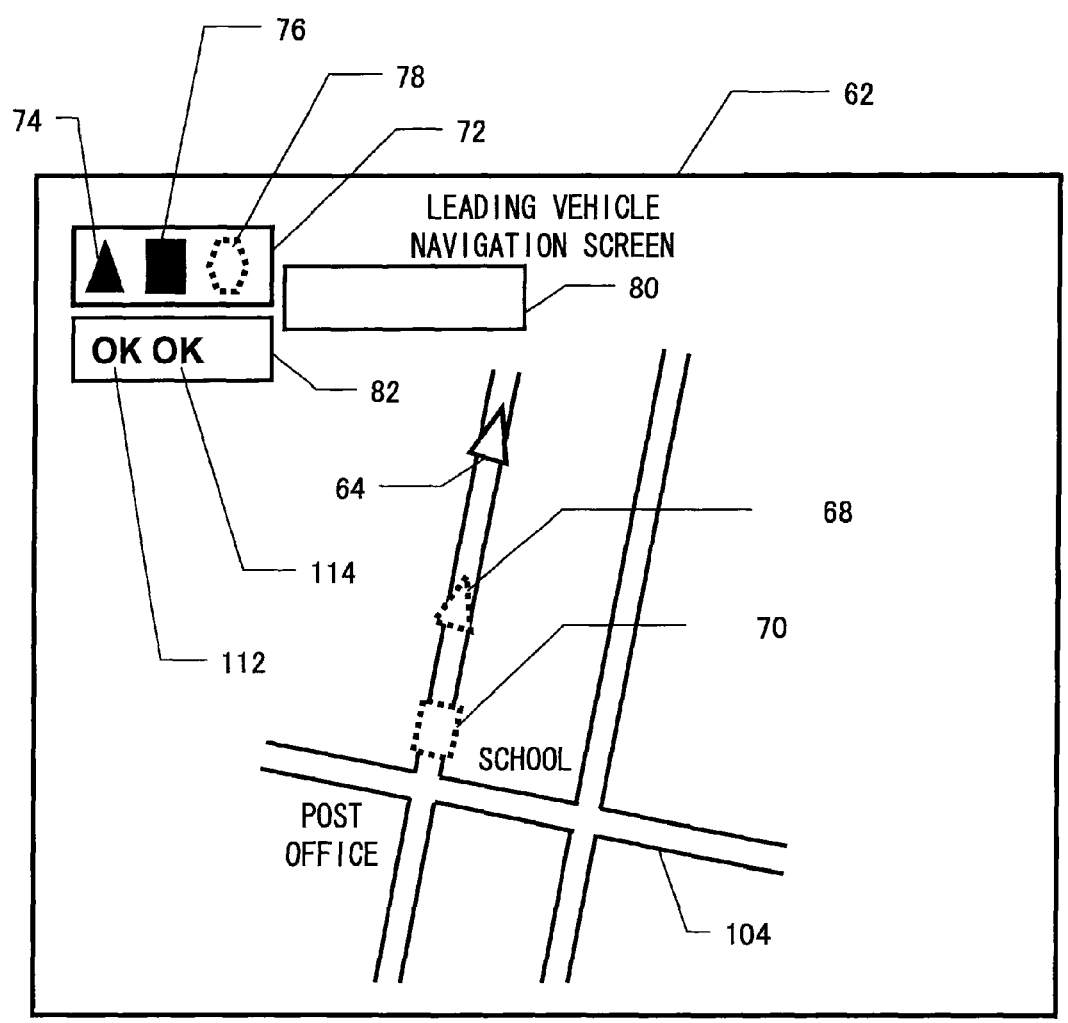
FIG. 12 is a diagram showing a screen displayed when all the following vehicles have turned right and they are omitted from the map to achieve simplified display.

FIG. 12 shows what is displayed on the display screen 62 when, from the state shown in FIG. 11, further time has passed, and meanwhile the third vehicle also has followed properly by turning right. Now, the symbol displayed in following vehicle condition display area 82 in connection with the second-outside-vehicle-presence symbol 76 also changes to an "OK" mark as a second-outside-vehicle-confirmed symbol 114, just like the first-outside-vehicle-confirmed symbol 112.

When, in this way, all the following vehicles are confirmed to have followed properly by turning right, their display is simplified, and the first-outside-vehicle symbol 68 and the second-outside-vehicle symbol 70 disappears from the map. The aim is to avoid the trouble of displaying following vehicles along with one's own vehicle in a situation that does not require checking of the following vehicles, as when the travel continues along a road for a while, and the following vehicles are omitted from display until a situation that requires their checking arises, as when one's own vehicle approaches a crossroads. Even when following vehicles are omitted from display on the map in this way, in the following vehicle condition display area 82, the "OK" marks as the first-outside-vehicle-confirmed symbol 112 and the second-outside-vehicle-confirmed symbol 114 continue to be displayed. Simplified display of following vehicles like this makes it possible to check whether or not they are following properly, though their positions themselves cannot be confirmed on the map.

If no such simplified display of following vehicles is set beforehand, irrespective of whether or not following vehicles need to be checked, the position of any displayable following vehicle is displayed on the map along with that of one's own vehicle all the time.

Figure 13:
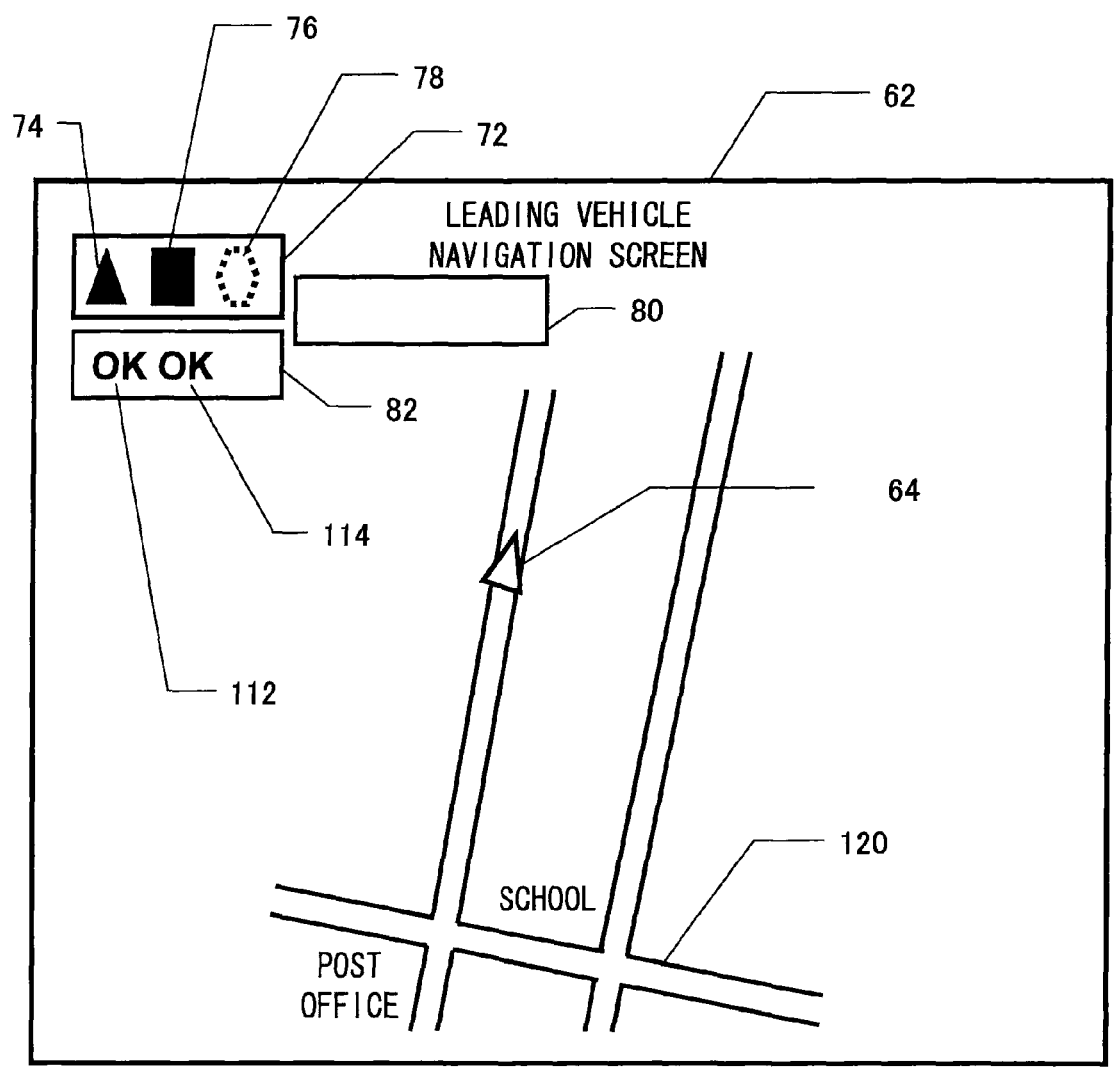
FIG. 13 is a diagram showing a screen displayed when, in the simplified display with the following vehicles omitted, automatic scrolling has been done with respect to one's own vehicle.

FIG. 13 shows what is displayed on the display screen 62 when simplified display of the following vehicles is started as shown in FIG. 12 and it becomes unnecessary to display them on the map. In FIG. 12, the map 104 is scrolled with consideration given to displaying all the vehicles on the map; by contrast, in FIG. 13, the map 120 is scrolled with respect to one's own vehicle alone. Specifically, in a case where one's own vehicle is the leading vehicle, scrolling is done in such a way that the one's-own-vehicle symbol 64 is displayed at a lower position on the screen in FIG. 13 than in FIG. 12.

In a case where one's own vehicle alone is displayed as in FIG. 13, scrolling may be done in such a way that the one's-own-vehicle symbol 64 is displayed further down on the display screen 62 so that precedence given is to information ahead as in ordinary navigation. In "twin-navigation", however, to be ready to cope with a situation where it is necessary to display following vehicles, scrolling is done in such a way that appropriate map space is secured behind one's own vehicle as in FIG. 13. In this way, even in a case where one's own vehicle alone is displayed on the map, scrolling of the map is controlled to display the one's-own-vehicle symbol 64 at different positions between in ordinary navigation and in "twin-navigation".

Figure 14:
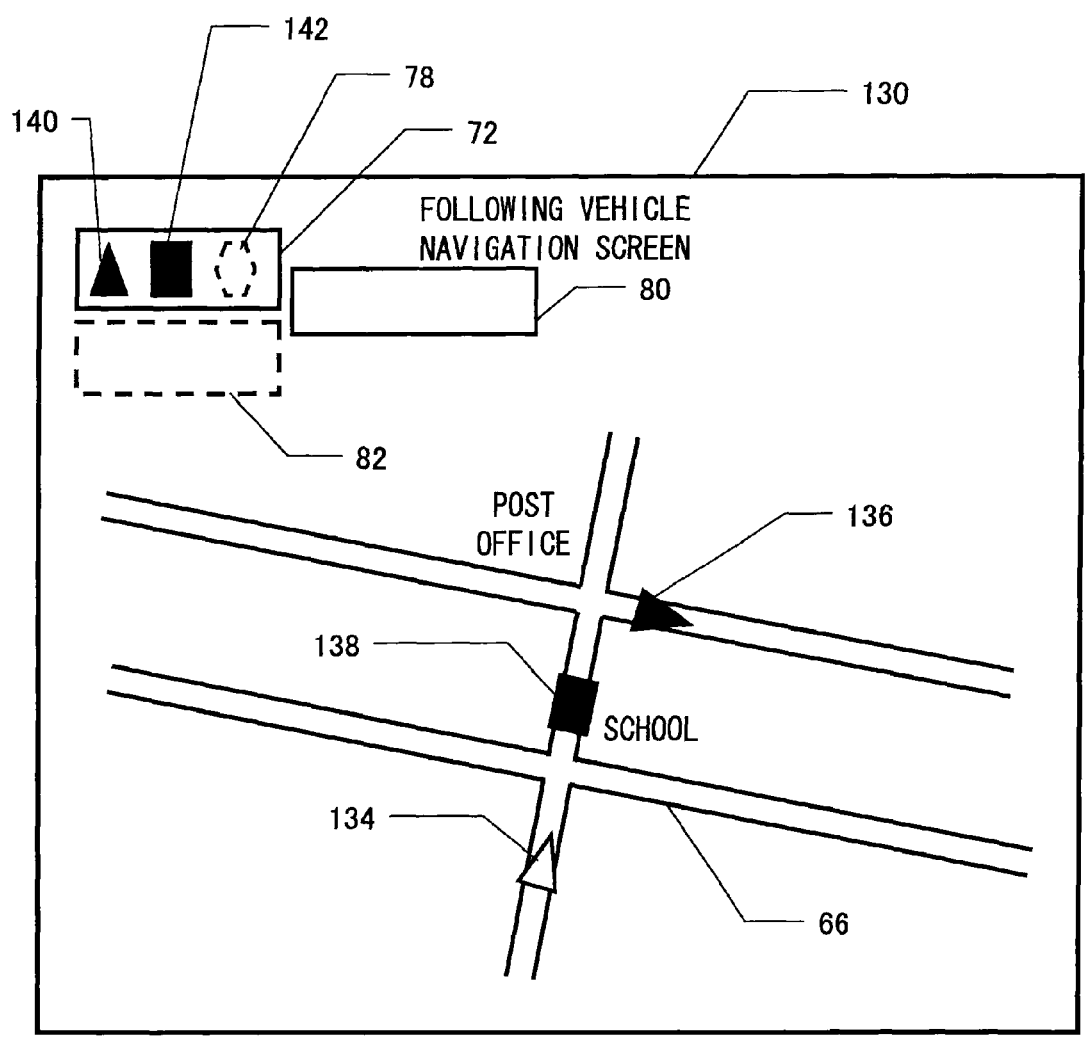
FIG. 14 is a diagram showing a screen displayed in the third vehicle when the vehicles are located as shown in FIG. 10.

FIG. 14 shows a screen 130 displayed in the third vehicle when the vehicles are located as shown in FIG. 10. In FIG. 14, a one's-own-vehicle symbol 134 is displayed at the tail, following a first-outside-vehicle symbol 136 and a second-outside-vehicle symbol 138. That is, in FIG. 14, the first outside vehicle is the leading vehicle, and it turns right at the corner where a post office is located as in FIG. 10. Correspondingly, in the "twin-navigation" participant vehicle display area 72, the same symbols as those on the map are displayed as a first-outside-vehicle-presence symbol 140 and a second-outside-vehicle-presence symbol 142 are displayed. Also in FIG. 14, in the third outside vehicle presence display area 78 indicated by a broken line, no-outside-vehicle-presence symbol is displayed because no corresponding vehicle is currently present.

In FIG. 14, one's own vehicle has not yet turned right at the corner where the post office is located, and thus the map 66 is still in a state similar to that of FIG. 5 and is not rotated by 90 degrees as FIG. 10. In this way, in "twin-navigation", in which the symbols of a plurality of vehicles are displayed on the map simultaneously, irrespective of whether one's own vehicle is the leading vehicle or a following vehicle, and irrespective of the direction of an outside vehicle, the direction of the top of the map is determined based on the traveling direction of one's own vehicle all the time.

Moreover, when one's own vehicle is followed by no following vehicle, no consideration needs to be given to a following vehicle. Accordingly, the following vehicle condition display area 82 is not displayed on the display screen 130.

Figure 15:
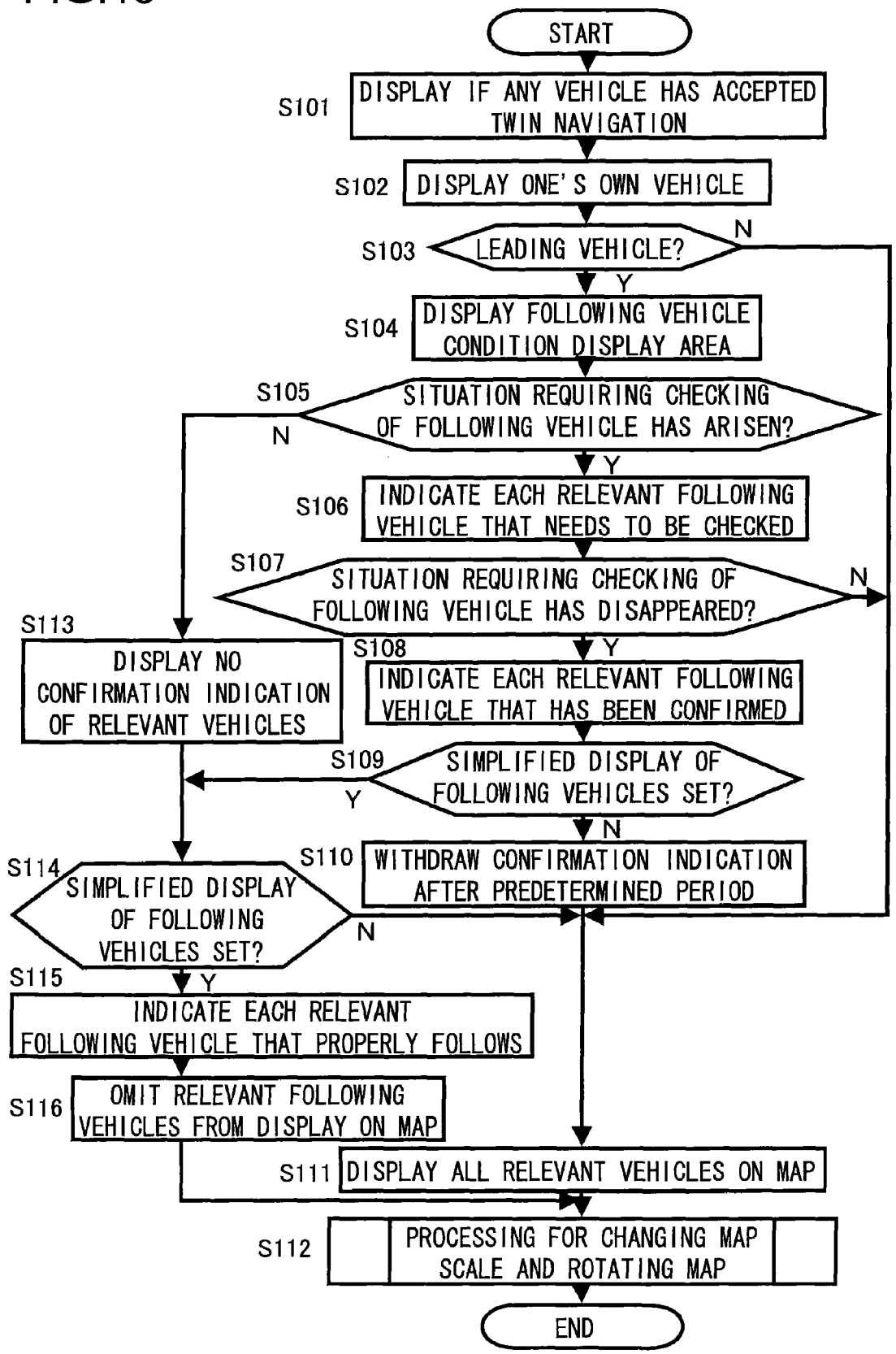
FIG. 15 is a flow chart showing the details of step S64 in FIG. 3.

FIG. 15 is a flow chart showing the details of the "twin-navigation" display processing in step S64 in FIG. 3, which is performed to achieve the display that has been described with reference to FIGS. 5 to 14. When the flow starts, in step S101, whether or not there is a vehicle that has accepted "twin-navigation" is displayed. This corresponds to displaying the relevant symbols in the twin-navigation participant vehicle display area 72 shown in FIG. 5 etc. Next, in step S102, one's own vehicle is displayed on the map. This corresponds to displaying the one's-own-vehicle symbol 64 in FIG. 5 or the one's-own-vehicle symbol 134 in FIG. 14 on the map 66 etc.

Next, in step S103, whether or not one's own vehicle is the leading vehicle is checked, and, if it is, then in step S104, a following vehicle condition display area is displayed. This corresponds to displaying the following vehicle condition display area 82 in FIG. 5 etc. Then, in step S105, whether or not a situation that requires checking of a following vehicle has arisen is checked. This corresponds to a situation where a following vehicle has alternative routes as at a crossroads, as when one's own vehicle has turned right in FIG. 10. Whether such a situation has arisen or not is judged based on map information and information on the position of one's own vehicle.

If, in step S105, a situation that requires checking of a following vehicle has arisen, then, in step S106, for each relevant vehicle that needs to be checked, an indication to that effect is displayed. This corresponds to displaying "?" marks as the check-the-first-outside-vehicle symbol 106 and the check-the-second-outside-vehicle symbol 108 in FIG. 10.

Next, in step S107, whether or not the situation that requires checking of a following vehicle has disappeared is checked, and, if it has, then, in step S108, for each relevant vehicle, an indication confirming that it is following properly is displayed. This corresponds to displaying an "OK" mark in place of a "?" mark in the following vehicle condition display area 82 in FIG. 11 etc.

Next, while the confirmation indication for each relevant vehicle is displayed, in step S109, whether or not simplified display of following vehicles is set beforehand is checked. If it is not found that such a setting is made, then, in step S110, the confirmation indication for each relevant vehicle is withdrawn after a predetermined period, and the flow then proceeds to step S111.

In step S111, all the displayable vehicles participating in "twin-navigation" are displayed on the map along with one's own vehicle. Then, in step S112, the map scale is changed and the map is rotated, and then the flow ends. At the end of the flow in FIG. 15, a return is made to step S52 in FIG. 3. Thus, so long as "twin-navigation" is possible by near-field communication, steps S52 to S62 are gone through, and then a jump is made to the start of the flow in FIG. 15, so that the flow in FIG. 15 is repeated. The details of step S112 above will be described later.

If, in step S103 in FIG. 15, one's own vehicle is not the leading vehicle, the flow proceeds directly to step S111 to display all the relevant vehicles on the map, and then proceeds to step S112 to change the map scale and rotate the map. Also if, in step S107, the situation that requires checking of a following vehicle continues, the flow proceeds directly to step S111. In this case, the confirmation indication for each relevant vehicle started in step S106 continues to be displayed.

If, in step S105, no situation that requires checking of a following vehicle has arisen, the flow proceeds to step S113, and thus no confirmation indication for a relevant vehicle is displayed. This corresponds to the state in which nothing is displayed in the following vehicle condition display area 82 in FIG. 5 etc. Then, in step S114, whether or not simplified display of following vehicles is set beforehand is checked. If it is not found that such a setting is made, the flow then proceeds to step S111.

By contrast, if, in step S114, it is found that simplified display of following vehicles is set, the flow then proceeds to step S115 to display, for each relevant vehicle, an indication that it is following properly. Here, the same indication as displayed in step S108 is displayed. Specifically, the "OK" marks displayed there as the first-outside-vehicle-confirmed symbol 112 and the second-outside-vehicle-confirmed symbol 114 in the following vehicle condition display area 82 are displayed also here. This is because what is important to the driver is whether or not following vehicles are currently following properly and not whether or not situations requiring their checking have ever arisen. As necessary, different indications may be displayed for confirmation of proper following between in step S108 and in step S115.

Next, in step S116, the display of the relevant following vehicles on the map is simplified. This corresponds to the disappearance of the first-outside-vehicle symbol 68 and the second-outside-vehicle symbol 70 from the map in FIGS. 12 and 13. Thereafter, the flow proceeds to step S112 to change the map scale and rotate the map.

If, in step S109, it is found that simplified display of following vehicles is set, the flow proceeds to step S114. In this case, the flow unconditionally proceeds from step S114 to step S115.

If, in step S114, it is not found that simplified display of following vehicles is set, the flow proceeds to step S111.

Figure 16:
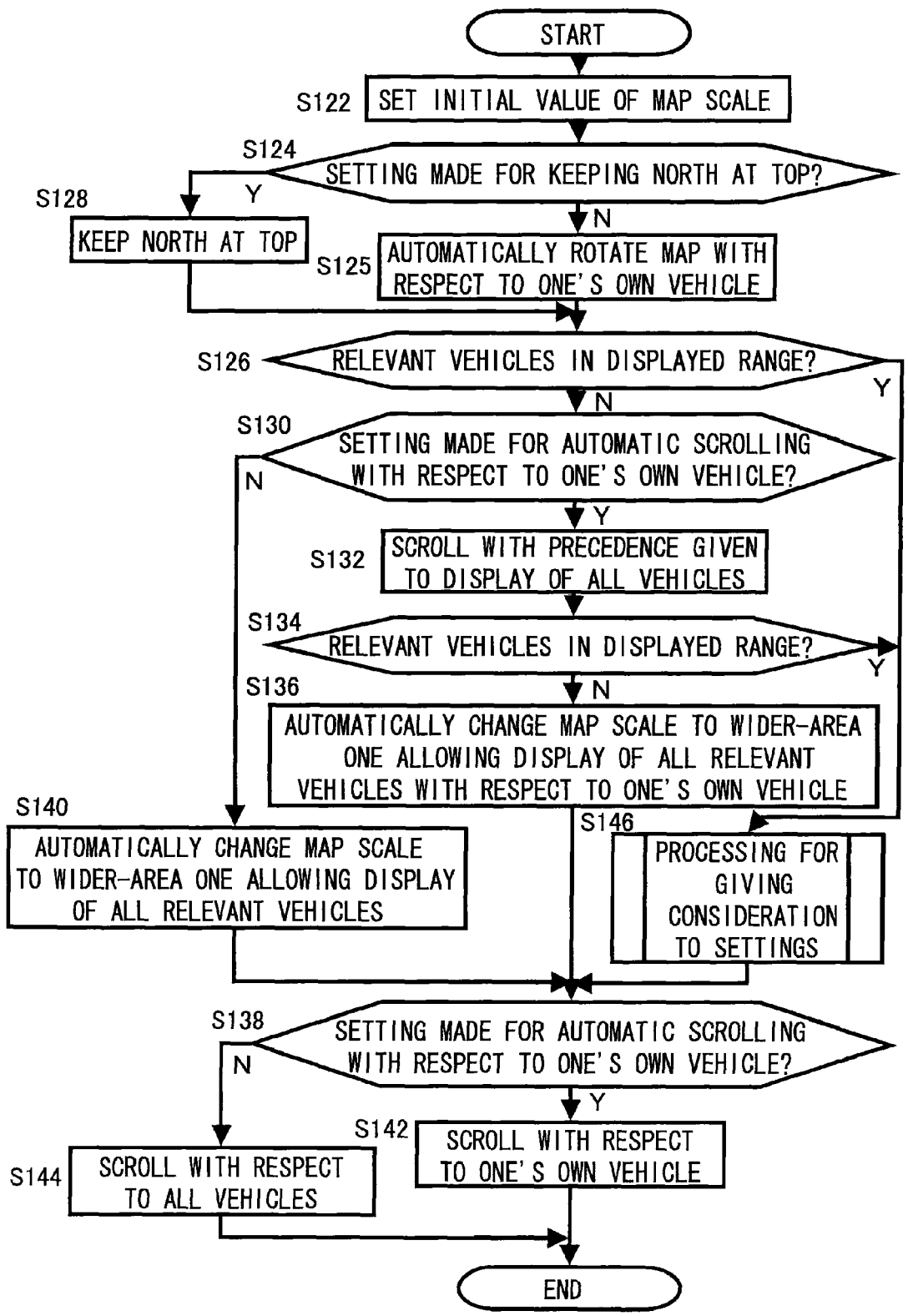
FIG. 16 is a flow chart showing the details of step S112 in FIG. 15.

FIG. 16 is a flow chart showing the details of the processing for changing the map scale and rotating the map in step S112 in FIG. 15. When the flow starts, in step S122, the initial value of the map scale is set. Set as the initial value here is, if "twin-navigation" has already been started, the current map scale. If "twin-navigation" is newly started here, a map scale set by the driver is set. In this case, if no setting is made expressly, the map scale set by default is set. Then, in step S124, whether or not a setting for keeping north displayed at the top of the map irrespective of the traveling direction of the vehicle is made is checked.

If it is not found that any setting is made expressly, the flow automatically proceeds to step S125 by default. In step S125, the map is automatically rotated with respect to one's own vehicle so that, with a plurality of vehicles displayed on the map, the traveling direction of one's own vehicle keeps pointing to the top of the map, and the flow then proceeds to step S126. The processing in step S125 corresponds to turning the map by 90 degrees as one's own vehicle turns right, from the state shown in FIG. 5 to that shown in FIG. 10, and turning the map by 90 degrees according to whether or not one's own vehicle is the leading vehicle in FIGS. 10 and 14.

By contrast, if, in step S124, it is found that a setting for keeping north displayed at the top of the map is made beforehand by the driver, then, in step S128, north is kept placed at the top of the map, and the flow then proceeds to step S126.

In step S126, whether or not all the relevant vehicles displayable in "twin-navigation" fall within the displayed range on the map scale set in step S122 is checked. If there is any vehicle that falls outside the displayed range, the flow proceeds to step S130 to check whether or not automatic scrolling with respect to one's own vehicle is set.

If, in step S130, it is found that automatic scrolling with respect to one's own vehicle is set, the flow proceeds to step S132 to scroll the map with precedence given to the display of all the vehicles. This is because, in a case where the leading vehicle is doing automatic scrolling with respect to itself, which leaves small space behind, scrolling the map in such a way that one's own vehicle is displayed further up may make it possible to display the following vehicles without changing the map scale to a wider-area one.

After the above scrolling, in step S134, it is checked once again whether or not all the displayable relevant vehicles fall within the displayed range. Then, if even the scrolling has failed to bring all the vehicles in the displayed range, the flow proceeds so step S136 to automatically change the map scale to one that permits the display of all the vehicles with consideration given to one's own vehicle as the point of reference, and the flow then proceeds to step S138.

By contrast, if, in step S130, automatic scrolling with respect to one's own vehicle is not set, scrolling has already been tried so that all the vehicles are displayed most efficiently, and therefore no further scrolling can bring all the vehicles in the displayed range; thus, the flow proceeds to step S140. In step S140, the map scale is automatically changed to a wider-area one that can display all the relevant vehicles most efficiently, and the flow then proceeds to step S138. Usually, the map scale determined in step S136 is a wider-area one than that determined in step S140.

If, in step S126, all the vehicles are in the displayed range, then, in step S146, processing for giving consideration to the settings is performed, and the flow then proceeds to step S138. The processing in step S146 is performed, when the vehicle-to-vehicle distance between the leading vehicle and the vehicle following at the tail has become so small that all the vehicles now fall in the displayed range, to automatically change the map scale to enlarge the map with consideration given to the initial settings.

Specifically, first, whether or not all the vehicles fall in the displayed range on a one step enlarged map scale is checked, and, if so, the map is automatically enlarged. This is then repeated so long as enlargement is possible; that is, enlargement is automatically repeated until further enlargement would change the map scale to one that makes impossible to display all the vehicles or to the one set by the driver. As in changing the map scale to a wider-area one, the judgments of whether or not all the vehicles can be displayed and whether or not to adopt a particular map scale are made differently according to whether or not automatic scrolling with respect to one's own vehicle is set. Also in this case, wider-area map scales are more likely to be adopted when automatic scrolling with respect to one's own vehicle is set than when not.

In the above processing, when the flow proceeds from step S126 to step S138, the initial values set in step S122 may eventually remain unchanged, and thus the map scale may remain unchanged. It is rather normal that the map scale remains unchanged while all the vehicles are traveling stably in "twin-navigation".

In step S138, whether or not automatic scrolling with respect to one's own vehicle is set is checked. If it is found that automatic scrolling with respect to one's own vehicle is set, the flow proceeds to step S142 to do automatic scrolling with respect to one's own vehicle, and the flow then ends. By contrast, if, in step S138, it is not found that automatic scrolling with respect to one's own vehicle is set, the flow proceeds to step S144 to do automatic scrolling with respect to all the vehicles, and the flow then ends. The difference between the automatic scrolling done in steps S142 and S144 corresponds to the difference between what is displayed in FIGS. 6 and 7.

Figure 17:
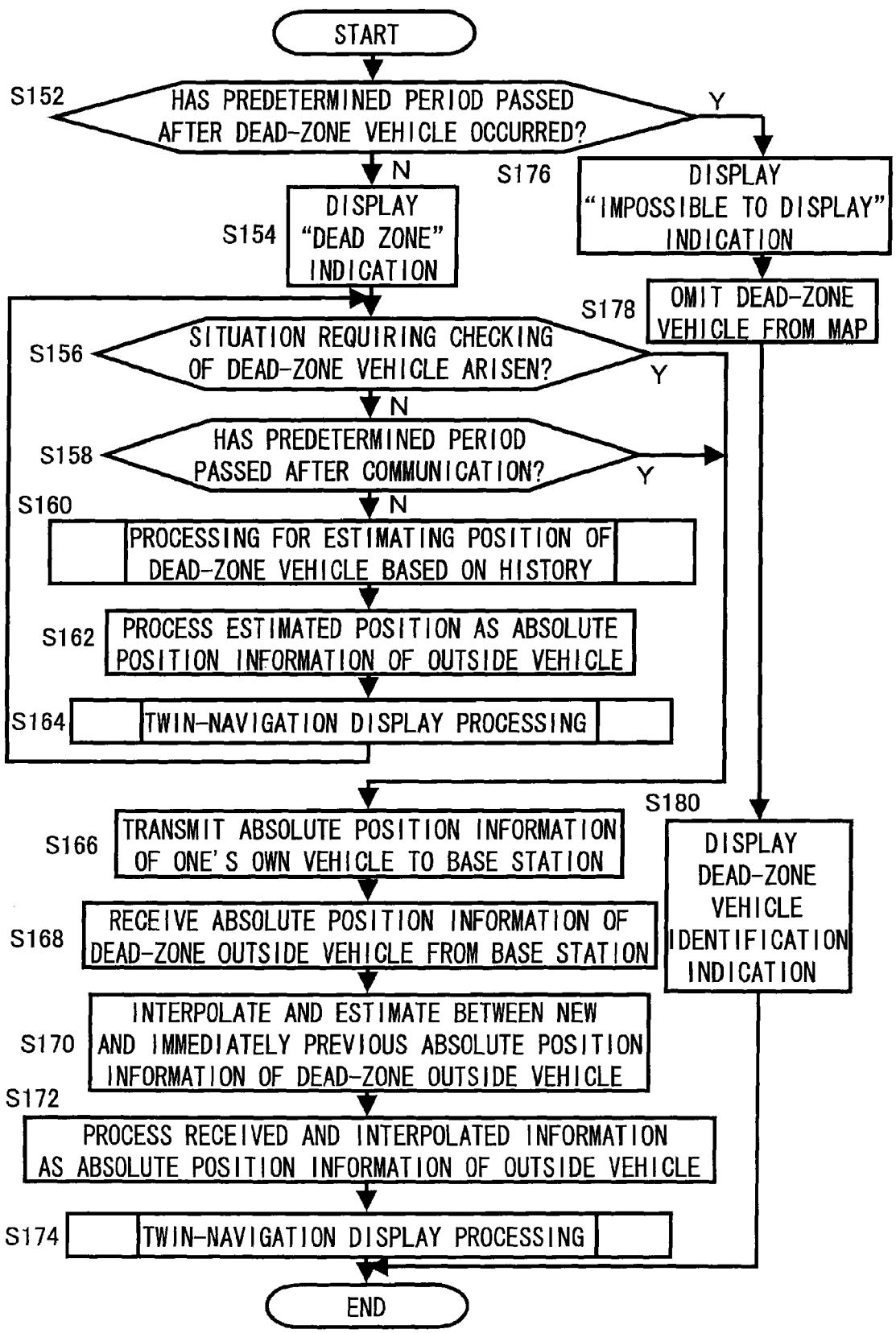
FIG. 17 is a flow chart showing the details of step S68 in FIG. 3.

FIG. 17 is a flow chart showing the details of the near-field-communication-range-dead-zone processing in step S68 in FIG. 3. When the flow starts, in step S152, whether or not a predetermined period has passed after a dead-zone vehicle occurred is checked. If the predetermined period has not yet passed, then, in step S154, a "dead zone" indication is displayed. This corresponds to the change, from "beware dead zone" to "dead zone", of the caution displayed in the near-field communication-range-dead-zone display area 80 in FIGS. 6 and 7.

Next, in step S156, whether or not a situation that requires checking of a dead-zone vehicle has arisen is checked. A situation that requires checking of a dead-zone vehicle is one in which a following vehicle has alternative routes as when one's own vehicle has passed a crossroads. Whether such a situation has arisen or not is judged based on map information and information on the position of one's own vehicle. If no such situation has arisen, then, in step S158, whether or not a predetermined period has passed after the absolute position information of a dead-zone vehicle was acquired by communication is checked. The communication here includes both that conducted by the first telephone communication portion 24 and that conducted by the first near-field communication portion 26.

If the latter predetermined period has not yet passed, then, in step S160, processing for history-based estimation of the position of a dead-zone vehicle is performed. Through this processing, based on a history of a plurality of pieces of absolute position information received and accumulated in the past and their respective times, the current absolute position of a dead-zone vehicle is estimated. Here, the speed information of the dead-zone vehicle at the time that the most recently received absolute position information occurred is also used complimentarily.

In step S162, processing is performed so that the thus estimated absolute position information is handled just as absolute position information actually acquired from the GPS portion of outside vehicle, and then, in step S164, twin-navigation display processing is started. Step S164 is the same as step S64 in FIG. 3, and what is performed there is as shown in FIG. 15. When the processing in step S164 is completed, the flow returns to step S156, and thereafter, unless a situation requiring checking of a dead-zone vehicle arises in step S156 or the predetermined period passes after communication in step S158, steps S156 to S164 are repeated.

If a situation requiring checking of a dead-zone vehicle arises in step S156 or the predetermined period passes after communication in step S158, then, in step S166, the absolute position information of one's own vehicle is automatically transmitted from the first telephone communication portion 24 to the base station telephone communication portion 52, for use by dead-zone vehicles.

Moreover, in step S166, a signal requesting a specified dead-zone vehicle to transmit its absolute position information to the base station telephone communication portion 52 is automatically transmitted. The car navigation base station 6 then automatically forwards the request signal to the specified dead-zone vehicle. In response, the dead-zone vehicle automatically transmits its absolute position information to the base station telephone communication portion 52, and it is stored in the base station storage portion 50.

In step S168, the absolute position information of the specified dead-zone vehicle is automatically received from the base station telephone communication portion 52. Next, in step S170, based on the absolute position information of the dead-zone vehicle received immediately before and the absolute position information received this time, the two pieces of information are interpolated, and information estimated for the future is created. Since communication by the telephone communication portion is chargeable, it is conducted less frequently than near-field communication, which is free. Step S170 serves to create absolute position information apparently as frequently as by near-field communication.

Furthermore, in step S172, processing is performed so that the thus interpolated and estimated absolute position information is handled just as absolute position information actually acquired from the GPS portion of an outside vehicle, and then, in step S174, twin-navigation display processing is started. Step S174 is the same as step S64 in FIG. 3, and what is performed there is as shown in FIG. 15. When the processing in step S174 is completed, the flow ends, and a return is made to step S70 in FIG. 3.

The reason that the jump is made from step S156 to step S166 in the above flow is that, when a situation requiring checking of a dead-zone vehicle has arisen, there are a plurality of alternatives and therefore it is impossible to estimate an absolute position based on a history. On the other hand, the reason that the jump is made from step S158 to step S166 is that, when the predetermined period has passed after the most recent communication, an estimation can no longer be made with satisfactory reliability. When in this way it becomes inappropriate to estimate the absolute position of a dead-zone vehicle, the flow proceeds to step S166, where the telephone communication portion acquires the absolute position information of the dead-zone vehicle directly from it.

If, in step S152, the predetermined period has passed after a dead-zone vehicle occurred, then, in step S176, an indication of "impossible to display" is displayed. Then, in step S178, the display of the relevant dead-zone vehicle is omitted from the map. Then, in step S108, an indication to identify the dead-zone vehicle is displayed, and the flow then proceeds to step S174.

The processing from step S176 to step S180 above corresponds to, in FIGS. 8 and 9, displaying an "impossible to display" indication in the near-field communication-range-dead-zone display area 80, putting an impossible-to-display symbol 102 to the second-outside-vehicle-presence symbol 76 in the "twin-navigation" participant vehicle display area 72, and omitting the display of the second-outside-vehicle symbol 70 from the map.

This processing has the following significance: once, in step S152, the predetermined period has passed after a dead-zone vehicle occurred, continuing "twin-navigation" thereafter would keep the absolute position information of an outside vehicle being acquired by chargeable communication by the telephone communication portion, and this can be avoided by excluding the relevant vehicle from "twin-navigation".

While the flow shown in FIG. 17 is in progress, whether or not any outside vehicle has come back into the near-field communication range is constantly checked so that, if any has, an interrupt occurs and a jump is made to step S54 in FIG. 3.

Figure 18:
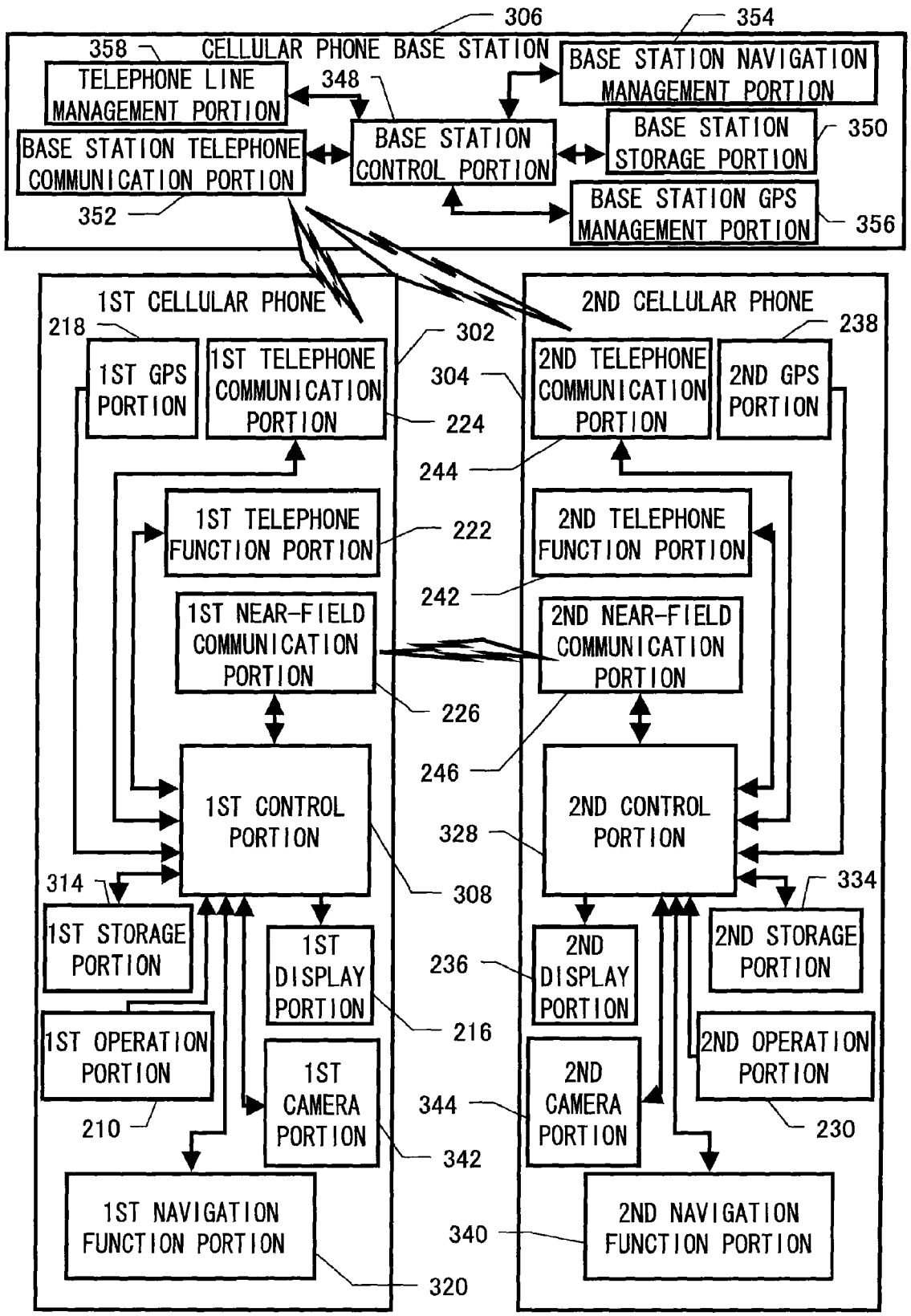
FIG. 18 is a block diagram showing a position display apparatus as a second embodiment of the present invention.

FIG. 18 is a block diagram showing a position display apparatus as a second embodiment of the present invention. The second embodiment deals with a cellular phone system, and involves a first cellular phone 302, a second cellular phone 304, and a cellular phone base station 306. Although FIG. 18 only shows two cellular phones for the sake of simplicity, it should be understood that the present invention is applicable in cases involving a third, a fourth cellular phone and so forth as well.

The component blocks of the second embodiment shown in FIG. 18 largely correspond to those of the first embodiment shown in FIG. 1. More specifically, the component blocks in FIG. 18 whose reference numerals have "2" in the hundred's place have their counterparts in FIG. 1 whose reference numerals have the same number in the ten's and one's places. Accordingly, unless absolutely necessary, no description of such component blocks will be repeated. Likewise, unless unique to car navigation, the various functions described in connection with the first embodiment apply in the second embodiment as well. Accordingly, unless absolutely necessary, no description of such functions will be repeated.

In the second embodiment shown in FIG. 18, the first cellular phone 302 and the second cellular phone 304 exchange, via their respective-a first and a second—near-field communication portions 226 and 246, the absolute position information on their bearers as acquired by their respective—a first and a second—GPS portions 218 and 238. The partner's absolute position information, thus acquired through exchange, is, along with one's own absolute position information, displayed simultaneously on a map on the two parties' respective—a first and a second—display portions 216 and 236, which are the display screens of their cellular phones. In this way, as in the first embodiment, "twin-navigation" is achieved, permitting two parties to approach each other while simultaneously confirming each other's current position, for example, when they are arranged to meet.

What is characteristic of the second embodiment shown in FIG. 18 is that the communication between a first telephone communication portion 224 and a second telephone communication portion 244 over a telephone network is an inherent function. This makes the cellular phone base station 306 slightly different in nature from the car navigation base station 6 in the first embodiment. Specifically, the cellular phone base station 306 has a telephone line management portion 358, and the primary function of the cellular phone base station 306 is management of conversation and mail exchange between cellular phones achieved with their normal cellular phone functions provided by the first telephone communication portion 224 and the second telephone communication portion 244.

The cellular phone base station 306 further has, as component blocks largely corresponding to those in the first embodiment, a base station control portion 348, a base station storage portion 350, a base station navigation management portion 354, and a base station GPS management portion 356. Here, the functions related to "twin-navigation" also slightly differ than in the first embodiment. Correspondingly, the component blocks related to "twin-navigation" in the first cellular phone 302 and the second cellular phone 304, namely a first control portion 308, a second control portion 328, a first storage portion 314, a second storage portion 334, a first navigation function portion 320, and a second navigation function portion 340, have slightly different functions than in the first embodiment. The details will be described later.

The second embodiment shown in FIG. 18 includes no component blocks corresponding to the first vehicle function portion 12 and the second vehicle function portion 32 in the first embodiment shown in FIG. 1, and instead includes a first camera portion 342 and a second camera portion 344. Pictures taken by these camera portions are exchanged in a form attached to mail handled by the telephone communication portions.

Next, the functions related to "twin-navigation" that are unique to the second embodiment shown in FIG. 18 will be described. The first embodiment deals with a car navigation system to be mounted on vehicles; accordingly, all the necessary map information (of the whole Japan, for example) is stored in the first storage portion 14 or the second storage portion 34, and the functions for displaying on a map the absolute position information from the first GPS portion 18 or the second GPS portion 38 are executed by the first control portion 8 and the first car navigation function portion 20 or the second control portion 28 and the second car navigation function portion 40. That is, in the first embodiment, so long as communication by the near-field communication portions is possible, the "twin-navigation" functions can be executed without the help of the car navigation base station 6.

By contrast, the second embodiment deals with a system based on cellular phones; accordingly, the first control portion 308, the second control portion 328, the first navigation function portion 320, and the second navigation function portion 340 have limited performance, and the first storage portion 314 and the second storage portion 334 have limited storage capacity. Thus, here, "twin-navigation" functions are executed in coordination with the cellular phone base station 306.

Specifically, in the second embodiment shown in FIG. 18, map information is provided basically in a form stored in the base station storage portion 350 in the cellular phone base station 306. The cellular phone base station 306 transmits, over a telephone network, map information on a predetermined scale in units of sections requested from a cell phone. The cellular phone stores received sections of map information in the first storage portion 314 or the second storage portion 334, and therefore, before requesting map information, it checks whether or not the same section of map information is already stored in itself and, if not, it requests the desired section of map information from the cellular phone base station 306.

Thus, what needs to be done within, for example, the first cellular phone 302 are: storage of the sections of map information received in the past; confirmation of the stored sections of map information; reception of a new section of map information as necessary; and display of necessary indications on the appropriate section of map information based on the absolute position information of the first cellular phone 302 itself and the partner. This helps alleviate the functional burden on the first storage portion 314, the first navigation function portion 320, and the first control portion 308.

In "twin-navigation" between cellular phones as in the second embodiment, a limited section of map information, for example around the spot at which a meeting is arranged, serves the purpose, and it is therefore not necessary to cope with fast transit from one section of map information to another as in car navigation. This makes the above-described processing practicable.

As described above, the second embodiment shown in FIG. 18 is based on cellular phones, and presupposes mail and conversation on cellular phones. It is therefore also possible to start "twin-navigation" at the start of a conversation over the cellular phone network. In that case, communication by the telephone communication portions proceeds concurrently with communication by the near-field communication portions.

Although FIG. 18 shows a configuration where the cellular phone base station 306 engages in both telephone network management and "twin-navigation" functions, it is also possible to build a configuration involving separate cellular phone base stations, one engaging in ordinary telephone network management and another engaging in "twin-navigation" functions.

As a third embodiment, the configuration shown in FIG. 18 may be modified as follows: first, from the first GPS portion 218 and the second GPS portion 238, one's own and the partner's absolute position information is transmitted to the cellular phone base station 306 so as to be gathered there; then, in the base station navigation management portion in the cellular phone base station 306, image information of a map having the two parties displayed on it is created; then, this image information is distributed to each of the first cellular phone 302 and the second cellular phone 304. With this configuration, it is possible to further alleviate the "twin-navigation"—related functional burden on the cellular phones. On the negative side, the system relies on a telephone network instead of near-field communication, and this incurs charges for the use of the telephone network.

As described above, though each embodiment involves functions unique to car navigation or cellular phones, most of the features are applicable to both. The various features of the present invention find wide applications not only in car navigation systems and cellular phones but in mobile devices incorporating communication capabilities and mobile communication devices in general.

Now, a modified embodiment of the "twin-navigation" display processing shown in FIG. 15 will be described. In the flow shown in FIG. 15, when one's own vehicle is not the leading vehicle, step S103 prevents the flow from proceeding through steps S104 to step S110 or through steps S113 to S116. That is, depending on whether or not one's own vehicle is the leading vehicle or a following vehicle, different indications are displayed.

By contrast, in the modified embodiment, the processing shown in FIG. 15 is executed irrespective of whether or not one's own vehicle is the leading vehicle. Specifically, step S103 is done away with. Incidentally, if, in step S107, the situation requiring checking has disappeared, as in FIG. 15, the flow proceeds to step S111. In steps S104 to S110 and steps S113 to S116, "following vehicle" should be read as "outside vehicle".

In this modified embodiment, even in a following vehicle, steps S106 and S108 are executed to check how the leading vehicle proceeds as when it approaches a branch point, and in addition, if simplified display of outside vehicles is set, steps S115 and S116 are executed to prevent the indications displayed on the map from becoming complicated.

Now, referring back to FIG. 18, the functions of the second embodiment will be described. Here, a supplementary description of the configuration shown in FIG. 18 will be given because it, though not unique to the present invention, is related to the functions described later. As already described, the first telephone function portion 222 and the second telephone function portion 242 are for wireless communication, including ordinary conversation, over a telephone network. As in common cellular phones, these telephone function portions have an audio processing portion for telephone capabilities, and also have a microphone for collecting the voice of the user and a loudspeaker arranged near the user's ear.

The first telephone function portion 222 and the second telephone function portion 242 also permit videotelephony, and have videophone capabilities. In the first cellular phone 302 and the second cellular phone 304, when they are in videophone mode, the sensitivity of the microphone is increased and its directivity is narrowed, and accordingly the volume of the loudspeaker is increased and its directivity is narrowed. Moreover, during a videophone session, the face of the person on one end as shot by the first or second camera portion 342 or 344 is displayed on the other end, on the second or first display portion 236 or 216.

In a case where the first cellular phone 302 or the second cellular phone 304 is of the folding type, its first display portion 216 or second display portion 236 includes a main display portion provided on the inside of the cellular phone in its folded state and a sub display portion provided on the outside of the cellular phone so as to be viewable even when it is folded. It is assumed that the functions described above are executed on the main display portion.

Figure 19:
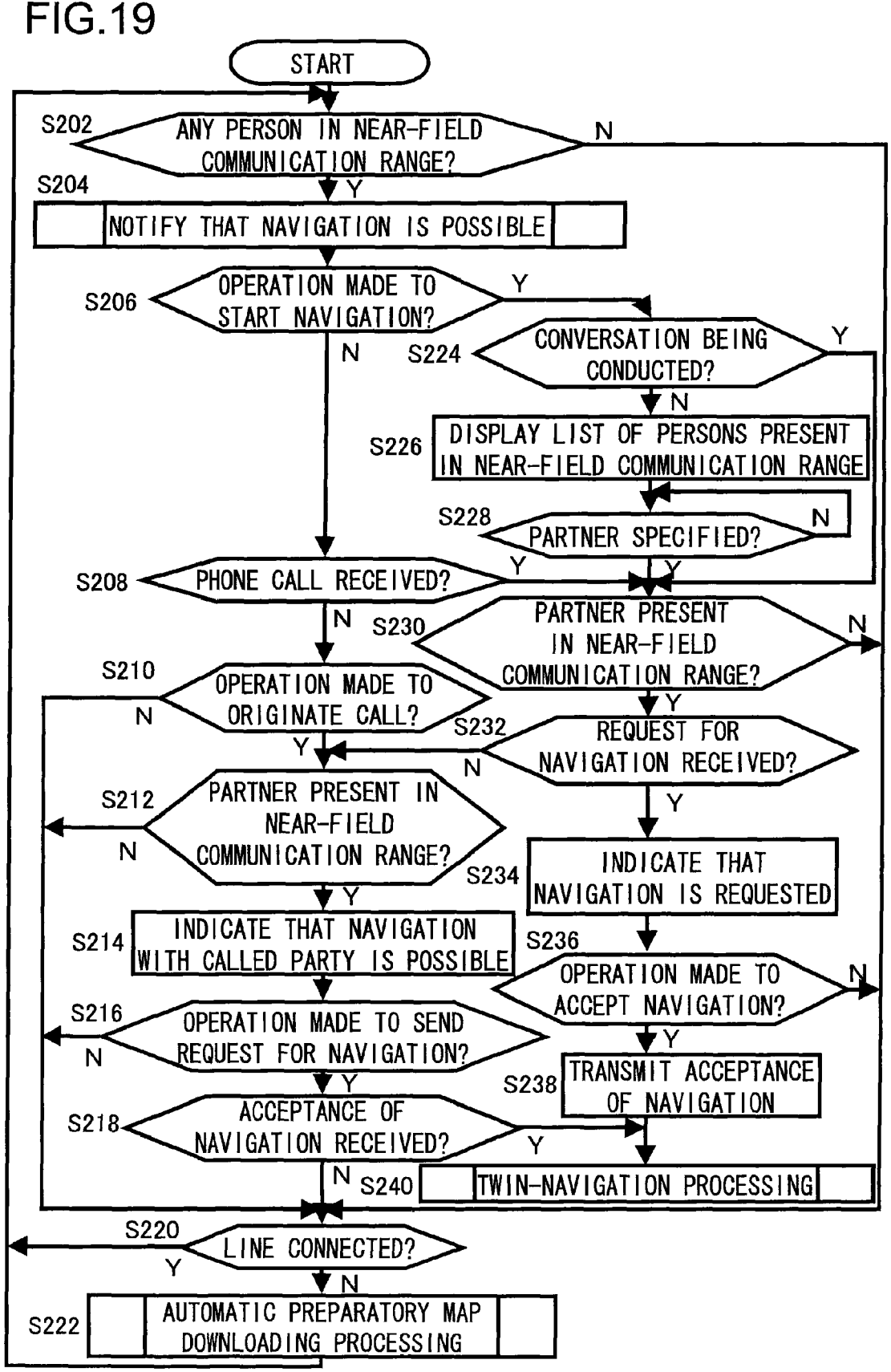
FIG. 19 is a flow chart showing the basic functions of each of the first and second control portions 308 and 328 in the second embodiment shown in FIG. 18.

FIG. 19 is a flow chart showing the basic functions of the first control portion 308 and the second control portion 328 in the second embodiment shown in FIG. 18. The flow starts when the first cellular phone 302 or the second cellular phone 304 is turned on. The following description centers around the first cellular phone 302. Accordingly, unless otherwise stated, the flow chart will be described in connection with the functions of the first control portion 308.

When the flow starts, in step S202, whether or not anyone carrying another cellular phone is present in the near-field communication range of the first near-field communication portion 226 of the first cellular phone 302 is checked. For example, it is checked whether or not a second cellular phone 304 is present whose second near-field communication portion 246 can communicate with the first near-field communication portion 226. As will be described later, whenever anyone newly enters the near-field communication range, it is detected in this step S202.

If, in step S202, a person present in the near-field communication range is detected, then, in step S204, processing for notifying that navigation is possible is performed. This is done, when a person is present in or newly enters the near-field communication range, to notify the bearer of the first cellular phone 302 of that fact. The details will be described later.

On completion of the navigation possibility notification processing, then, in step S206, whether or not an operation to start twin-navigation is made is checked. If no operation to start twin-navigation is made, then, in step S208, whether or not an ordinary cellular phone call is received is checked. If no call is received, then, in step S210, whether or not an operation to originate an ordinary cellular phone call is made is checked.

If an operation to originate a call is made, then, in step S212, whether or not the cellular phone of the called party is present in the near-field communication range is checked. If the called party is present in the near-field communication range, then, in step S214, an indication notifying that twin-navigation with the called party is possible is displayed on the first cellular phone 302. The indication notifying that twin-navigation with the called party is possible may simultaneously be sounded from the loudspeaker of the first telephone function portion 222.

Next, in step S216, whether or not an operation to send a request for twin-navigation to the called party is made is checked. This is done in accordance with the indication in step S214, and, if that operation is done, the first near-field communication portion 226 transmits a twin-navigation request signal. Then, in step S218, whether or not a twin-navigation acceptance signal is received from the called party is checked.

Through these steps, if, in step S218, no twin-navigation acceptance signal is received from the called party, then, in step S220, whether or not the phone is connected is checked. When step S220 is reached, ordinary telephone mode not accompanied by twin-navigation functions is established. If, in step S220, the phone is connected nowhere, the flow proceeds to step S222.

Also if, in step S210, no operation to originate a phone call is made, the flow proceeds directly to step S220. When, in this way, neither a phone call is made nor the first cellular phone 302 is used for ordinary conversation, even if a person is present in the near-field communication range in step S202, the user is notified of nothing, and the flow proceeds to step S220, whence, since the phone is connected nowhere, the flow proceeds further to step S222.

If, in step S212, the called party is not present in the near-field communication range, it means that the person present there is not the called party. Thus, the user is notified of nothing, and the flow proceeds to step S220, whence, if the phone is connected nowhere, the flow proceeds further to step S222.

Also if, in step S216, the user makes no operation to request twin-navigation, the flow proceeds to step S220, and then, if the phone is connected nowhere, the flow proceeds further to step S222.

In step S222, processing for automatic preparatory map downloading is performed. What is done here is preparatory automatic downloading of the map necessary for twin-navigation, and it is done by exploiting the standby time of the cellular phone in which it is idle. The details will be described later. From step S222, the flow returns to step S202. If, in step S220, the phone is connected, the flow returns directly to step S202.

Thereafter, so long as no operation to start navigation is made even with a person present in the near-field communication range, nor is any phone call received, nor is a twin-navigation acceptance signal received from the called party even with the phone connected, the processing through steps S202 to S222 is repeated. If, in step S202, no one is present in the near-field communication range, the flow proceeds directly to step S220.

By contrast, if, in step S206, an operation to start twin-navigation is made, then, in step S224, whether or not a phone conversation is being conducted is checked. If no phone conversation is being conducted, then, in step S226, a list of persons found to be present in the near-field communication range in step S202 is displayed on the first display portion 216. Then, in step S228, an operation to specify a partner of twin-navigation is waited for, and, when one is specified, the flow proceeds to step S230. Here, two ore more partners may be specified. If, in step S224, a phone conversation is being conducted, the partner of the conversation is specified as the partner of twin-navigation, and the flow proceeds to step S230.

In step S230, whether or not the specified partner is present in the near-field communication range is checked again. Normally, a partner is specified from among persons found to be present in the near-field communication range in step S202, and therefore, unless the specified partner enters a dead zone in a short time, the result of the check for the second time is "yes"; thus, the flow proceeds to step S232. Also if, in step S208, a phone call is received, the flow proceeds to step S230. In this case, the phone call received is not always from a person found to be present in the near-field communication range in step S202. This is the reason that Step S230 is provided: it permits the flow to proceeds to step S232 only if the received phone call is from a person present in the near-field communication range. By contrast, if, in step S230, the partner is not present in the near-field communication range, the flow proceeds to step S220.

In step S232, whether or not a request for twin-navigation is received from the specified partner is checked. Such a request for twin-navigation is communicated between the near-field communication portions, and therefore one is not always received during an ordinary phone call or conversation. If a request for twin-navigation is received, the flow proceeds to step S234, where an indication that twin-navigation is requested is displayed on the first display portion 216, and the flow then proceeds to step S236.

In step S236, if it is found that an operation to accept the request for twin-navigation is made within a predetermined period after the indication in step S234, the flow proceeds to step S238, where a twin-navigation acceptance signal is transmitted from the first near-field communication portion 226 to the partner from which the request was received. Then, in step S240, processing for twin-navigation is started, of which the details will be described later. If, in step S236, it is not found that an operation of acceptance is made within the predetermined period after the display of the request for twin-navigation, the flow proceeds to step S220.

If, in step S232, it is not found that a twin-navigation acceptance signal is received from the specified partner or the partner from which the phone call is being received, the flow proceeds to step S212. The flow then proceeds from step S212 through step S216 to step S218, whence, if it is found that an acceptance signal is received from the partner to which the request for twin-navigation was sent, the flow proceeds to step S240.

Figure 20:
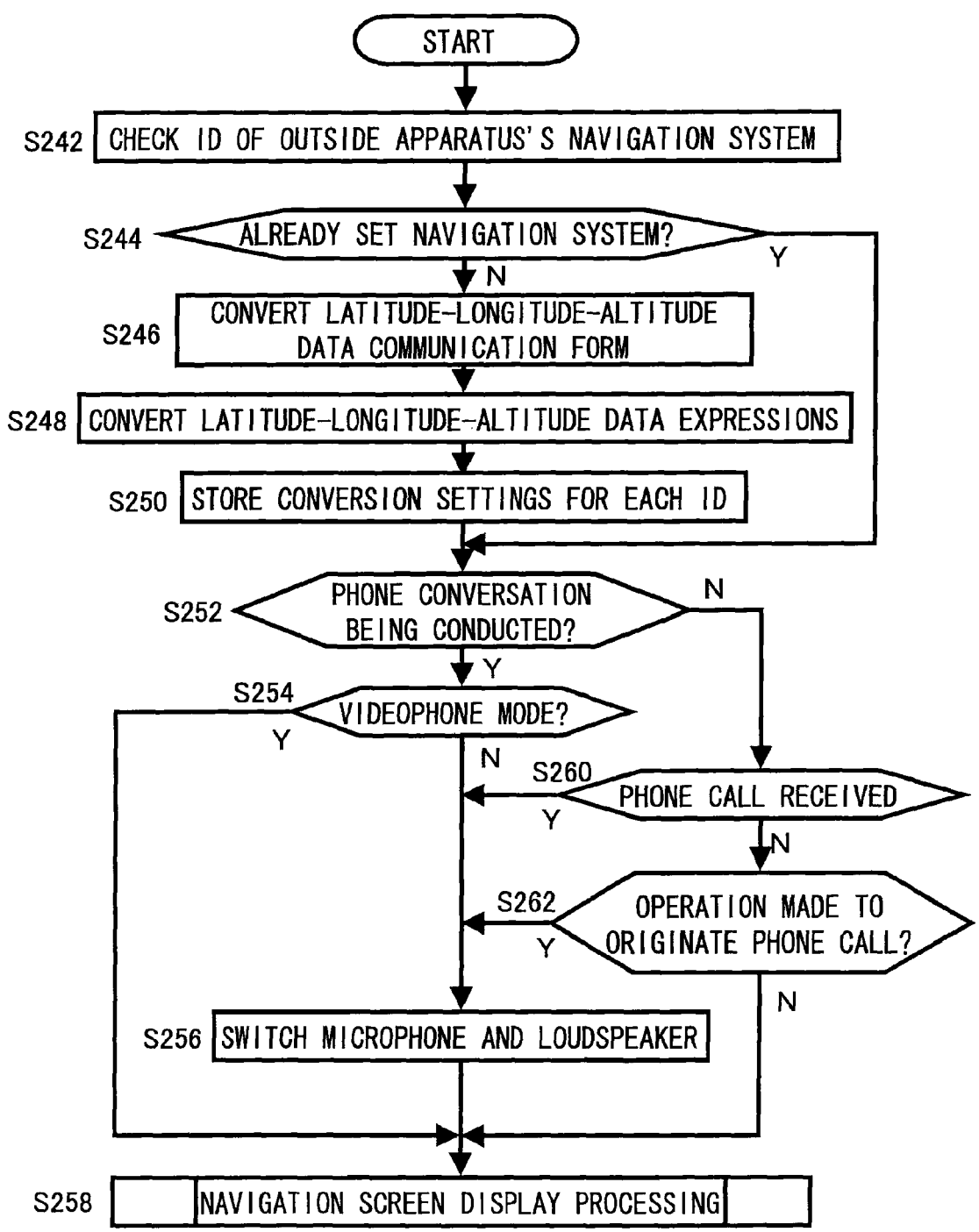
FIG. 20 is a flow chart showing the details of the processing for twin-navigation in step S240 in FIG. 19.

FIG. 20 is a flow chart showing the details of the processing for twin-navigation in step S240 in FIG. 19. When the flow starts, first, in step S242, the ID of the navigation system of "the outside apparatus", i.e., the cellular phone of the partner who accepted the request for twin-navigation in step S242, is checked. The succeeding steps up to step S250 for ID-by-ID storage of conversion settings (specifically, steps S244 to S250) are basically the same as steps S42 to S50 in FIG. 3 in the first embodiment, and therefore no description of those steps will be repeated.

When the flow proceeds from step S244 or S250 to step S252, whether or not a phone conversation is being conducted with the partner of twin-navigation is checked. If so, then, in step S254, whether or not the conversation is being conducted in videophone mode is checked. If not, then, in step S256, the microphone and the loudspeaker are switched from ordinary telephone mode to videophone mode, and the flow then proceeds to step S258 to start navigation screen display processing. This is because, in ordinary telephone mode, if the user moves the cellular phone away from his ear to view the twin-navigation screen, he cannot continue conversation. By contrast, if, in step S254, videophone mode is already established, the flow proceeds directly to step S258.

If, in step S252, no phone conversation is being conducted, then, in step S260, whether or not a phone call is received is checked. If a phone call is received, then, in step S256, it starts to be received in videophone mode. By contrast, if no phone call is received, then, in step S262, whether or not an operation to originate a phone call is made is checked. Here again, if an operation to originate a phone call is made, the flow proceeds to step S256 so that the conversation thereafter is conducted in videophone mode. If, in step S262, no operation to originate a phone call is made, then the flow proceeds directly to step S258 for twin-navigation not accompanied by phone conversation.

Figure 21:
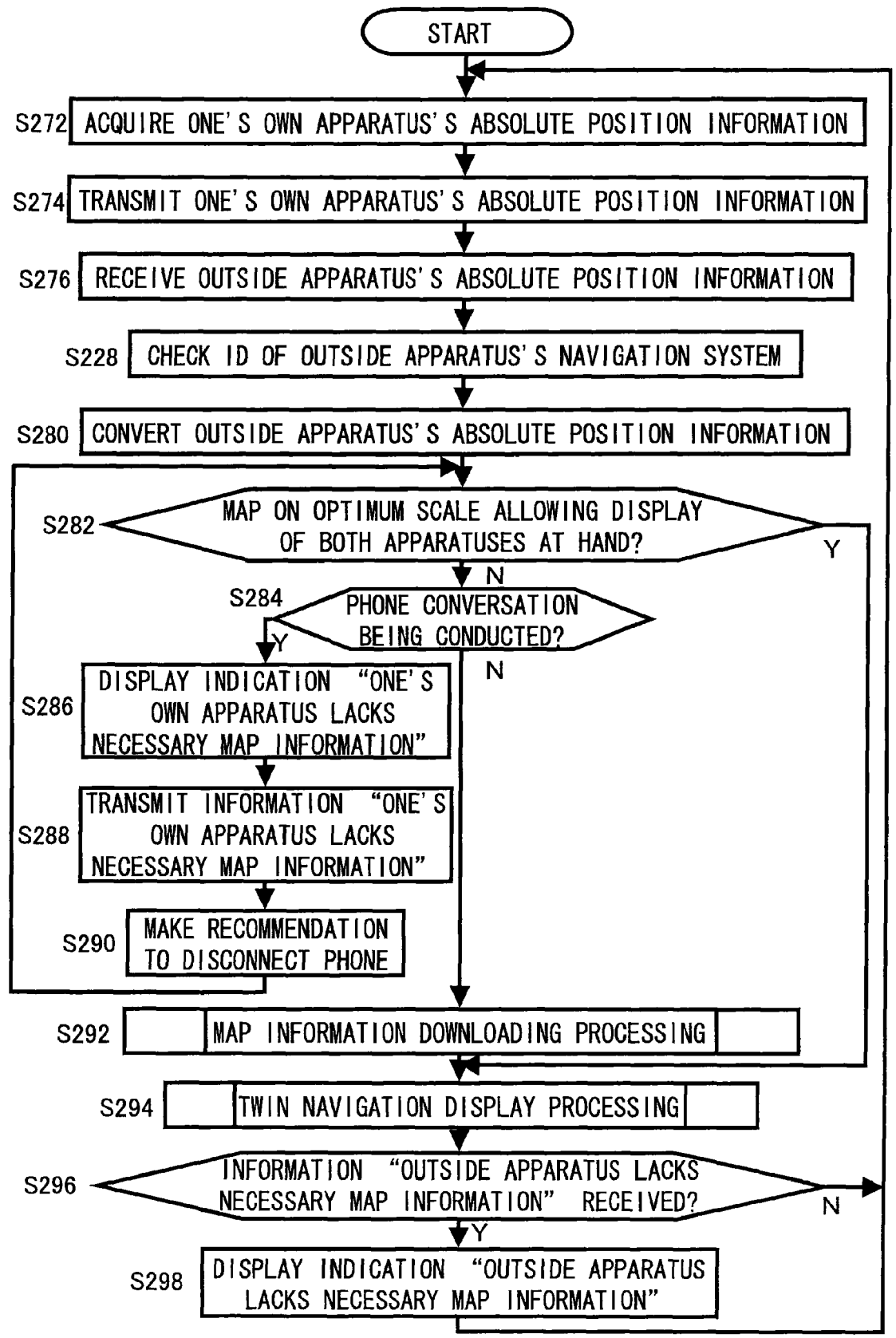
FIG. 21 is a flow chart showing the details of the processing for twin-navigation screen display in step S258 in FIG. 20.

FIG. 21 is a flow chart showing the details of the processing for twin navigation screen display in step S258 in FIG. 20. When the flow starts, first, in step S272, the absolute position information of the first cellular phone 302 is received, and then, in step S274, that information is transmitted from the first near-field communication portion 226 to the partner of twin-navigation.

Next, in step S276, the absolute position information of the partner of twin-navigation is received by the first near-field communication portion 226. Then, in step S228, the ID of the twin-navigation system of the partner's cellular phone is checked, and, based on the identified ID, in step S280, the absolute position information is converted into information displayable on one's own cellular phone. If the ID tells that one's own and the partner's twin-navigation systems are identical, nothing is eventually performed in step S280.

Next, in step S282, it is checked whether or not a map on the optimum scale that permits the display of both one's own and partner's absolute positions has already been downloaded and stored in the first storage portion 314. If not, the flow proceeds to step S284. In this check, not only if no map at all is at hand that permits the display of the absolute positions of both but also if, although a map on a wide-area scale sufficient to display them has been downloaded, a map that better display them on a wider-area scale has not yet been downloaded, the flow proceeds to step S284.

In step S284, whether or not a phone conversation is being conducted with the partner of twin-navigation is checked, and, if not, then, in step S292, map information downloading processing is started. By contrast, if, in step S284, a phone conversation is being conducted, then, in step S286, an indication "one's own apparatus lacks necessary map information" is displayed on the first display portion 216 of the first cellular phone 302. The indication here may include whether no map at all is at hand or the scale of the map at hand is too wide-area. Next, in step S288, information "one's own apparatus lacks necessary map information" is transmitted from the first near-field communication portion 226 to the partner's cellular phone. In this way, it is possible to notify the partner how far twin-navigation display is possible at one's own end.

Thereafter, in step S290, a recommendation to disconnect the phone is made. This recommendation is made in the form of an indication sounded or displayed or both. The reason is that, if the telephone line of the first telephone communication portion 224 remains occupied for phone conversation, it is impossible to download a map over the Internet. The flow then returns to step S282, and thereafter, until a different map becomes necessary as the two parties change their positions, or the phone is disconnected, steps S282 to S290 are repeated. During this repetition, whether to continue a phone conversation or not is arbitrary.

The details of the map information downloading processing in step S292 will be described later. On completion of the downloading here, the flow proceeds to step S294. If, in step S282, the map on the optimum scale that permits the display of both apparatuses is already stored in the first storage portion 314, there is no need for downloading; thus, the flow proceeds directly to step S294.

In step S294, twin-navigation display processing is performed, of which the details will be described later. Next, in step S296, it is checked whether or not a signal indicating that the partner's cellular phone lacks necessary map information is received by the first near-field communication portion 226. If so, then, in step S298, an indication to that effect is displayed on the first display portion 216, and the flow then returns to step S272. If, in step S296, no signal indicating that the outside apparatus lacks necessary map information is received, then the flow immediately returns to step S272.

Thereafter, until an interrupt occurs as a result of an operation to end twin-navigation being made, steps S272 to S298 are repeated, and meanwhile twin-navigation screen display is executed in accordance with the changing absolute position information of the two parties.

Figure 22:
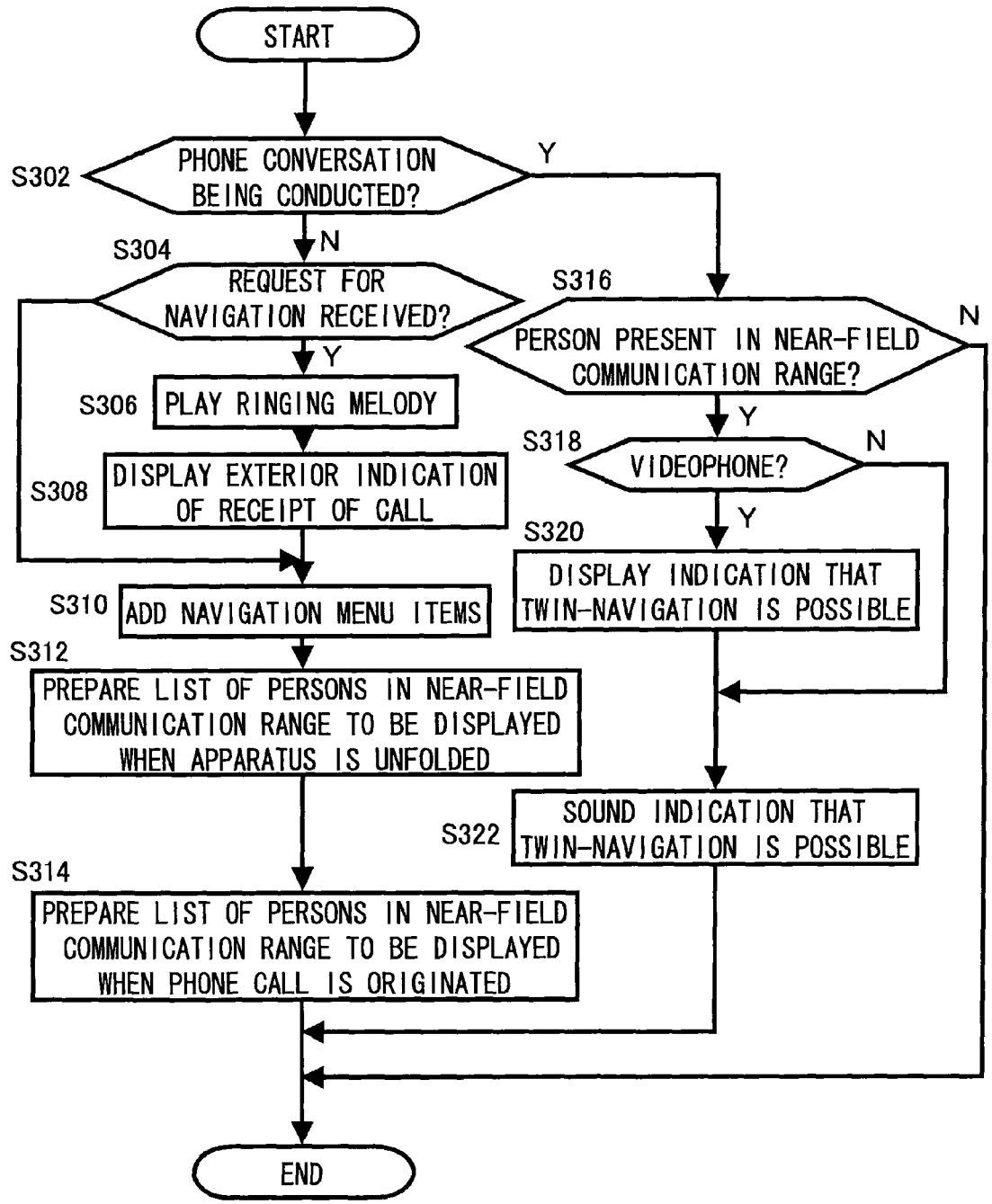
FIG. 22 is a flow chart showing the details of the processing for twin-navigation possibility notification in step S204 in FIG. 19.

FIG. 22 is a flow chart showing the details of the processing for twin navigation possibility notification in step S204 in FIG. 19. When the flow starts, in step S302, whether or not a phone conversation is being conducted is checked. If not, then, in step S304, whether or not a request for twin-navigation from a person present in the near-field communication range is received by the first near-field communication portion 226 is checked. If a request for twin-navigation is received, then, in step S306, a ringing melody notifying of the request for twin-navigation is played. This ringing melody is set to be different from those notifying of receipt of ordinary phone calls and mail over the telephone line of the first telephone communication portion 224. In addition, in step S308, an exterior indication that a request for twin-navigation is received is displayed on the first display portion 216. In this way, the cellular phone according to the present invention can notify its user of the receipt of not only ordinary calls over the telephone network but also local calls by near-field communication.

Next, in step S310, to enable twin-navigation operations, menu items related to twin-navigation is added to the displayed menu. To avoid confusion, these menu items related to twin-navigation are not added to the displayed menu unless a person is present in the near-field communication range. If, in step S304, no request for twin-navigation is received from a person present in the near-field communication range, for the time being, there is no need to notify the user of the presence of a person in the near-field communication range, and it is necessary only to enable twin-navigation operations; thus, the flow proceeds directly to step S310.

Subsequent to step S310, in step S312, display data is prepared so that, as the folding-type cellular phone is unfolded, a list of persons present in the near-field communication range is automatically displayed. Then, in step S314, display data is prepared so that, when an operation to originate a phone call is made, a list of persons present in the near-field communication range is automatically displayed. The flow then ends.

By contrast, if, in step S302, a phone conversation is being conducted, then, in step S316, whether or not a person who has entered the near-field communication range is the partner of the conversation is checked. If so, then, in step S318, whether or not a videophone session is being conducted is checked. If a videophone session is being conducted, the first display portion 216 is being viewed; thus, an indication that twin-navigation with the partner of the videophone session is possible is displayed on the first display portion 216. In addition, in step S322, an indication to the same effect is sounded, and the flow then ends. If, in step S318, no videophone session is being conducted, the flow proceeds directly to step S322 to sound a notification only audibly, and the flow then ends. If, in step S316, a person who has entered the near-field communication range is not the partner of the conversation, he is not of interest for the time being; thus, doing nothing, the flow ends.

Figure 23:
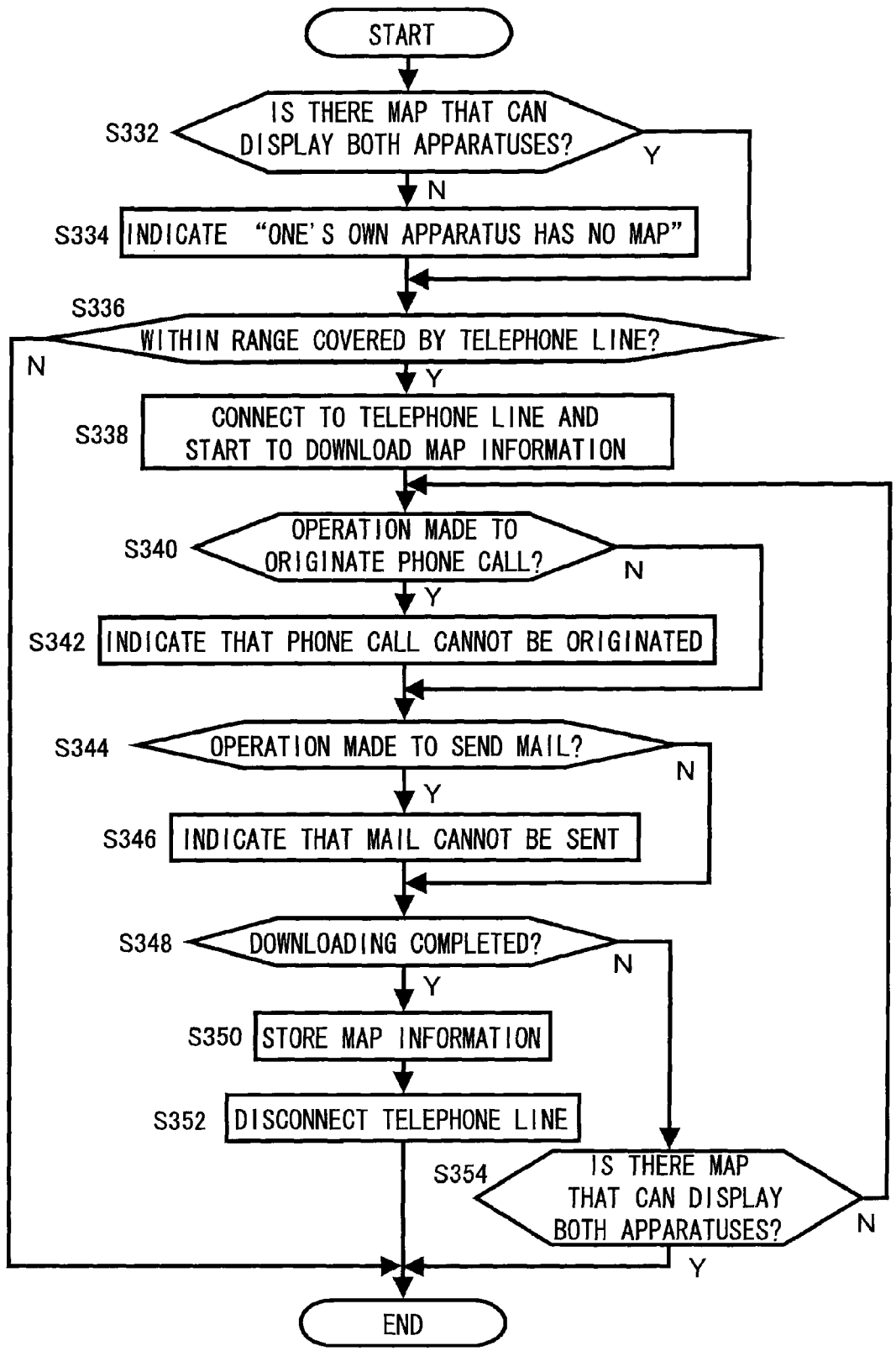
FIG. 23 is a flow chart showing the details of the processing for map information downloading in step S292 in FIG. 21.

FIG. 23 is a flow chart showing the details of the processing for map information downloading in step S292 in FIG. 21. When the flow starts, in step S332, it is checked whether no map at all that can display both one's own and the partner's positions is stored in the first storage portion 314. If no map at all that can display both one's own and the partner's positions is stored there, then, in step S334, an indication that one's own cellular phone has no map at all that can display both is displayed on the first display portion 216, and the flow then proceeds to step S336. By contrast, if, in step S332, there is a map that, though on too wide-area a scale to be optimal, can display both, the flow proceeds directly to step S336.

In step S336, whether or not the first cellular phone 302 is in the range covered by the telephone line of the first telephone communication portion 224 is checked. This is similar to the check made in cellular phones to judge whether or not to indicate that they are in a so-called "dead zone". If in the range covered by the telephone line, then, in step S338, the first telephone communication portion 224 is connected to the telephone line, and the necessary map starts to be downloaded from the cellular phone base station 306 over the Internet.

While the downloading continues, the flow proceeds to step S340, where whether or not an operation to originate a phone call has been made is checked. If so, then, in step S342, an indication that a phone call cannot be originated now is displayed. The aim is to avoid confusion of the user who tries to make such an operation without noticing that during downloading the telephone line is occupied and thus a phone call cannot be originated. After the indication starts to be displayed, the flow proceeds to step S344, but the indication itself remains displayed for a predetermined period after the operation. By contrast, if no operation to originate a call is made, the flow proceeds directly to step S344.

In step S344, whether or not an operation to send mail has been made is checked. If so, in step S346, an indication that mail cannot be sent is displayed. The aim is to avoid confusion of the user who tries to make such an operation without noticing that during downloading the telephone line is occupied and thus mail cannot be sent; that is, the aim is the same as when the originating of a phone call is attempted. After the indication starts to be displayed, the flow proceeds to step S348, but the indication itself remains displayed for a predetermined period after the operation. By contrast, if no operation to send mail is made, the flow proceeds directly to step S348.

In step S348, whether or not downloading is completed is checked. If it is completed, then, in step S350, the downloaded map information is stored in the first storage portion 314. The flow then proceeds to step S352, where the telephone line is disconnected, and the flow then ends. If, in step S336, the telephone line is in a dead zone, the flow immediately ends.

By contrast, if, in step S348, downloading is not completed, then, in step S354, it is checked whether or not there is a map that, though on too wide-area a scale, can display both one's own and the partner's cellular phones. If there is no such map information at all, the flow returns to step S340, and thereafter, until downloading is completed, the loop through steps S340 to S348 and step S354 is repeated.

By contrast, if, in step S354, there is a map that can display both, even if downloading is not completed yet, the flow immediately ends, and a jump is made to the next processing, specifically the twin-navigation display processing in step S294 in FIG. 21. Here, the downloading continues concurrently with the twin-navigation display processing. In this way, whereas if there is no map information that can display both, downloading is not ended until a necessary map is completely downloaded, if the first storage portion 314 has map information that, though on an inadequate scale, can display both, twin-navigation display and downloading are performed concurrently without waiting until the optimal map information is completely downloaded.

Figure 24:
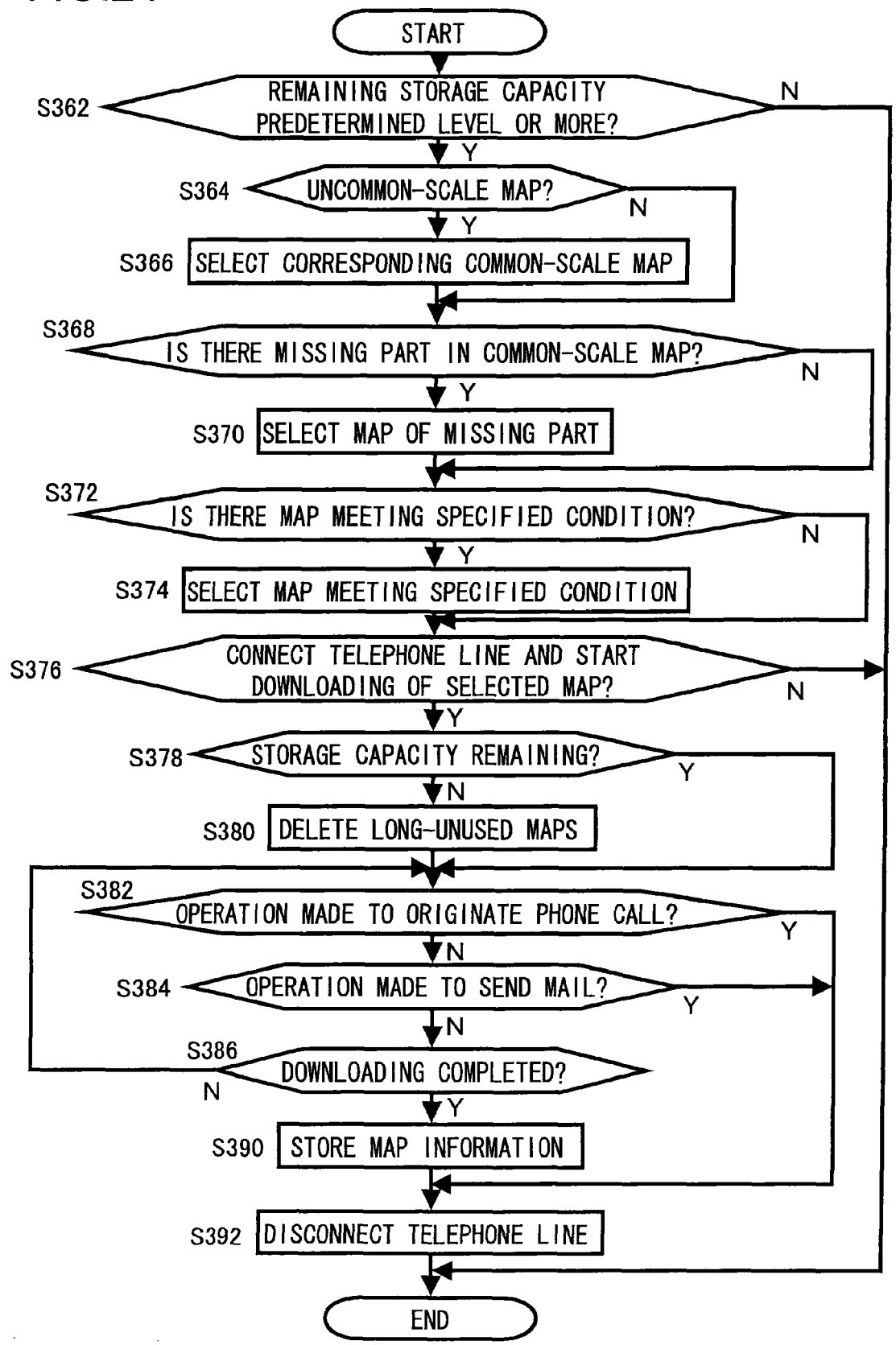
FIG. 24 is a flow chart showing the details of the processing for automatic preparatory map downloading in step S222 in FIG. 19.

FIG. 24 is a flow chart showing the details of the processing for automatic preparatory map downloading in step S222 in FIG. 19. When the flow starts, in step S362, it is checked whether or not the remaining capacity of the part of the first storage portion 314 allocated to the storage of maps is equal to or more than a predetermined level or more. As already mentioned, automatic preparatory map downloading is done, by exploiting standby time, to predict and automatically download the map that is expected to be necessary for twin-navigation. The map so downloaded is not always used actually thereafter. This is the reason that step S362 is provided: it allows downloading only when the storage capacity remaining for the storage of maps is equal to or more than the predetermined level, thereby preventing the storage capacity from being occupied with maps of which the likeliness of use is unknown.

If, in step S362, the remaining storage capacity is equal to or more than the predetermined level, then, in step S364, it is checked whether or not map information on uncommon scales is stored in the first storage portion 314. Here, uncommon-scale maps are, for example, wide-area maps downloaded for purposes other than twin-navigation and enlarged maps of particular neighborhoods downloaded to obtain detailed information, i.e., map information on such scales as are not commonly used in twin-navigation. In contrast, maps that are commonly used in twin-navigation are those on such scales as largely cover the communication range of the first near-field communication portion 226.

If, in step S364, there is an uncommon-scale map, then, in step S366, based on communication with the cellular phone base station 306, a common-scale map corresponding to that map is selected. Specifically, in the case of a wide-area map, all of its division common-scale maps, or those of them assigned higher precedence according to a precedence rule set beforehand, are specified from the first cellular phone 302. On the other hand, in the case of a detailed map, a common-scale map centered around it, or covering an area expanded according to a rule set beforehand, is specified from the first cellular phone 302. The cellular phone base station 306 selects a common-scale map that is closest to the specification thus made.

After the above selection, the flow proceeds to step S368. If, in step S364, there is no uncommon-scale map, the flow proceeds directly to step S368.

In step S368, the common-scale maps stored in the first storage portion 314 are checked, and, if there are a considerable number of common-scale maps, whether or not, when they are put together, there is any missing part is checked. If there is a missing part, then, in step S370, based on communication with the cellular phone base station 306, the common-scale map corresponding to the missing part is selected. Specifically, according to the specification of the missing part from the first cellular phone 302, the cellular phone base station 306 selects the common-scale map closest to the specification.

After the above selection, the flow proceeds to step S372. If, in step S368, there is no missing part in the common-scale maps, the flow proceeds directly to step S372.

In step S372, based on communication with the cellular phone base station 306, it is checked whether or not there is new map information that meets a specified condition. Specifically, in a case where a condition, like "new shopping spots or sightseeing spots", has previously been specified, if there is new map information including spots that meet the condition, then, in step S374, the corresponding common-scale map is selected in the cellular phone base station. After this selection, the flow proceeds to step S376. If, in step S372, there is no new map information that meets the condition, the flow proceeds directly to step S376.

In step S376, whether or not there is a map selected through the above processing is checked, and, if there is a map so selected, the telephone line is connected and downloading is started. The flow then proceeds to step S378.

In step S378, whether or not the first storage portion 314 has a predetermined remaining storage capacity is checked. The check here is less strict than the check of the remaining capacity in step S362, and is not intended to check imminent scarcity of capacity.

If the remaining storage capacity is less than the predetermined level, then, in step S380, map information that has long been unused is deleted from the first storage portion 314, and the flow proceeds to step S382. By contrast, if, in step S378, the remaining storage capacity is equal to or more than the predetermined level, the flow proceeds directly to step S382.

In step S382, whether or not an operation to originate a phone call has been made is checked. If no operation to originate a phone call has been made, then, in step S384, whether or not an operation to send mail has been made is checked. If no operation to send mail has been made, either, then, in step S386, whether or not downloading is completed is checked; if so, then, in step S390, the automatically downloaded map information is stored in the first storage portion 314, and then, in step S392, the telephone line is disconnected. The flow then ends.

If, in step S386, downloading is not completed, the flow returns to step S382 so that, until downloading is completed, steps S382 to S386 are repeated so long as no operation to originate a phone call or send mail is made.

By contrast, if an operation to originate a phone call is made in step S382, or an operation to send mail is made in step S384, even if downloading is not completed yet, the flow immediately proceeds to step S392, where the telephone line is disconnected and the automatic preparatory map downloading processing is interrupted, and the flow then ends. The aim is to give precedence to an operation to originate a phone call or send mail by keeping the telephone line from being occupied with non-urgent automatic preparatory map downloading processing.

If, in step S362, the remaining storage capacity is less than the predetermined level, or if, in step 376, there is no selected map and thus the telephone line is not connected, the flow immediately ends.

Figure 25:
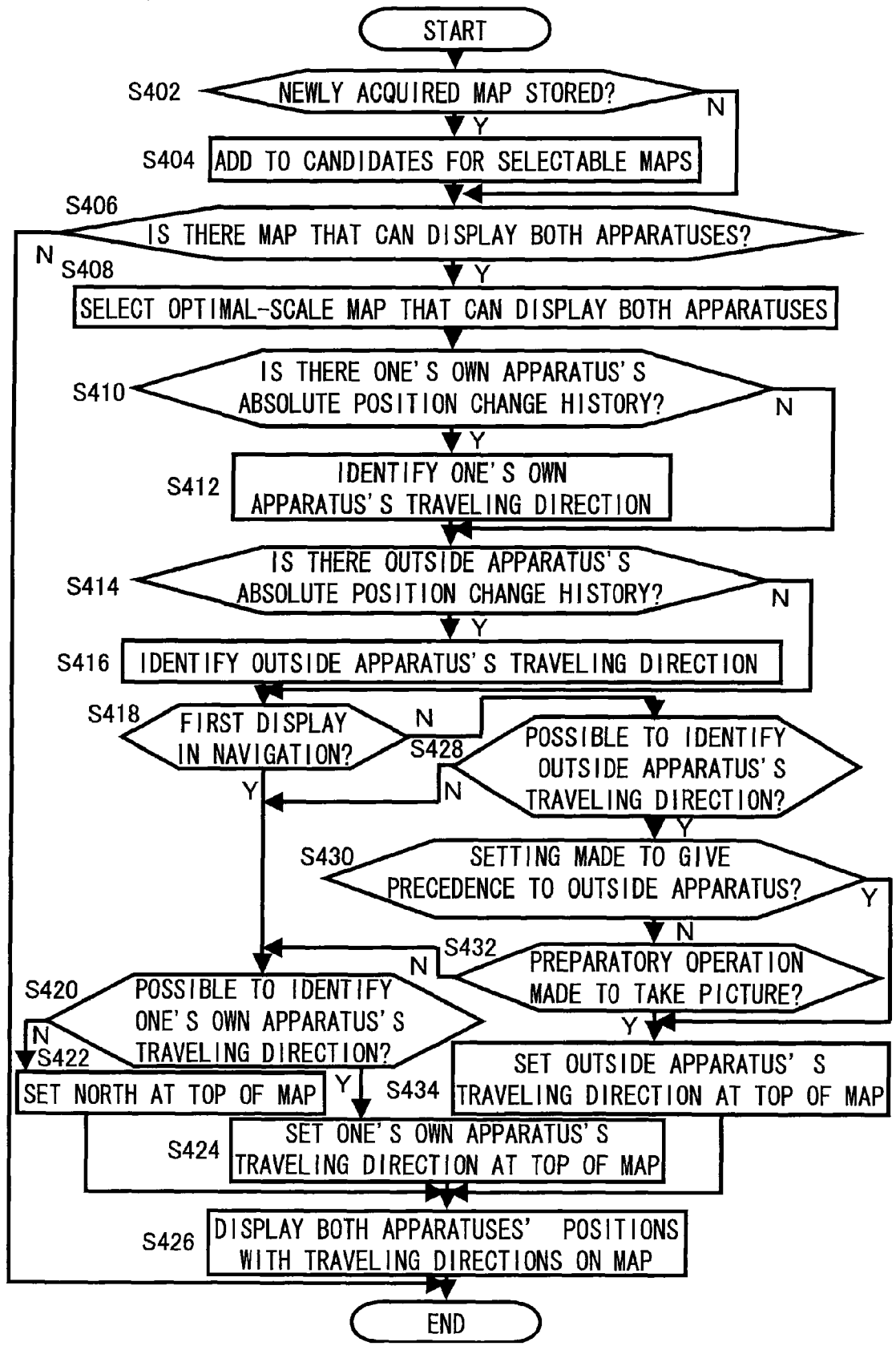
FIG. 25 is a flow chart showing the details of the processing for twin-navigation display in step S294 in FIG. 21.

FIG. 25 is a flow chart showing the details of the processing for twin-navigation display in step S294 in FIG. 21. When the flow starts, in step S402, whether or not there is newly acquired map information stored in the first storage portion 314 is checked. If there is newly acquired map information stored there, then, in step S404, it is added as a candidate for the map selected for use for twin-navigation display, and the flow proceeds to step S406. If there is no newly acquired map information stored, the flow proceeds directly to step S406.

In step S406, it is checked whether or not map information that can display the positions of both apparatuses, i.e. one's own and the partner's cellular phones, is stored in the first storage portion 314. If so, then, in step S408, a map on the optimum scale is selected from the map information that can display both apparatuses. If the map information is for a single map, this map is naturally selected.

After the map to be used for display is selected in step S408, then, in step S410, it is checked whether or not a history of temporal change of the absolute position information of one's own cellular phone in the current session of twin-navigation is stored in the first storage portion 314. If such a history is stored, then, in step S412, the traveling direction of one's own cellular phone in the current session of twin-navigation is identified based on one's own apparatus's absolute position information change history; the flow then proceeds to step S414. If no history of change of one's own apparatus's absolute position information is stored in the first storage portion 314, the traveling direction cannot be identified; the flow thus proceeds directly to step S414.

In step S414, it is checked whether or not a history of temporal change of the absolute position information, received in the current session of twin-navigation, of the partner's cellular phone is stored in the first storage portion 314. If such a history is stored there, then, in step S416, the traveling direction of the partner's cellular phone in the current session of twin-navigation is identified based on the outside apparatus's absolute position information change history; the flow then proceeds to step S418. If no history of change of the outside apparatus's absolute position information is stored in the first storage portion 314, the traveling direction cannot be identified; the flow thus proceeds directly to step S418.

Step S418 and the following steps are for determining in which direction to make the top of the displayed map point. First, in step S418, whether or not display is started for the first time in the current session of twin-navigation is checked. If so, then, in step S420, whether or not it is possible to identify the traveling direction of one's own apparatus is checked. Even when display is started for the first time for twin-navigation, if there are a plurality of absolute position information histories before starting display even for the first time in twin-navigation, it is possible to identify the traveling direction. Thus, if it is possible to identify it, the flow proceeds to step S424. In step S424, the direction of the map on the first display portion 216 is determined such that the traveling direction of one's own apparatus points upward on the map; then, in step S326, on the map of which the direction is thus determined, the positions of both apparatuses are displayed with their traveling directions, and the flow then ends.

If, in step S420, it is impossible to identify the traveling direction of one's own apparatus, then, in step S422, north is set at the top of the map, and the flow then proceeds to step S426.

If, in step S418, it is not for the first time in the current session of twin-navigation that display is started, then, in step S428, whether or not it is possible to identify the traveling direction of the outside apparatus is checked. If it is impossible to identify the traveling direction of the outside apparatus, then, in step S420, the flow then proceeds in a similar way as already described. By contrast, if, in step S428, it is possible to identify the traveling direction of the outside apparatus, then, in step S430, it is checked whether or not a setting has been made to perform display with precedence given to the traveling direction of the outside apparatus. A setting to perform display with precedence given to the traveling direction of the outside apparatus is useful when the two parties conduct conversation while sharing the map shown in the direction as seen from their respective partners, as when they perform twin-navigation while conducting phone conversation.

If, in step S430, no setting has been made to give precedence to the outside apparatus, then, in step S432, it is checked whether or not a preparatory operation for the shooting of a picture by the first camera portion 342 has been made. If such a preparatory operation has been made, the map is displayed with the traveling direction of the outside apparatus pointing upward on the map. The optimal axis of the taking lens of the first camera portion 342 corresponds to the top of the first display portion 216, displaying the map in that way permits the first camera portion 342 to shoot a picture in the direction in which it can shoot the view as seen from the partner traveling behind. In this way, it is possible to easily shoot the view in the direction as seen from the partner and then transmit it to the partner's cellular phone in order to thereby provide the partner approaching oneself with information to which he can refer. Also if, in step S434, the traveling direction of the outside apparatus is set in the map information, the flow proceeds to step S426, where the positions of both apparatuses are displayed on the map in that direction.

Also if, in step S430, it is found that a setting has been made to perform display with precedence given to the traveling direction of the outside apparatus, the flow proceeds to step S434, where the traveling direction of the outside apparatus is set at the top of the map.

By contrast, if, in step S432, it is not found that a preparatory operation for picture shooting has been made, the flow then proceeds to step S420.

If, in step S406, there is no map that can display both apparatuses, it is impossible to perform twin-navigation display; thus, the flow immediately ends.

Although the second embodiment described above deals with a case where twin-navigation is performed between two parties-oneself and a partner, this is not meant to limit the application of the present invention, even when implemented in cellular phones, to between two parties; by combining the functions described above for application between two parties, it is possible to enjoy twin-navigation among three or more parties. For example, if the case shown in FIG. 18 involves a third cellular phone, the same relationship as between the first cellular phone 302 and the second cellular phone 304 can be concurrently established between the first cellular phone 302 and the third cellular phone and between the second cellular phone 304 and the third cellular phone. This permits the positions of the three parties to be shared among the first cellular phone 302, the second cellular phone 304, and the third cellular phone to be displayed on their respective display portions.

Moreover, even if the distance between two parties, for example between the first cellular phone 302 and the second cellular phone 304, is such that they are located out of each other's near-field communication range, if the first cellular phone 302 and the third cellular phone are within each other's near-field communication range and so are the second cellular phone 304 and the third cellular phone, the first and second cellular phones 302 and 304 can perform twin-navigation between their near-field communication portions through the relaying by the third cellular phone.

The embodiments described above deal with cases in which, under the concept of twin navigation, both one's own and another person's positions are displayed. It should however be understood that the various features of the present invention related to receiving another person's absolute position information and displaying it on one's own map information can be implemented not only in such "twin navigation" but also in cases where not one's own position but another person's position alone is displayed.

Implementation without the display of one's own position is possible, for example, with a modified embodiment in which, in the flows shown in FIG. 22 and the following figures, "both apparatuses" is read instead as "the outside apparatus" and the functions related to the absolute position of one's own apparatus are omitted. Specifically, in FIG. 21, steps S272 and S274 are omitted and, in step S282, "both apparatuses" is read instead as "the outside apparatus". The map on one's own apparatus, however, needs to be used, and therefore steps S286 etc. are needed. Naturally, "twin-navigation" in steps S294 etc. should be read as "another-person's-position navigation".

In such modified embodiments, the display related to the absolute position of one's own apparatus may be, instead of completely omitted, so configured as to be switchable, as necessary, between the "twin navigation" functions exactly as shown in FIG. 21 and the following figures and those that has undergone omission and replacement of steps in the flows as described above.

The various features of the present invention related to the acquisition of map information are useful also in ordinary navigation, which does not handle the absolute position information of an outside apparatus.

Implementation not handling the absolute position information of an outside apparatus is possible, for example, with a modified embodiment in which, in FIG. 18 and the following figures, the functions related to "twin navigation" are omitted and "twin navigation" is read instead as "navigation".

In such modified embodiments, the functions related to "twin navigation" may be, instead of completely omitted, fully conserved and, as necessary, switched with the functions for ordinary navigation, with some stems omitted as described above, or the functions for "another-person's-position navigation" as described above.

In the embodiments described above, the flows are so configured that, in the map information downloading processing in FIG. 23, higher precedence is given to the downloading of map information than an operation to originate a phone call or to send mail and, in the automatic preparatory map downloading processing in FIG. 24, higher precedence is given to an operation to originate a phone call or to send mail than the downloading of map information. The present invention may also be implemented such that the user can choose beforehand which to give higher precedence in which case.

In that case, if a setting is made such that, in the map information downloading processing in FIG. 23, precedence is given to an operation to originate a phone call or to send mail than the downloading of map information, then, when an operation to originate a phone call is made in step S340 or an operation to send mail is made in step S344, the flow immediately proceeds to step S352 to disconnect the telephone line.

On the other hand, if a setting is made such that, in the automatic preparatory map downloading processing in FIG. 24, precedence is given to the downloading of map information than an operation to originate a phone call or to send mail, then, when an operation to originate a phone call is made in step S382 or an operation to send mail is made in step S384, an indication that such an operation cannot be made is displayed as in steps S342 and 346, and then the flow proceeds to step S386 to wait for the completion of downloading.

In the second embodiment implemented in cellular phones as described above, it is possible to realize various functions as combinations of the inherent telephone capability and the capability for displaying a position on a map. It is possible to further enhance the function for notifying of a received call for the telephone capability and the function for notifying of a received request for the display of a position on a map.

Specifically, for example, when an indication that navigation is requested is displayed in step S234 in FIG. 19, a ringing melody like the one sounded in step S306 in FIG. 22 is sounded. Thus, even when the user receives a request for twin-navigation during phone conversation, he is notified of the fact by a ringing melody.

On the other hand, for example, when a phone call is received in step S260 in FIG. 20, a phone call ringing melody is sounded. Thus, even when the user receives a phone call during twin-navigation, he is notified of the fact by a ringing melody.

As described above, according to the present invention, when one of the inherent telephone capability and the capability for displaying a position on a map is operating with a particular partner, if a request to start the other is received from the same partner, a notification of the fact is sounded in the form of a ringing melody.

Figure 26:
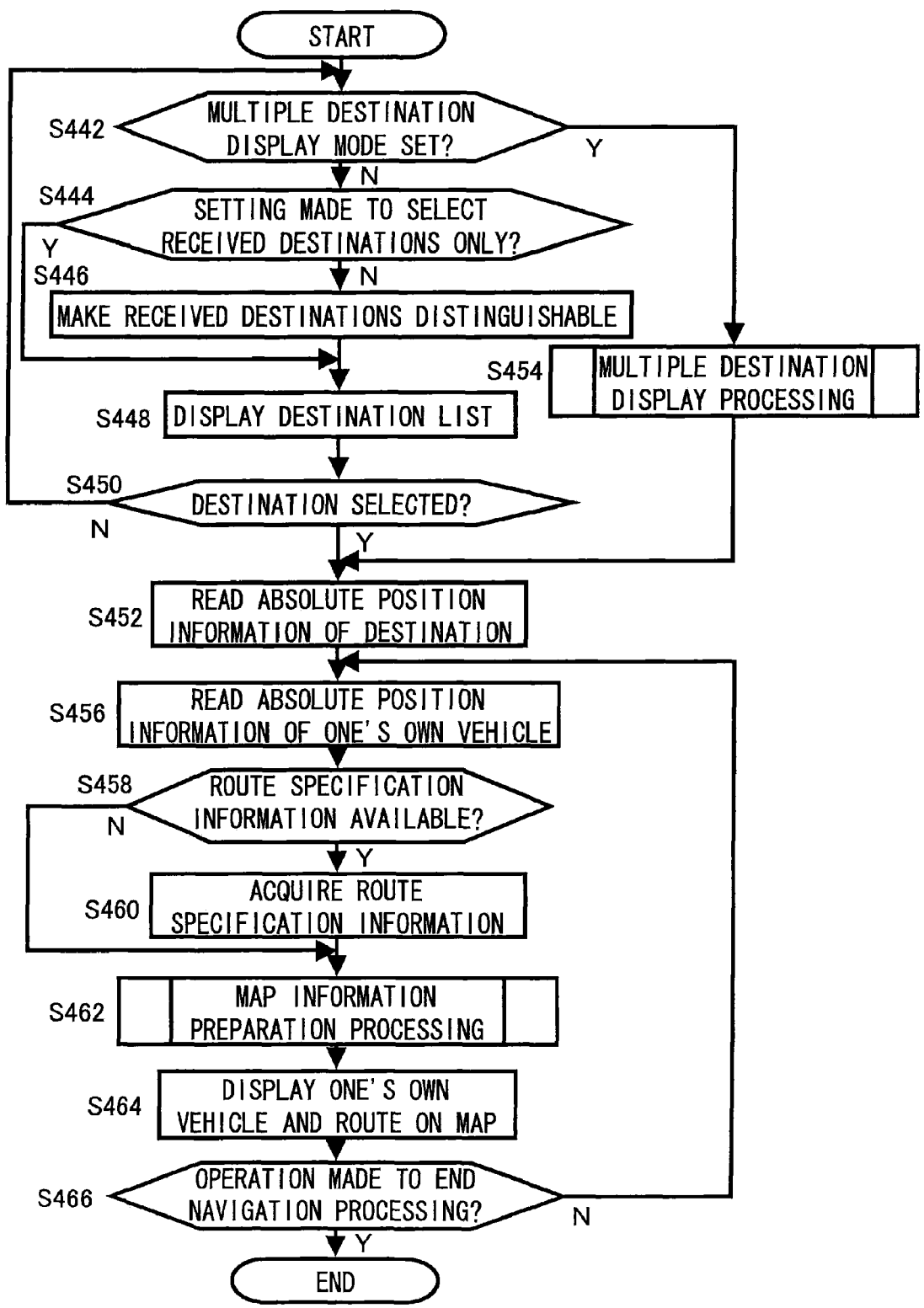
FIG. 26 is a flow chart showing the details of the processing for ordinary navigation in step S36 in FIG. 2 in connection with the first embodiment shown in FIG. 1.

FIG. 26 is a flow chart showing the details of the processing for ordinary navigation in step S36 in FIG. 2 in connection with the first embodiment shown in FIG. 1. Incidentally, ordinary navigation processing is possible also in the second embodiment shown in FIG. 18: in the flow chart of the basic functions shown in FIG. 19, when an operation requesting ordinary navigation is made, an interrupt occurs, and a jump is made to the flow shown in FIG. 26. The following description of FIG. 26 assumes the first embodiment; to understand it in the context of the second embodiment, "one's own vehicle" in the flow should be read instead as "one's own apparatus". The flow shown in FIG. 26, although referred to as "ordinary navigation processing", does not simply contain functions as conventionally performed but also includes those unique to the present invention coordinated with twin-navigation functions; that is, here, the navigation functions relate solely to one's own vehicle, but include those related to twin-navigation in the handling of navigation information.

When the ordinary navigation processing shown in FIG. 26 starts, in step S442, whether or not multiple destination display mode is set is checked. Multiple destination display mode is that in which a plurality of destinations are displayed simultaneously on the map so that, irrespective of to which of them to actually travel, those candidate destinations can be viewed at a glance on the map. The details will be described later.

If multiple destination display mode is not set, then, in step S444, whether or not a setting to select only from among received destinations is made is checked. This is related to twin-navigation: a "received destination" is one stored as a destination as a result of an outside vehicle's absolute position information being received. Such storage is possible, for example, when an outside vehicle has already reached a destination, or when a house is going to be visited where an outside vehicle is parked in a garage. The details of such storage will be described later. In step S444, it is checked whether or not a setting is made to display a destination menu by selecting only from among such destinations received from outside vehicles.

If, in step S444, no setting to select only from among received destinations is made, then, in step S446, to make received destinations distinguishable from destinations stored with ordinary settings in a destination menu listing the stored destinations, the former are made identifiable as such, for example by being displayed in a different color. The flow then proceeds to step S448 to display a list of destinations. If, in step S444, a setting to select only from among received destinations is made, all the destinations displayed on the destination list are received destination, and thus the just described processing is unnecessary; accordingly, the flow then proceeds directly to step S448.

After the destination list is displayed in step S448, then, in step S450, whether or not one of the destinations listed there is selected is checked. If one is selected, the flow proceeds to step S452. By contrast, if, in step S450, it is not found that any destination is selected, the flow returns to step S442. If, in step S442, it is found that multiple destination display mode is set, the flow proceeds through multiple destination display processing in step S454 to step S452. Thereafter, until it is found that multiple destination display mode is set in step S442, or it is found that a destination is selected in step S450, steps S442 to S450 are repeated.

In step S452, the absolute position information of the destination selected in step S450 is read. Then, in step S456, the absolute position information of one's own vehicle is read, and then, in step S458, it is checked whether or not there is route specification information from the current position to the destination. Route specification information may be occasionally available when the flow proceeds through step S454 to step S458, in which case the route specification information is acquired in step S460, and the flow then proceeds to step S462. If, in step S458, no route specification information is available, the flow proceeds directly to step S462 to start map information preparation processing.

The map information preparation processing in step S462 corresponds to the scrolling of the map and the changing of the map scale in the first embodiment, and, in the case of the second embodiment, further includes the acquisition of map information by downloading. The differences in step S462 are that a map is prepared in view also of route specification information, and that the map scale is selected and the map is scrolled with attention paid so that not only the current position of one's own vehicle and the destination but also the route in between does not deviate from the map. Next, in step S464, based on the information thus obtained, one's-own-vehicle-and-route on-map display processing is performed to display the current position of one's own vehicle and the route to the destination on the map.

Then, in step S466, whether or not an operation to end navigation processing has been made is checked, and, if it is found that such an operation has been made, the flow ends. If, in step S466, it is not found that an operation to end navigation processing has been made, the flow returns to step S456, and thereafter, so long as no operation to end navigation processing is made, while the change of the absolute position of one's own vehicle is followed, steps S456 to S466 are repeated.

Figure 27:
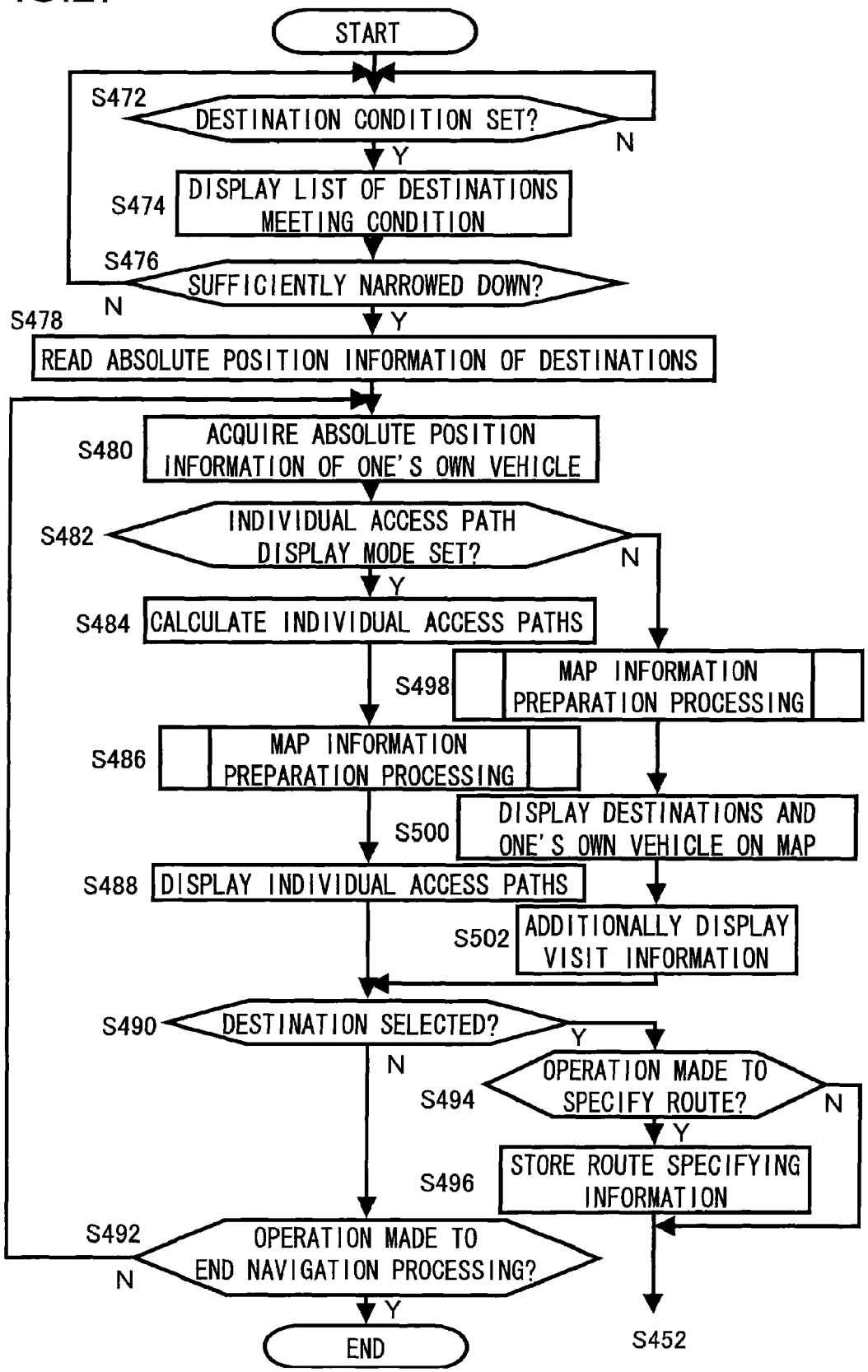
FIG. 27 is a flow chart showing the details of the processing for multiple destination display in step S454 in FIG. 26.

FIG. 27 is a flow chart showing the details of the processing for multiple destination display in step S454 in FIG. 26. Again, the following description of FIG. 27 assumes the first embodiment shown in FIG. 26; to understand it in the context of the second embodiment, "one's own vehicle" in the flow should be read instead as "one's own apparatus".

When the flow shown in FIG. 27 starts, in step S472, a destination condition for extracting a plurality of destinations is waited for to be set; when one is set, then, in step S474, a list of the destinations that meet the condition is displayed.

Then, in step S476, whether or not destinations have been sufficiently narrowed down is checked. Whether or not sufficient narrowing-down has been done is judged here according to whether an operation to narrow down or an operation to complete is made. Also when an operation to complete is made without making any operation to narrow down, it is found that sufficient narrowing-down has been done. In any case, when it is found that sufficient narrowing-down has been done, the flow proceeds to step S478. By contrast, if, in step S476, it is not found that sufficient narrowing-down has been done, the flow returns to step S472. This makes it possible to change an already set destination condition. Until it is found that sufficient narrowing-down has been done in step S476, steps S472 to S476 are repeated.

In step S478, the absolute position information of the plurality of destinations definitely set in step S476 is read. The information read here includes the "received destinations" described in connection with step S444 in FIG. 26. To distinguish these received destinations from ordinary destinations, step S474 may be configured like steps S444 to S448 in FIG. 26. In a case where destinations are eventually narrowed down to a single one in step S476, naturally the absolute position information read in step S478 is that of the single destination, and the following steps can equally handle such a single destination.

Next, in step S480, the absolute position information of one's own vehicle is acquired, and then, in step S482, whether or not individual access path display mode is set is checked. Individual access path display mode is that in which the access path to each of the plurality of destinations narrowed down in step S476 is displayed. If this mode is set, the flow proceeds to step S484 to calculate the access path to each destination.

Next, the flow proceeds to step S486 to start map information preparation processing. This processing corresponds to step S462 in FIG. 26, and the difference here is that the map is prepared in view also of the individual access paths calculated in step S484. Then, in step S488, based on the prepared map information, the current position of one's own vehicle and the individual access paths to the respective destinations are displayed on the map.

In step S490, it is checked whether or not, of the plurality of destinations displayed along with the individual access paths to them, one is selected. If none is selected, then, in step S492, whether or not an operation to end navigation processing has been done is checked. If an operation to end navigation processing has been done, the flow ends. This corresponds to a case where the user is satisfied with the at-a-glance display of a plurality of destinations along which the individual access paths to them on the map.

By contrast, if, in step S492, it is not found that an operation to end navigation has been made, then the flow returns to step S480 so that, unless individual access path display mode is disabled in step S482, or a destination is selected in step S490, or an operation to end navigation processing is made in step S492, steps S480 to S492 are repeated. Thus, while the change of the absolute position of one's own vehicle as acquired in step S480 is followed, the display of a plurality of destinations along with the individual access paths to them on the map is continued.

By contrast, if, in step S490, one destination is selected, then, in step S494, whether or not an operation to specify a route has been made is checked. This operation is made as part of the operation for selecting a destination: if an operation is made to accept the access path displayed in step S488 for the selected destination, or if an operation is made to change the thus accepted access path as desired, this is regarded as "an operation to specify a route being made"; by contrast, if the access path displayed in step S488 is canceled and in addition no alternative route is specified, this is regarded as "no operation to specify a route being made".

The route specifying operation made in step S490 as part of the operation for selecting a destination may be done otherwise than specifically described above. The flow may instead be configured as follows. If, in step S490, one destination is selected as the final destination, in response to the selection, instead of individual access paths, a route by which the selected final destination can be reached most efficiently after passing every other destination one after another may be automatically calculated and displayed as the recommended route. Then, if an operation to accept this recommended route is made, or an operation to change it as desired is made, this is regarded as "an operation to specify a route being made".

If, in step S494, any route specifying operation as described above is detected, then, in step S496, the specified route specifying information is stored, and the flow proceeds to step S452 in FIG. 26. By contrast, if no route specifying operation is detected, the flow proceeds directly to step S452.

Next, a description will be given of the case where individual access path display mode is not set in step S482. In this case, the flow proceeds to step S498 to start map information preparation processing. This processing is similar to the map information preparation processing in step S486, but here the map scale and how to scroll the map are determined without regard to individual access paths; thus, the processing here is simpler, and there are fewer restrictions on the map scales that can be selected.

Next, in step S500, the plurality of destinations and the position of one's own vehicle are displayed on the map. Then, in step S502, visit information is additionally displayed, and the flow then proceeds to step S490. The processing in step S502 involves, for example, distinguishing whether or not the plurality of destinations displayed on the map have ever been visited by displaying them in different colors, and additionally displaying, for visited destinations, the numbers of visits made or the like.

These functions are useful, for example in a case where the present invention is implemented in cellular phones as in the second embodiment, in dealing with customers, including developing new ones, and determining the precedence and order of visiting them and the like as when customers within a comparatively narrow area need to be visited one by one. That is, adopting these functions permits customers within an area to be displayed not simply in the form of a list but visually, as information on a map, in the form of an at-a-glance view, making the information useful to deal with them.

Figure 28:
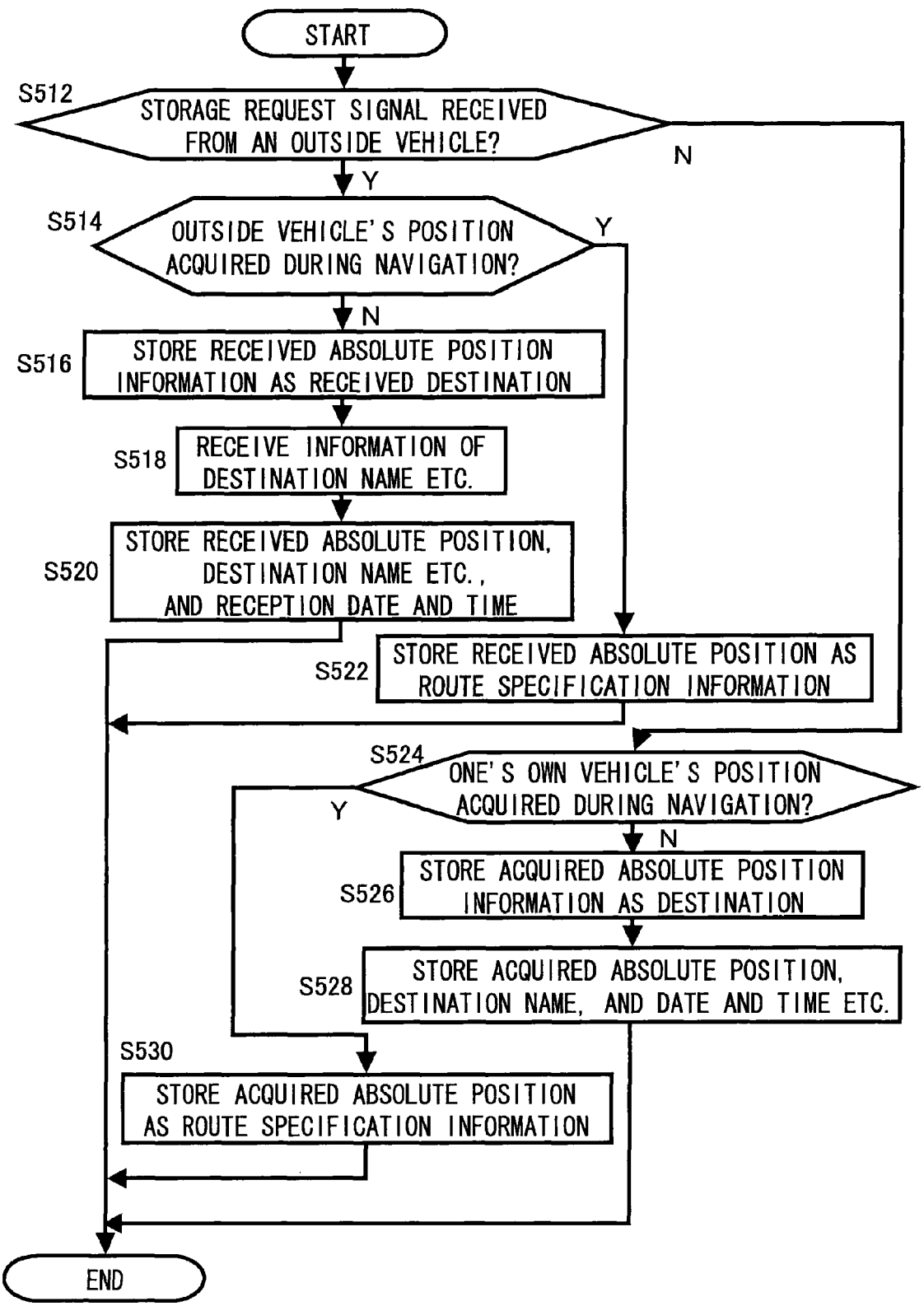
FIG. 28 is a flow chart showing those functions of the control portion in the first and second embodiments which are related to the processing for storage of the stored absolute position used in the flow shown in FIG. 26.

FIG. 28 is a flow chart showing the functions common to the first control portion 8 and the second control portion 28 in the first embodiment shown in FIG. 1 and to the first control portion 308 and the second control portion 328 in the second embodiment shown in FIG. 18. The following description centers around the first vehicle 2 shown in FIG. 1 or the first cellular phone 302 shown in FIG. 8. Accordingly, unless otherwise stated, the following description of the flow chart assumes the functions of the first control portion 8 shown in FIG. 1. To understand the flow shown in FIG. 28 as the functions of the first control portion 308 shown in FIG. 18, "outside vehicle" in the flow should be read instead as "outside apparatus".

The flow shown in FIG. 28 is related to the processing for storage of the stored absolute position used in the flow shown in FIG. 26. When an absolute position storage requesting signal causes an interrupt, the flow starts. An absolute position storage requesting signal occurs during twin-navigation either when one is received from an outside vehicle for the purpose of storing someone else's absolute position or when one is produced by an operation in one's own vehicle for the purpose of storing the absolute position of one's own vehicle. In a case where an absolute position storage requesting signal originates from an outside vehicle and correspondingly the absolute position information of the outside vehicle is received for storage, the outside vehicle is not always located in the near-field communication range. Accordingly, absolute position storage requesting signals and absolute position information are received through communication by the near-field communication portions more frequently than through communication by the telephone communication portions.

When storage processing starts in response to an absolute position storage requesting signal, in step S512, it is checked whether or not the storage processing started in response to an absolute position storage requesting signal from an outside vehicle. If so, then, in step S514, it is checked whether or not the outside vehicle's absolute position information that was received at the time that storage was requested had been acquired during navigation. If not, then, in step S516, the outside vehicle's absolute position information that was received is stored as a received destination. The storage here is done on a temporary basis.

As has been described, in "twin navigation", one's own vehicle is normally located near an outside vehicle, and therefore there is little sense in receiving the absolute position information acquired by the outside vehicle at the position at which it is currently located and storing it on request from the outside vehicle. In contrast, absolute position information acquired by an outside vehicle other than during navigation may imply, for example, that the outside vehicle is parked in a garage of the house that one's own vehicle is now going to visit or that the outside vehicle, which had departed the day before, has already arrived at the destination. In such cases, there is significant sense in receiving the absolute position information of an outside vehicle and storing it as a destination of one's own vehicle. That is, in such cases, the series of functions from steps S512 to S516 in FIG. 28 achieves the following: when an operation in an outside vehicle located at a destination produces a request signal, one's own vehicle can store the absolute position information of the outside vehicle as can be received at that time. This, compared with one's own vehicle having to search for, enter, and store a destination by itself, makes it extremely easy to store a destination. This benefit is useful also in the cellular phones of the second embodiment, for example, in a case where one is going to visit the partner's home or where the partner has already arrived at a coffee shop and is waiting there.

Next, in step S518, information such as the names of destinations is received from the outside vehicle. This corresponds to, in a case where information related to a destination has already been entered in the outside vehicle, receiving the information forwarded from it. As this case indicates, the received and stored absolute position information of an outside vehicle may contain not only that which the outside vehicle actually acquires at the time that a storage requesting signal is transmitted but also that of a destination which has already been stored in the outside vehicle. This does not require that the outside vehicle be located at the destination, and thus can be used also when, to share a destination at the start of twin-navigation, the absolute position information of a destination manually entered in one vehicle is forwarded to the other by communication. The series of functions from step S512 to step S516 in FIG. 28 can thus be used also for absolute position information from an outside vehicle that is not located at a destination. If no information such as the name of a destination is stored in the outside vehicle, nothing happens in step S518.

Next, in step S520, the received absolute position information stored in step S516, the name of a destination or the like, if any, received in step S518, and the date and time of reception are, in association, stored in the storage portion, now on a definite basis, and the flow ends.

By contrast, if, in step S514, the absolute position information that had been received when the storage request signal was received from the outside vehicle had been acquired by the outside vehicle during navigation, since it is unreasonable to store the outside vehicle's absolute position information at that time as a destination, the outside vehicle's absolute position information received is stored as route specification information, and the flow ends. In this case, if the outside vehicle is a leading vehicle that is familiar with navigation, it is useful to store important locations along the route on request from the outside vehicle in this way.

Next, a description will be given of what happens if, in step S512, the storage request signal does not originate from an outside vehicle. This implies that an operation in one's own vehicle itself has produced the storage request signal and has thereby started the flow. Thus, the flow then proceeds to step S524.

In step S524, it is checked whether or not one's own vehicle's absolute position information that had been acquired at the time that storage was requested had been acquired during navigation. If not, then, in step S526, one's own vehicle's absolute position information acquired is stored as a received destination. The storage here is done on a temporary basis. Next, in step S528, the acquired absolute position information stored in step S526, the date and time of acquisition, and the name of a destination or the like entered as necessary are, in association, stored in the storage portion, now on a definite basis, and the flow ends.

If, in step S524, one's own vehicle's absolute position information acquired had been acquired during navigation, since it is unreasonable to store one's own vehicle's absolute position information at that time as a destination, the outside vehicle's absolute position information acquired is stored as route specification information, and the flow ends. In this way, at any time during navigation, it is possible to store, on one's own discretion, the position of an important point along the route.

Now, with respect back to the "twin navigation" functions, a supplementary description will be given of the sharing with an outside apparatus of information on lack of map information in steps S288, S296, and S298 in FIG. 21. As already described, in step S288, if one's own apparatus lacks map information, the outside apparatus is notified of the fact. On the other hand, in steps S296 and S298, on receiving information that the outside apparatus lacks map information, one's own apparatus displays the fact. Thanks to these steps, whenever a situation arises where either one's own apparatus or the outside apparatus lacks map information and thus the two do not share the same map, one can notify the other of the fact. In other words, absence of communication notifying of lack of map information permits them to confirm that they share the same map. Then, confirming that they are viewing the same map, the two parties can exchange information on what is displayed on that same map.

This function permitting confirmation of what the partner is viewing finds wide application other than in case of lack of map information. For example, after step S426 in FIG. 25, a step may be added in which information that the positions of both apparatuses have started to be displayed on the map is automatically transmitted to the outside apparatus. This permits the outside apparatus to confirm what is displayed in one's own apparatus. A further step may be added thereafter in which, on receiving information from the outside apparatus that the positions of both apparatuses have started to be displayed on the map, the information is automatically displayed. This permits one's own apparatus to confirm what is displayed on the outside apparatus. In this way, also with respect to what is displayed, on the assumption that the partner is viewing the same thing, it is possible to exchange information on that. This benefit is particularly useful in the second embodiment when conducting conversation on the cellular phones while viewing twin-navigation display.

The above benefit obtained when conducting conversation on cellular phones while viewing the same display as the partner is is not limited to cases where what is displayed is a map, but is useful also in cases where what is displayed is an exchanged photo or an Internet screen.

Hereinafter, conventional problems and the various solutions thereof that the present invention has achieved, which have been described in the embodiments above, will be summarized as follows:

First, in a case where not only one's own position but also a partner's position is displayed on a map, there are various issues to be specifically addressed with regard to, for example, obtaining the partner's consent, exchanging information with the partner, and displaying a plurality of positions simultaneously on the map. Conventionally, these issues have not necessarily been satisfactorily addressed, making it impossible to offer an easy-to-use position display apparatus.

In view of the above, it is an object of the present invention to address various problems associated with displaying the position information of a plurality of parties on a single map, in order to offer an easy-to-use position display apparatus.

To achieve the above object, the present invention offers a position display apparatus having: absolute position acquiring means for acquiring first—one's own—absolute position; wireless communication means for receiving second absolute position information acquired by outside absolute position acquiring means; map information providing means for providing map information on a predetermined scale; map displaying means for displaying, on a map based on the map information, a position based on the first absolute position information and a position based on the second absolute position information distinguishably from each other; and scale determining means for determining the scale of the map information based on the first and second absolute position information.

In a case where one's own position alone is displayed on the map, the scale of the map can freely be chosen, from wide-area ones to enlarged ones, to suit the purpose. In a case where a plurality of positions are displayed, especially when the map is enlarged, one of the positions may fall outside the map. To avoid such an inconvenience, the above configuration of the present invention offers specific measures whereby the scale of map information is determined based on first and second absolute position information.

In implementing this feature, one can choose between a configuration where, based on the first and second absolute position information, the optimal map scale that allows the display of both is determined and a configuration where the limit enlarged map scale on which one of the positions falls outside the map is calculated beforehand so that the map scale, which can be set freely, is prevented from being set to be an enlarged one beyond that limit. In the latter case, one can further choose between a configuration where the map is inhibited from being enlarged beyond the limit and a configuration where the operator is warned of trying to go beyond the limit but is allowed to proceed with enlargement at his will.

The present invention can be implemented also in cases where the wireless communication means receives third absolute position information, fourth absolute position information, and so forth as well; that is, its implementation is not limited to cases where only first and second absolute position information is dealt with.

According to a specific feature of the present invention, the scale determining means has first checking means for checking whether or not the position based on the first absolute position information and the position based on the second absolute position information fall inside the map covering the displayed range. If it is found that not both of the positions fall inside the map covering the displayed range, the scale of the map information is automatically changed to a wider-area one.

According to another specific feature of the present invention, the scale determining means has second checking means for checking whether or not the position based on the first absolute position information and the position based on the second absolute position information fall inside the map covering the displayed range and enlarged on a predetermined scale. If it is found that both positions fall inside the map on that enlarged scale, the scale of the map is automatically changed to the so found enlarged one.

According to yet another specific feature of the present invention, there is provided scrolling means for scrolling the map displayed by the map displaying means. The scale determining means determines the scale of the map information based on, in addition to the first and second absolute position information, the scrollability offered by the scrolling means.

If the map can be scrolled, it is possible to keep a plurality of positions inside the map display screen by scrolling, without changing the scale to a wider-area one. Thus, with this feature, the scale of map information is determined based on, in addition to first and second absolute position information, scrollability.

According to a more specific feature related to the above one, the scrolling means has automatic scrolling means for automatically performing scrolling according to a criterion chosen from among different ones. The scale determining means determines the scale of the map information differently according to the criterion of scrolling. In a case where a plurality of positions are displayed, for example, performing scrolling according to such a criterion that one's own position remains at the center of the display poses more restrictions on scrollability than performing scrolling according to such a criterion that a plurality of positions are kept inside the displayed screen as efficiently as possible. According to the above feature of the present invention, for example, a wider-area scale is chosen when scrolling is performed according to the former criterion than when scrolling is performed according to the latter criterion.

According to a further specific feature of the present invention, there is provided a traveling direction detecting means for detecting one's own traveling direction. The direction of the map is determined such that the traveling direction of the position based on the first absolute position information points upward, irrespective of the traveling direction of the position based on the second absolute position information. In this way, a plurality of positions can be displayed without confusion, so as to match one's own action.

In implementing the above feature, one can prepare, in addition to the mode of display described above, a mode in which, irrespective of changes in one's own traveling direction, a plurality of positions remains displayed, for example, with north at the top, so that one can choose between the above mode of display and this mode of fixed display.

According to another feature of the present invention, a position display apparatus is offered that has: first absolute position acquiring means for acquiring first—one's own—absolute position; wireless communication means for receiving second absolute position information acquired by outside absolute position acquiring means; map information providing means for providing map information on a predetermined scale; map displaying means for displaying, on a map based on the map information, a position based on the first absolute position information and a position based on the second absolute position information distinguishably from each other; and automatic scrolling means for automatically scrolling the map based on the first and second absolute position information.

As already described, in a case where a plurality of positions are displayed, attention needs to be paid so that none of any position other than one's own falls outside the displayed map. To avoid such an inconvenience, the above configuration of the present invention offers specific measures whereby the map is automatically scrolled based on first and second absolute position information.

With this automatic scrolling feature, it is possible to cope with situations where a change in the map scale may cause a position to fall outside the map, and with situations where, without a change in the map scale, a position moves on the map. In either case, scrolling is performed based on the first and second absolute position information.

In a practical implementation of this feature, as already described, automatic scrolling can be performed according to a criterion chosen from among different ones.

According to yet another feature of the present invention, a position display apparatus is offered that has: first absolute position acquiring means for acquiring first-one's own—absolute position; wireless communication means for receiving second absolute position information acquired by outside absolute position acquiring means; map information providing means for providing map information on a predetermined scale; map displaying means for displaying, on a map based on the map information, a position based on the first absolute position information and a position based on the second absolute position information distinguishably from each other; and matching means for matching the first and second absolute position information with each other so as to enable display by the map displaying means.

When the second absolute position information is received from the outside by wireless communication, the outside system does not always match with one's own position display apparatus. Thus, with this feature, the first and second absolute position information is matched with each other so as to enable display by one's own map displaying means.

According to a specific feature related to this, the matching means includes setting means for setting the wireless communication means so as to enable the map displaying means to display the second absolute position information. This makes it possible to receive the second absolute position information even from a partner that operates according to a different communication system or communicates data in a different format.

According to another specific feature related to this, the matching means includes information converting means for converting the second absolute position information to enable the map displaying means to display it. This makes it possible to handle, for display, the second absolute position information from a partner, even if it expresses position information based on absolute position information in a different way, in the same way as with the first absolute position information.

According to still another feature, a position display apparatus is offered that has: first absolute position acquiring means for acquiring first—one's own—absolute position; wireless communication means for receiving second absolute position information acquired by outside absolute position acquiring means; map information providing means for providing map information on a predetermined scale; first display means for displaying, on a map based on the map information, a position based on the first absolute position information and a position based on the second absolute position information distinguishably from each other; and second display means for displaying the fact that the current state is that in which the second absolute position information is received.

In a case where not only one's own—first—absolute position information but also the second absolute position information from the outside is displayed, consideration needs to be given to the constantly changing outside circumstances. The above feature helps cope with this. According to a specific feature related to this, even when the first display means does not display the position based on the second absolute position information, the second display means displays the fact that the current state is that in which the second absolute position information is received. Thus, for example, even when due to a change in the communication environment the second absolute position information is temporarily unavailable and cannot be displayed on the map, the second display means can clearly display only the fact that the state in which the second absolute position information is received is set. Moreover, for example, when the second absolute position does not need to be confirmed constantly on the map, its display can be omitted from the map for the sake of simplicity, and the second display means can display, in a simplified manner, only the fact that the current state is that in which the second absolute position information is received.

According to still another feature, a position display apparatus is offered that has: first absolute position acquiring means for acquiring first—one's own—absolute position; wireless communication means for receiving second absolute position information acquired by outside absolute position acquiring means; map information providing means for providing map information on a predetermined scale; map displaying means for displaying, on a map based on the map information, a position based on the first absolute position information and a position based on the second absolute position information distinguishably from each other; setting means for setting whether or not to display the position based on the second absolute position information; and setting managing means for automatically managing whether or not to enable that setting. This permits a setting operation related to the display of the position based on the second absolute position information to be made smoothly, without confusion.

Specifically, when the second absolute position is located outside the communicable range of the wireless communication means, the setting managing means automatically disables the setting by the setting means. For example, in such a case, unnecessary display of a menu for setting related to the display of the position based on the second absolute position information is suppressed, so as to avoid confusion on the user's part.

Moreover, when a request for display of the second absolute position is received from the outside, the setting managing means automatically enables the setting by the setting means. For example, in such a case, a menu for setting is automatically shown so that, when a request for setting related to the display of the position based on the second absolute position information is received from the outside, it is possible to respond to it promptly.

In a case where not only one's own position but also a partner's position is displayed on a map, there are various issues to be specifically addressed with regard to their display. Conventionally, these issues have not necessarily been satisfactorily addressed, making it impossible to offer an easy-to-use position display apparatus.

In view of the above, it is an object of the present invention to address various problems associated with displaying the position information of a plurality of parties on a single map, in order to offer an easy-to-use position display apparatus.

To achieve the above object, the present invention offers a position display apparatus having: absolute position acquiring means for acquiring first—one's own—absolute position; wireless communication means for receiving second absolute position information acquired by outside absolute position acquiring means; map information providing means for providing map information on a predetermined scale; map displaying means for displaying, on a map based on the map information, a position based on the first absolute position information and a position based on the second absolute position information distinguishably from each other; checking means for checking possibility of communication by the wireless communication means based on the first and second absolute position information; and warning means for giving a warning based on a result of the check by the checking means.

By checking the possibility of wireless communication based on the relationship of the first and second positions and then giving a warning as described above, it is possible to take appropriate measures against wireless communication becoming impossible, for example by bringing the first and second positions closer together.

According to a specific feature of the present invention, the checking means compares the position-to-position distance based on the first and second absolute position information with the communicable distance of the wireless communication means to foresee a risk of the position-to-position distance increasing beyond the communicable distance. This makes it possible to give a warning according to the distance between the first and second absolute position information, a piece of information that directly affects the possibility of wireless communication. According to another specific feature of the present invention, the checking means, based on the first and second absolute position information, the map information, and the communicable distance of the wireless communication means, foresees a risk of the geography between the first and second absolute positions making impossible the reception of the second absolute position information by the wireless communication means. This makes it possible to give a warning according to the geography between the first and second absolute positions, a piece of information that directly affects the possibility of wireless communication.

According to another feature of the present invention, a position display apparatus is offered that has: absolute position acquiring means for acquiring first—one's own—absolute position; wireless communication means for receiving second absolute position information acquired by outside absolute position acquiring means; map information providing means for providing map information on a predetermined scale; map displaying means for displaying, on a map based on the map information, a position based on the first absolute position information and a position based on the second absolute position information distinguishably from each other; and display controlling means for making the map displaying means display differently according to whether, when the first and second absolute positions are moving while keeping a relationship in which one leads and the other follows, one is leading or not.

With the above configuration, when the two parties are in a relationship in which one leads the other, it is possible to display differently according to the degree in which the confirmation of the partner's position is needed.

According to another feature of the present invention, a position display apparatus is offered that has: absolute position acquiring means for acquiring first—one's own—absolute position; wireless communication means for receiving second absolute position information acquired by outside absolute position acquiring means; map information providing means for providing map information on a predetermined scale; map displaying means for displaying, on a map based on the map information, a position based on the first absolute position information and a position based on the second absolute position information distinguishably from each other; and conformation necessity checking means for checking, based on the first absolute position information, whether or not the second absolute position information needs to be confirmed.

With the above configuration, when one is acting with a partner, one can obtain, based on one's own action, confirmation necessity information on the partner's action. For example, in a case where one's own vehicle is the leading vehicle in car navigation, it is possible to obtain, based on the fact that one has passed a location such as a crossroads where there are alternatives, check result information to the effect that whether or not the following vehicle has followed properly needs to be confirmed.

With a specific feature of the present invention described above, the conformation necessity checking means check, based on the first and second absolute position information, whether or not the second absolute position information needs to be confirmed. This makes it possible also to obtain the partner's confirmation necessity information on the partner's action. For example, in the car navigation above, based on the fact that the following vehicle has followed properly and passed the crossroads, it is possible to obtain check result information to the effect that confirmation is no longer necessary until necessity arises later.

According to another feature of the present invention, a position display apparatus is offered that has: absolute position acquiring means for acquiring first—one's own—absolute position; wireless communication means for receiving second absolute position information acquired by outside absolute position acquiring means; map information providing means for providing map information on a predetermined scale; map displaying means for displaying, on a map based on the map information, a position based on the first absolute position information and a position based on the second absolute position information distinguishably from each other; and selecting means for choosing whether or not to display the second absolute position information.

With the above feature, whenever the position based on the second absolute position information does not need to be displayed, it ceases to be displayed, helping simplify the position display on the map.

According to a above specific feature of the present invention described above, there is provided conformation necessity checking means for checking whether or not the second absolute position information needs to be confirmed. Based on the conformation necessity checking means, the selecting means chooses whether or not to display the second absolute position information. For example, in the car navigation above, when it is found that the following vehicle is following properly and that the travel will continue along a road for a while with no location foreseen where there are alternatives, it is possible to automatically stop displaying the position based on the second absolute position information. Of course, whenever its display is found to be necessary, the display of the position based on the second absolute position information is automatically restored.

According to another feature of the present invention, a position display apparatus is offered that has: absolute position acquiring means for acquiring absolute position information; wireless communication means for communicating with the outside; map information providing means for providing map information; display means for displaying, on a map based on the map information, a position based on the absolute position information; and controlling means for enabling display by the display means when the wireless communication means receives information even if operation means for enabling display of the display means is not operated.

With the above configuration, whenever a request is received from outside by wireless communication, the display by the display means is automatically enabled to respond to the request from the outside.

For example, in a case where outside absolute position acquiring means is acquired by the wireless communication means and a position based on it can be, along with one's own position, displayed on the map, when a request for mutually performing such display is received from the outside, the display by the display means, which is essential to achieve such display, is automatically enabled, and in addition the fact that such a request is received can be displayed by the display means. By contrast, if the display by the display means cannot be enabled unless the operation means is operated, even when a request is received from the outside, it is impossible to respond to it.

In a case where a position is displayed on a map, there are various issues to be specifically addressed. Conventionally, these issues have not necessarily been satisfactorily addressed in practical terms, making it impossible to offer an easy-to-use position display apparatus.

In view of the above, it is an object of the present invention to address various problems associated with preparation and maintenance of a map necessary to display a position on a map, in order to offer an easy-to-use position display apparatus.

To achieve the above object, the present invention offers a position display apparatus having: first absolute position acquiring means for acquiring first—one's own—absolute position; wireless communication means for receiving second absolute position information acquired by second—outside—absolute position acquiring means; map information providing means for providing map information; map displaying means for displaying, on a map based on the map information, a position based on the first absolute position information and a position based on the second absolute position information distinguishably from each other; and checking means for checking, based on the first and second absolute position information, whether or not new map information is necessary or not. This makes it possible to promptly provide a map necessary for display.

Specifically, through its check, the checking means recognizes either that the map information providing means cannot provide a map for display or that the scale of the map provided by the map information providing means is inadequate.

According to a specific feature of the present invention, there is provided map information obtaining means for obtaining, based on the check result of the checking means, map information for the map information providing means from the outside. This makes it possible to obtain essential map information or map information on a more adequate scale on a timely basis.

According to a more specific feature of the present invention, the map information obtaining means is wireless communication means separate from the wireless communication means for receiving the second absolute position information. For example, whereas the wireless communication means for receiving the second absolute position information is near-field communication means, the wireless communication means serving as the map information obtaining means is communication means relying on a telephone line.

According to another feature of the present invention, there is provided controlling means for controlling such that, in a state in which the map information providing means can provide the map displaying means with first map information of, for example, a wide-area map, if the checking means finds that second map information, for example, on a more enlarged scale is necessary, the display by the map displaying means based on the first map information is performed concurrently with the obtaining of the second map information from the outside by the map information obtaining means. This makes it possible to perform the display based on the first map information for the time being, and meanwhile obtain the second map information, which allows more detailed display of positions. In this way, as soon as the second map information is obtained, the display of positions is replaced with that based on the second map information on a more adequate scale.

According to another feature of the present invention, a position display apparatus is offered that has: wireless communication means for receiving absolute position information acquired by outside absolute position acquiring means; map information providing means for providing map information; map displaying means for displaying, on a map based on the map information, a position based on the absolute position information received; and checking means for checking, based on the position information received, whether or not the map information providing means needs new map information. Thus, the present invention is useful also in cases where one's own position is not necessarily displayed.

Also in this case, according to a specific feature of the present invention, it is useful to provide map information obtaining means for obtaining, based on the check results of the checking means, map information for the map information providing means from the outside. According to a more specific feature of the present invention, it is also useful to realize the map information obtaining means as wireless communication means separate from the wireless communication means for obtaining outside absolute position information.

According to another feature of the present invention, a position display apparatus is offered that has: absolute position acquiring means for acquiring one's own absolute position information; map information providing means for providing map information; map displaying means for displaying, on a map based on the map information provided by the map information outputting means, a position based on the absolute position information acquired; and checking means for checking, based on the position information acquired, whether or not the map information providing means needs new map information. Thus, the present invention is useful also in cases where outside absolute position information is not necessarily received.

Also in this case, according to a specific feature of the present invention, it is useful to provide map information obtaining means for obtaining, based on the check results of the checking means, map information for the map information providing means from the outside by wireless communication.

According to another feature of the present invention, a position display apparatus is offered that has: absolute position acquiring means for acquiring one's own absolute position information; wireless communication means relying on a telephone line; map information obtaining means for obtaining map information from the outside via the wireless communication means; storage means for storing the map information obtained; and map displaying means for displaying, on a map based on the map information, a position based on the absolute position information in response to the absolute position acquiring means and the storage means.

A configuration like this, permitting necessary map information to be obtained across a telephone line and stored, and permitting positions to be displayed on a map based on that map information and the absolute position information acquired, eliminates the needs to furnish the position display apparatus with a vast amount of map information. Further, making the position display apparatus itself perform calculations for position display on the map eliminates the need for communication with the outside as required to transmit position information to the outside and receive map information with display of positions calculated outside. This is useful in cases where, as in navigation while one is walking, the range of movement is small, and, once map information is obtained, the same map can be used, and all that is needed more is constantly changing absolute position information.

The above feature of the present invention is useful also in a case where there is additionally provided near-field communication means for receiving the absolute position information acquired by the outside absolute position acquiring means and the map display apparatus is so configured as to distinguishably display, on a map based on the map information provided by the storage means, the position based on one's own absolute position information and the position based on the outside absolute position information.

According to a specific feature of the present invention related to obtaining map information across a telephone line, there is provided automatic start-up means for automatically starting up the map information obtaining means. As already described, the automatic start-up means may have checking means for checking, based on absolute position information, whether or not new map information needs to be obtained.

The automatic start-up means may instead be so configured as to automatically connect a telephone line and automatically start up the map information obtaining means. With this configuration, it is possible to exploit standby time, in which the telephone line is idle, to select and obtain beforehand maps that are likely to be used in the future and store them. This helps reduce the frequency of obtaining necessary maps when absolute position information is acquired, and thereby allows fast display.

According to another particular feature of the present invention, the starting up of the automatic start-up means is inhibited when the remaining storage capacity in the storage means is equal to or less than a predetermined level. This is useful in preventing the limited storage capacity from being occupied by map information of uncertain likeliness of being used later.

According to another particular feature of the present invention, the map information inputting means inputs map information covering an area common to and on a different scale than the map information stored in the storage means. According to another particular feature of the present invention, the map information inputting means inputs map information of an area adjoining the map information stored in the storage means. This makes it possible to store beforehand map information of much interest to the user.

According to another particular feature of the present invention, there is provided deleting means for deleting from the storage means map information that has long been unused by the map displaying means. This is useful in refreshing the limited storage capacity with map information of much interest to the user. According to yet another particular feature of the present invention, deletion is performed when the storage capacity of the storage means is equal to or less than a predetermined level.

In a case where a device, such as a cellular phone, that inherently has a communication capability is additionally furnished with a capability for displaying a position on a map, there are various issues to be specifically addressed. Conventionally, these issues have not necessarily been satisfactorily addressed in practical terms, making it impossible to offer an easy-to-use position display apparatus.

In view of the above, it is an object of the present invention to address, in a case where a device, such as a cellular phone, inherently having a communication capability is additionally furnished with a capability of displaying a position on a map, various problems associated with coordination between and prevention of interference between the two capabilities, in order to offer an easy-to-use position display apparatus.

To achieve the above object, the present invention offers a position display apparatus having: first absolute position acquiring means for acquiring first—one's own—absolute position information; first wireless communication means for transmitting the first absolute position to an outside communication device and receiving second absolute position information acquired by second absolute position acquiring means in the outside communication device; map information providing means for providing map information; display means for displaying, on a map based on the map information, at least one of a position based on the first absolute position information and a position based on the second absolute position information; second wireless communication means, separate from the first communication means, for communicating with the outside communication device.

Providing wireless communication means for exchanging absolute positions with an outside communication device separately from ordinary communication by which communication with the outside communication device is conducted in this way offers various benefits.

For example, the first and second wireless communication means can be operated concurrently so that, while absolute position information exchanged is displayed on the map, other communication can be concurrently conducted with the outside device. This dramatically increases the amount of information that can be exchanged.

According to a specific feature of the present invention, the first wireless communication means is near-field communication means, and the second wireless communication means is communication means relying on a telephone line. This makes it possible to exchange absolute position information by the near-field communication means, which operates locally, and to concurrently exchange various kinds of information across the telephone line as usual.

The above benefit can be obtained typically when the present invention is implemented in a cellular phone that has a telephone function portion for originating and receiving phone calls and that is capable of wireless telephony by the second wireless communication means. In this case, one can view the exchanged absolute position information displayed on the map while conducting phone conversation with the partner.

According to a specific feature of the present invention, there is provided a camera portion so that pictures taken by the camera portion can be transmitted, in a form attached to mail, by the second wireless communication means. This makes it possible to exchange, in addition to position information on the map, pictures of views around the two parties' current positions, adding to information on, for example, a location at which a meeting is arranged. With the camera portion, the present invention can be configured to be capable of videotelephony.

According to another feature of the present invention, a position display apparatus is offered that has: first wireless communication means for receiving absolute position information acquired by absolute position acquiring means in an outside communication device; map information providing means for providing map information; display means for displaying, on a map based on the map information, a position based on the absolute position information; second wireless communication means, having a telephone function portion for originating and receiving phone calls with a variable sound volume, for communicating with the outside communication device; and a volume switching controlling portion that, when the display means displays on the map the position based on the absolute position information, switches the sound volume of the telephone function portion to increase it.

When the position display apparatus of the present invention is configured as an device, such as a cellular phone, that has a telephone capability, if the user uses it in a state held on his face like an ordinary telephone, he cannot view the map information displayed. Thus, the user cannot conduct phone conversation while viewing the map information. By contrast, according to the above feature of the present invention, when the display means displays the map information, the sound volume of the telephone function portion is switched to be increased so that phone conversation can be conducted with the device placed at a distance as in videotelephony. Thus, the user can conduct phone conversation while viewing the map information.

According to another feature of the present invention, a position display apparatus is offered that has: wireless communication means for conducting communication with the outside for a telephone function portion; map information obtaining means for obtaining map information by the wireless communication means; storage means for storing the map information obtained; absolute position acquiring means for acquiring absolute position information; map displaying means for displaying, on a map based on the map information stored, a position based on the absolute position information; checking means for recognizing that a new map needs to be obtained; and notification means for notifying a user, when the checking means so recognizes while the wireless communication means is being used, that map information cannot be obtained if nothing is done.

According to the above feature of the present invention, a configuration is adopted such that map information is obtained across a telephone line, and in addition, if it is recognized that new map information needs to be obtained for position display while the telephone line is busy as during a phone conversation, the user is notified of the fact. Thus, the user can recognize that map information cannot be obtained immediately and why, and thus can take appropriate measures according to his order of precedence.

According to a specific feature of the above, the notification means is so configured as to recommend to stop the use, currently taking place, of the wireless communication means in order to make it possible to obtain map information. This makes the notification more straightforward, and permits the user to disconnect the phone promptly if he gives precedence to obtaining map information.

According to another feature of the present invention, a position display apparatus is offered that has: wireless communication means for conducting communication with the outside for a telephone function portion; map information obtaining means for obtaining map information by the wireless communication means; storage means for storing the map information obtained; absolute position acquiring means for acquiring absolute position information; map displaying means for displaying, on a map based on the map information stored, a position based on the absolute position information; and notification means for notifying the user, when an operation to start wireless communication is made while map information is being obtained, that wireless communication is impossible.

According to the above feature of the present invention, a configuration is adopted such that map information is obtained across a telephone line, and in addition, if an operation to start wireless communication, such as one to originate a phone call, is made while map information is being obtained, the user is notified that wireless communication is impossible and why. Thus, it is possible to avoid confusion, as with a failure, on the user's part. Moreover, in response to the notification, the user can choose, according to his order of precedence, whether to wait until map information is fully obtained or to manually interrupt the obtaining of map information.

According to another feature of the present invention, a position display apparatus is offered that has: wireless communication means for conducting communication with the outside for a telephone function portion; map information obtaining means for obtaining map information by the wireless communication means; storage means for storing the map information obtained; absolute position acquiring means for acquiring absolute position information; map displaying means for displaying, on a map based on the map information stored, a position based on the absolute position information; and controlling means for stopping obtaining of the map information when an operation to start wireless communication is made while the map information is being obtained.

According to the above feature of the present invention, a configuration is adopted such that map information is obtained across a telephone line, and in addition, if an operation to start wireless communication, such as one to originate a phone call, is made while map information is being obtained, precedence is given to that operation; that is, with precedence given to the obtaining of map information, immediate origination of a phone conversation is enabled. It is also possible to allow setting of whether to give precedence to the origination of a phone call, or to the obtaining of map information as just described, so that, only if a setting to give precedence to the origination of a phone call is made, the above function works.

In a case where a device, such as a cellular phone, that inherently has a communication capability is additionally furnished with a capability for displaying a position on a map, there are various issues to be specifically addressed. Conventionally, these issues have not necessarily been satisfactorily addressed in practical terms, making it impossible to offer an easy-to-use position display apparatus.

In view of the above, it is an object of the present invention to address, in a case where a device, such as a cellular phone, inherently having a communication capability is additionally furnished with a capability of displaying a position on a map, various problems associated with coordination between the two capabilities, in order to offer an easy-to-use position display apparatus.

To achieve the above object, the present invention offers a position display apparatus having: first wireless communication means for receiving absolute position information acquired by absolute position acquiring means in an outside communication device; map information providing means for providing map information; display means for displaying, on a map based on the map information, a position based on the absolute position information; second wireless communication means, having a telephone function portion for originating and receiving phone calls, for communicating with the outside communication device; and notification means for notifying, when wireless communication by the first wireless communication means with the outside communication device is possible while wireless communication by the second wireless communication means with the same outside communication device is being conducted, of this fact. the fact that.

The first wireless communication means is separate from the second wireless communication means, which is for the telephone function, the former being local communication means such as near-field communication means and thus having a limited communicable range. Accordingly, information on whether or not the first wireless communication means can conduct communication is of interest to the user, and in particular when that communication is conducted concurrently with that by the second wireless communication means, what is most important to the user is whether or not wireless communication by the first wireless communication means is possible with the same partner with which communication is being conducted by the second wireless communication means. The above feature meets this requirement.

According to another specific feature of the present invention, the notification means notifies, if wireless communication by the first wireless communication means with the outside communication device is possible at the start of wireless communication by the second wireless communication means with the same outside communication device, of this fact. Thus, the user can promptly recognize whether or not communication by the first wireless communication means is concurrently possible with the partner with which he is about to start communication by the second wireless communication means. Thus, it is possible to promptly start communication by both communication means as necessary.

According to another specific feature of the present invention, the notification means notifies, if wireless communication by the first wireless communication means with the outside communication device becomes possible during wireless communication by the second wireless communication means with the same outside communication device, of this fact. Thus, as soon as the partner with which the user is conducting communication by the second wireless communication means enters the communication range by the first wireless communication means, the user recognizes this, and can increase the amount of exchanged information by concurrently conducting communication by the first wireless communication means as necessary.

According to another feature of the present invention, a position display apparatus is offered that has: first wireless communication means for receiving absolute position information acquired by absolute position acquiring means in an outside communication device; map information providing means for providing map information; display means for displaying, on a map based on the map information, a position based on the absolute position information; second wireless communication means, having a telephone function portion for originating and receiving phone calls, for communicating with the outside communication device; first notification means for notifying, when a request for communication from the outside communication device is received by the first wireless communication means, of this fact; and second notification means for notifying, when a request for communication from the outside communication device is received by the second wireless communication means, of this fact.

Thus, a notification is given not only when a phone call is received, but also when a request for communication by the first wireless communication means is received from the outside communication device. This makes it possible to promptly respond to a request for exchange of information in the form of displaying the position of the partner, who is requesting communication, on a map on one's own position display means.

According to a specific feature of the present invention, the notification by the first notification means and that by the second notification means can be set to be distinguishable from each other. Accordingly, in a case where notifications are sounded as ringing melodies or the like, the user can recognize, without confusion, the notification by the first notification means of a request for communication, which is different from the ordinary notification by the second notification means.

According to another specific feature of the present invention, the notification by the first notification means is possible even while the second wireless communication means is operating. Thus, it is possible, for example during a phone call, to recognize the receipt of a request for communication by the first notification means operated by the partner of the phone call.

According to another specific feature of the present invention, the notification by the second notification means is possible even while the first wireless communication means is operating. Thus, it is possible, while confirming the position of the outside communication device on the display means of one's own position display apparatus, to recognize the receipt of a phone call.

According to another feature of the present invention, a position display apparatus is offered that has: first wireless communication means for receiving absolute position information acquired by absolute position acquiring means in an outside communication device; map information providing means for providing map information; display means for displaying, on a map based on the map information, a position based on the absolute position information; second wireless communication means, having a telephone function portion for originating and receiving phone calls, for communicating with the outside communication device; and notification means for giving different notifications according to whether, when there is an outside communication device from which absolute position information can be received by the first wireless communication means, wireless communication is being conducted by the second wireless communication means with the same outside communication device or not.

Thus, when there is an outside communication device from which absolute position information can be received by the first wireless communication means, it is possible to give an appropriate notification according to the degree of interest to the position of that outside communication device.

For example, if wireless communication is being conducted by the second wireless communication means with the same outside communication device, the notification means immediately notifies of it; if no wireless communication by the second wireless communication means is being conducted, then, when wireless communication by the second wireless communication means is started, the notification means gives a notification. That is, in a case where reception of absolute position information by the first wireless communication means becomes possible with a partner with which wireless communication is already being conducted by the second wireless communication means, this means an increase in the amount of information that can be exchanged with that partner, and thus implies that the user of the position display means has much interest. For example, in a situation where two parties are confirming the whereabouts of each other by phone for an arranged meeting or the like, if one can confirm on the display means of his own position display apparatus the partner's position, an increase in information results, and thus a notification of the fact is immediately given. By contrast, in a case where reception of absolute position information by the first wireless communication means becomes possible with a partner with which no phone conversation is currently being conducted, there may or may not be by interest to the partner at that moment; thus, to avoid giving a notification unnecessarily, one is suspended until the start of wireless communication by the second wireless communication means.

According to another feature of the present invention, a position display apparatus is offered that has: first wireless communication means for receiving absolute position information acquired by absolute position acquiring means in an outside communication device; map information providing means for providing map information; display means for displaying, on a map based on the map information, a position based on the absolute position information; second wireless communication means, having a telephone function portion for originating and receiving phone calls, for communicating with the outside communication device; first notification means for notifying, when a request for communication is received from the outside communication device by the first wireless communication means, of this fact; and second notification means for notifying that there is an outside communication device with which communication is possible by the first wireless communication means.

The aim of notification differs between in a case where the user of the outside communication device intends to communicate by the first wireless communication means and in a case where simply communication by the first wireless communication means has become possible and it is not known whether or not the parties concerned intend to communicate. Thus, to cope with different aims, the first and second notification means are provided.

In a case where there are a plurality of relevant outside communication devices, the second notification means can notify of the presence of them. On such a notification, the user can select a partner of interest to him.

An example representative of display apparatuses having a wireless communication capability is mobile phones having a display portion. Nowadays, the display portion in mobile phones is so sophisticated that it not only serves for the setting and guidance of the telephone functions but also permits graphical display such as the display of exchanged photos and Internet screens.

On the other hand, an example of known position display apparatuses for displaying the position of a mobile body on a map is car navigation apparatuses exploiting GPS information. Services are also available that add such a navigation function to cellular phones to permit one's own position on a map on the display portion.

Furthermore, various proposals have been made to display not only one's own position but also the position of someone else located nearby to permit each to grasp the positional relationship with the other on a map.

The benefits of these sophisticated display functions, however, are still not fully exploited, and there remain various issues to be further studied.

In view of the above, it is an object of the present invention to provide a display apparatus, such as a cellular phone, having a wireless communication capability in which better use is made of the benefits of its functions.

To achieve the above object, the present invention offers a display apparatus having: first wireless communication means for communicating, with an outside communication device, information related to display in a display portion; and second wireless communication means, separate from the first wireless communication means, for communicating with the outside communication device under the control of a telephone function portion for originating and receiving phone calls.

With the above configuration, information on the display on the display portion is exchanged with the outside communication device, and this further enhances the functions of the display apparatus having a communication capability. This benefit is enjoyed widely not only in navigation display but also in graphical display such as the display of exchanged photos and Internet screens.

According to a specific feature of the present invention, the first wireless communication portion transmits information on the display on the display portion to the outside communication device, and receives information on the display in the outside communication device from the outside communication device. This permits the two parties to share information on each other's display.

According to another specific feature of the present invention, the first wireless communication portion communicates information on whether or not the display on the display portion is identical with the display in the outside communication device. This permits the two parties to confirm whether or not they share display, and thus permits one to conduct phone conversation with the other on the assumption that the partner is viewing the same display.

According to another specific feature of the present invention, the display portion displays graphics. This benefit of the present invention is particularly useful in cases where what is displayed on the display portion is graphics and the like, and is difficult to express in words.

According to a more specific feature of the present invention, the display portion displays, as graphics, a map. According to this feature of the present invention, two parties can conduct telephone conversation while exchanging, with the outside communication device, information on the map displayed on each other's display portion. This further enhances the functions of the display apparatus having a communication capability.

According to another feature of the present invention, a display apparatus is offered that has: first absolute position acquiring means for acquiring first—one's own—absolute position information; wireless communication means for receiving second absolute position information acquired by second absolute position acquiring means in an outside communication device; map information providing means for providing map information; map displaying means for displaying, on a map based on the map information, a position based on the first absolute position information and a position based on the second absolute position information distinguishably from each other; and controlling means for communicating information on display by the display means with the outside communication device by the wireless communication means.

With the above configuration, it is possible to share, with the outside communication device, information on the display of the positions based on the first—one's own—absolute position information and the second—the outside communication device's—absolute position information on the map.

According to a specific feature of the present invention described above, information on whether or not it is possible to provide map information for display the positions based on the first and second absolute position information is transmitted to the outside communication device. This makes it possible to inform the outside communication device that the current state is that in which, due to lack of map information, the first and second absolute position information cannot be displayed appropriately.

According to another specific feature of the present invention described above, information on whether or not the same map as that provided by the map information providing means can by used on the outside communication device is received from the outside communication device. This permits the user to recognize that the outside communication device does not share map information.

According to another specific feature of the present invention described above, information on whether or not the map displaying means is performing it display is transmitted to the outside communication device. This makes it possible to inform the partner that one is viewing a map.

According to another specific feature of the present invention described above, information on whether or not the same contents as displayed by the map displaying means are being displayed is received from the outside communication device. This makes it possible to confirm that the partner is viewing the same map display.

In a case where a position is displayed on a map, there are various issues to be specifically addressed. Conventionally, these issues have not necessarily been satisfactorily addressed in practical terms, making it impossible to offer an easy-to-use position display apparatus.

In view of the above, it is an object of the present invention to provide a position display apparatus that is easy to use in cases where one's own and a partner's positions are displayed on a single map.

To achieve the above object, the present invention offers a position display apparatus having: wireless communication means for receiving absolute position information acquired outside; map information providing means for providing map information; map displaying means for displaying, on a map based on the map information, a position based on the absolute position information received by the wireless communication means; and checking means for checking a change in the absolute position information.

With this configuration, it is possible to appropriately cope with a change in the absolute position received from the outside.

According to a specific feature of the present invention, there is provided controlling means for determining the direction of the map displayed by the map displaying means based on the result of the check by the checking means. This makes it possible to exploit the check result of the checking means to display the map in the direction that reflects changes in the absolute position received from the outside. Thus, it is possible to display the map from the partner's viewpoint.

According to a more specific feature of the present invention, when no check result is obtained from the checking means, the direction of the map is set in a predetermined direction. This makes it possible to cope with cases in which, as at the start of reception of absolute position information acquired outside, it is impossible to grasp a change in the absolute position information.

According to another specific feature of the present invention, there is additionally provided absolute position acquiring means for acquiring one's own absolute position information, and the map displaying means displays, on a map based on the map information provided by the map information providing means, the absolute position information acquired by the absolute position acquiring means and the absolute position information received by the wireless communication means distinguishably from each other. Even when one's own and a partner's positions are both displayed on a map in this way, the present invention can cope with changes in the partner's position.

According to a more specific feature of the present invention described above, there is provided one's-own-position change checking means for checking for a change in the absolute position information acquired by the absolute position acquiring means. This makes it possible to cope with changes in one's own absolute position as well.

According to a more specific feature of the present invention described above, based on the result of the check by the one's-own-position change checking means, the direction of the map displayed by the map displaying means is determined. This makes it possible to display the map in the direction that reflects changes in one's own absolute position.

According to another feature of the present invention described above, there is provided instructing means for instructing based on which to determine the direction of the map—the check result of the checking means for checking a change in the partners position or the check result of the checking means for checking a change in one's own position. This makes it possible to display the map from both one's own and the partner's viewpoints.

This instruction can be given freely. For example, in a case where two parties are conducting phone conversation while viewing the same map, it is possible, for example, to freely change the direction of the map display one is viewing to that of the map the partner is viewing. For another example, it is possible to automatically detect the fulfillment of a predetermined condition and automatically determine which of the check results to adopt.

According to another feature of the present invention, a position display apparatus is offered that has: first absolute position acquiring means for acquiring first—one's own—absolute position information; wireless communication means for receiving second absolute position information acquired by second—outside—absolute position acquiring means; map information providing means for providing map information; map displaying means for displaying, on a map based on the map information, a position based on the first absolute position information and a position based on the second absolute position information distinguishably from each other; and instructing means for automatically instructing to determine, based on the second absolute position information, the direction of the map displayed by the map displaying means prior to shooting by photographing means.

With the above feature, prior to photographing, the direction of the map displayed on the position display apparatus is set in the direction based on the second position information. Accordingly, when one holds his position display apparatus in such a way that the partner's traveling direction appears natural on the map so displayed, the optical axis of the photographing means incorporated in the position display apparatus points in the direction viewable from the partner's viewpoint. If a picture is taken in this state and sent to the partner, the picture shows a view in the direction in which the partner is traveling. This, in combination with the shared map information, provides the partner with useful guiding information.

With regard to guidance on a map, there are many issues to be more specifically addressed, and its potential is still not fully exploited.

In view of the above, it is an object of the present invention to improve car navigation and cellular phone navigation to make them easier to use.

To achieve the above object, the present invention offers a position display apparatus having: wireless communication means for receiving absolute position information from the outside; storage means for storing the absolute position information received; absolute position acquiring means for acquiring one's own absolute position information; map information providing means for providing map information; and controlling means for giving guidance on the map, based on the absolute position information stored in the storage means and the absolute position information acquired by the absolute position acquiring means, with the former as the destination.

With the above feature, a destination can be set from the outside. For example, by receiving absolute position information of the partner's residence from there, the user can set a destination more easily than by entering one by himself. In this case, if the partner also has a similar position display apparatus, the user can receive the absolute position information acquired in the partner's position display apparatus.

According to a specific feature of the present invention, the wireless communication means receives from an outside communication device an instruction to store the absolute position information in the storage means. This makes it possible to receive, from the partner that transmits the absolute position information, an instruction to store it, and thus makes it possible to store the absolute position information more appropriately. For example, when the partner is moving, receiving an instruction to store the partner's absolute position information from the partner himself, who is located at the very site, is useful in setting a destination easily and appropriately.

According to another specific feature of the present invention, there is provided a destination inputting means for inputting absolute position information of a destination to the storage means without the help of the wireless communication means. This permits the user to set a destination by himself as usual.

According to a more specific feature of the above, the absolute position information received by the wireless communication means and stored and the absolute position information inputted by destination inputting means are distinguishable from each other. This makes it easy to select a destination to suit the case.

According to another feature of the present invention, a position display apparatus is offered that has: storage means for storing absolute position information of a destination; absolute position acquiring means for acquiring one's own absolute position information; map information providing means for providing map information; controlling means for providing guidance on a map based on the map information, based on the absolute position information stored in the storage means and the absolute position information acquired by the absolute position acquiring means, with the former as a destination; and wireless communication means for transmitting the absolute position information stored in the storage means to the outside.

With this configuration, it is possible to share, with the outside, the destination information stored in the storage portion. This is useful in traveling in coordination with the outside.

According to a specific feature of the present invention described above, the wireless communication means also transmits to the outside an instruction signal to instruct to store the transmitted absolute position information. This ensures the sharing of the absolute position information.

According to another feature of the present invention, a position display apparatus is offered that has: storage means for storing absolute position information of a destination; absolute position acquiring means for acquiring one's own absolute position information; map information providing means for providing map information; controlling means for providing guidance on a map based on the map information, based on the absolute position information stored in the storage means and the absolute position information acquired by the absolute position acquiring means, with the former as a destination; and wireless communication means for transmitting, to the outside, the absolute position information acquired by the absolute position acquiring means and an instruction signal to instruct to store it.

With this configuration, when absolute position information is transmitted to the outside, it is possible to properly instruct the outside what absolute position information to store. This is useful in particular when, in a case where absolute position information is constantly transmitted to the outside, only limited pieces of it are selected and stored.

According to another feature of the present invention, a position display apparatus is offered that has: absolute position acquiring means for acquiring one's own absolute position information; storage means for storing a plurality of pieces of absolute position information; map information providing means for providing map information; controlling means for providing guidance on a map based on the map information provided by the map information outputting means, based on one of the pieces of absolute position information stored in the storage means and based on one's own absolute position information acquired by the absolute position acquiring means, with the former as a destination; and display means for displaying an at-a-glance view of the plurality of pieces of absolute position information stored in the storage means.

With the above configuration, one's own absolute position information acquired can be stored as information on a plurality of destinations, and these are displayed in an at-a-glance fashion, ready for use. Thus, a position display apparatus is offered that is useful in, for example, managing visits to a plurality of customers. The storage of a destination can be done easily at the site by the absolute position acquiring means, and this is suitable for storage done for the purpose of re-visiting.

According to a specific feature of the present invention described above, the at-a-glance view of the plurality of pieces of absolute position information stored is displayed on the map. Thus, the management of a plurality of visit destinations can be done not simply on the basis of character-based information but on the basis of visual position information.

According to another feature of the present invention, a position display apparatus is offered that has: absolute position acquiring means for acquiring one's own absolute position information; storage means for storing a plurality of pieces of absolute position information acquired by the absolute position acquiring means; map information providing means for providing map information; and controlling means for providing guidance on a map based on the map information, based on the plurality of pieces of absolute position information stored in the storage means and based on one's own absolute position information acquired by the absolute position acquiring means, with each of the former as a destination.

With this configuration, a plurality of visit destinations are displayed, along with the routes to them, on the map. This is useful in working out a visit schedule and the route from one destination to another.

According to another feature of the present invention, a position display apparatus is offered that has: absolute position acquiring means for acquiring one's own absolute position information; storage means for storing a plurality of pieces of absolute position information acquired by the absolute position acquiring means; map information providing means for providing map information; and controlling means for providing guidance on a map based on the map information, based on the plurality of pieces of absolute position information stored in the storage means and based on one's own absolute position information acquired by the absolute position acquiring means, with one of the former as a destination and the others as en-route locations.

With this configuration, in a case where there is a plurality of visit designations, a recommended route for visiting one designation after another is displayed on the map. This makes it possible to visit them efficiently.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A position display apparatus for own position and a position of an outside apparatus comprising:
   a position acquiring part adapted to acquire first information indicative of the apparatus' own position;
   a wireless communication part adapted to receive second information indicative of the position of the outside apparatus;
   a map display adapted to display the apparatus' own position and the position of the outside apparatus on a common map in response to the first information and the second information; and
   a judging part adapted to judge in advance an approaching impossibility of establishing communication between the position display apparatus and the outside apparatus based on both the first information and the second information wherein the judging part is adapted to judge the approaching impossibility while the communication is still established and the second information is actually received, the judging part judging the approaching impossibility based on the actually received second information.

2. The position display apparatus according to claim 1 further comprising a controller adapted to control the map display in response to the first information and the second information so that the common map covers both the apparatus' own position and the position of the outside apparatus on the map display.

3. The position display apparatus according to claim 2, wherein the controller includes a sub-controller adapted to modify the scale of the common map for any one of the own position and the position of the outside apparatus not to stray from the common map on the map display.

4. The position display apparatus according to claim 2, wherein the controller includes a scrolling part adapted to scroll the common map for any one of the own position and the position of the outside apparatus not to stray from the common map on the map display.

5. The position display apparatus according to claim 4, wherein the controller further includes a sub-controller adapted to modify the scale of the common map for any one of the own position and the position of the outside apparatus not to stray from the common map on the map display with a room for the scroll left.

6. The position display apparatus according to claim 2, further comprising a map offering part adapted to offer the common map to the map display.

7. The position display apparatus according to claim 2, further comprising a unificating part adapted to unify the data format of the own position and the position of the outside apparatus to display them on the map display.

8. The position display apparatus according to claim 2, further comprising a detector adapted to display whether or not the wireless communication part can receive the position of the outside apparatus.

9. The position display apparatus according to claim 1, further comprising an informing part adapted to inform that the wireless communication part can receive the position of the outside apparatus.

10. The position display apparatus according to claim 1, the judging part is adapted to judge the impossibility in consideration of the geographic factor between the own position and the position of the outside apparatus.

11. The position display apparatus according to claim 10, wherein the judging part is adapted to judge a possibility of poor radiowave environment caused by the geographic factor intervening the own position and the position of the outside apparatus even when the distance between the own position and the position of outside apparatus will not exceed the communication range limit.

12. The position display apparatus according to claim 1, further comprising a warning part adapted to warn in case the distance between the position display apparatus and the outside apparatus will exceed the communication range in response to the output signal from the judging part.

13. A position display apparatus for own position and a position of an outside real apparatus comprising:
- a position acquiring part adapted to acquire first information indicative of the apparatus' own position;
- a wireless communication part adapted to receive second information indicative of the actual position of the outside real apparatus;
- a map display adapted to display the apparatus' own position and the actual position of the outside real apparatus on a common map in response to the first information and the second information, wherein the display of the position of the outside real apparatus automatically disappears or appears based on an extent to which confirmation of the position of the outside real apparatus is needed; and
- a judging part adapted to judge automatically in response to the actual first information whether the actual position of the outside real apparatus based on the second information is to appear or disappear on the map display.

14. The position display apparatus according to claim 13, further comprising a selector adapted to select whether or not to display the position of the outside apparatus on the map display.

15. The position display apparatus according to claim 13, further comprising an informing part adapted to inform that the outside apparatus is demanding to display the position of the outside apparatus on the map.

16. The position display apparatus according to claim 13, further comprising a display control part adapted to vary the manner of displaying the own position and the position of the outside apparatus on a common map in response to whether or not the position display apparatus is preceding the outside apparatus.

17. The position display apparatus according to claim 13, wherein the judging part is adapted to judge automatically whether or not the second information is to be confirmed in response to both the first information and the second information.

18. The position display apparatus according to claim 13, wherein the map display is adapted to display the actual position of the outside real apparatus in addition to the own position on the common map in automatic response to the judging part.

19. The position display apparatus according to claim 13, wherein the judging part is adapted to judge automatically whether or not the second information is to be confirmed in response to a place on the map at which the apparatus locates represented by the first information.

20. The position display apparatus according to claim 19, wherein the judging part is adapted to judge automatically that the second information is to be confirmed if the apparatus passes a turning point of the load on the map and the outside real apparatus follows.

* * * * *